(12) United States Patent
Hankawa et al.

(10) Patent No.: US 7,692,872 B2
(45) Date of Patent: Apr. 6, 2010

(54) ZOOM LENS AND IMAGING APPARATUS INCORPORATING THE SAME

(75) Inventors: Masashi Hankawa, Hachioji (JP); Tomoyuki Satori, Kawagoe (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 12/317,471

(22) Filed: Dec. 22, 2008

(65) Prior Publication Data

US 2009/0174950 A1 Jul. 9, 2009

(30) Foreign Application Priority Data

Dec. 26, 2007 (JP) ............................. 2007-334017

(51) Int. Cl.
*G02B 15/14* (2006.01)
(52) U.S. Cl. ...................................... 359/690
(58) Field of Classification Search ................. 359/690, 359/676, 681–682, 755, 761
See application file for complete search history.

(56) References Cited

U.S. PATENT DOCUMENTS

| 6,606,200 B1 | 8/2003 | Nakayama et al. |
| 2006/0098301 A1 | 5/2006 | Miyajima |

2006/0238891 A1 * 10/2006 Ogata .......................... 359/690

FOREIGN PATENT DOCUMENTS

| JP | 11-052244 | 2/1999 |
| JP | 2006-171055 | 6/2006 |
| JP | 2007-003554 | 1/2007 |

* cited by examiner

*Primary Examiner*—Alicia M Harrington
(74) *Attorney, Agent, or Firm*—Kenyon & Kenyon LLP

(57) ABSTRACT

A zoom lens comprises, in order from its object side, a first lens group of positive refracting power, a second lens group of negative refracting power, and a third lens group of positive refracting power located on an image side with respect to the second lens group. Upon zooming from the wide-angle end to the telephoto end, the spacing between the first lens group and the second lens group grows wider at the telephoto end than at the wide-angle end, and the spacing between the second lens group and the third lens group becomes narrower at the telephoto end than at the wide-angle end. The first lens group comprises a negative lens and a positive lens, and the number of the negative lens in the first lens group is only one. At least one positive lens in the first lens group satisfies the following conditions (1) and (2):

$$1.80 < ndlp < 2.0 \quad (1)$$

$$50.0 < vdlp < 70.0 \quad (2)$$

where ndlp is the d-line refractive index of the at least one positive lens in the first lens group, and vdlp is the Abbe constant of the at least one positive lens in the first lens group.

15 Claims, 30 Drawing Sheets

Example 1

Total

Example 2

Total

Example 4

Example 5

Total

Example 6

Example 7

Example 8

Example 9

Example 10

Example 11

Example 12

Example 13

FIG.15
Example 2
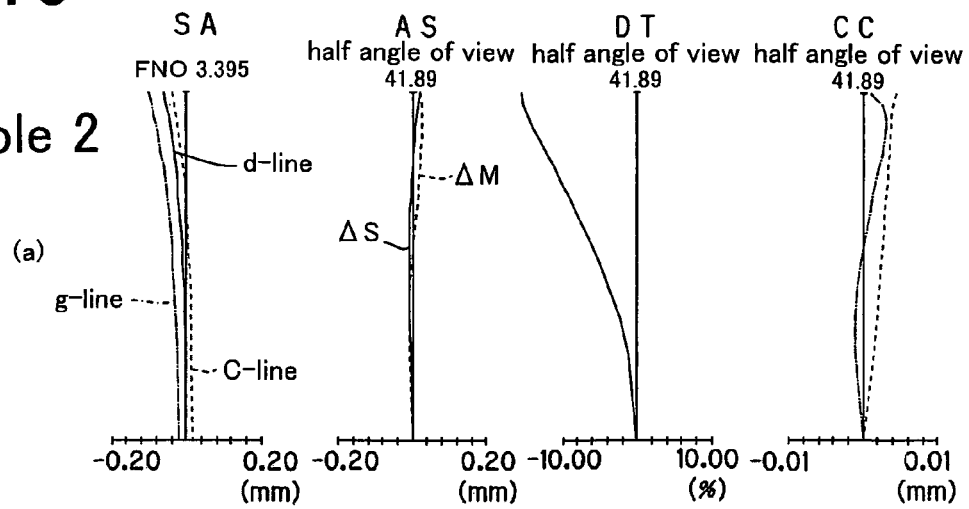
(a)
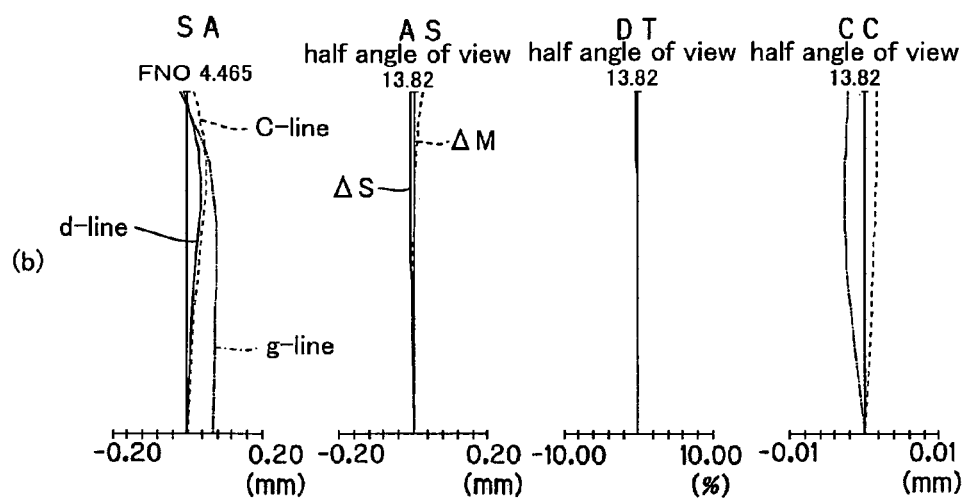
(b)
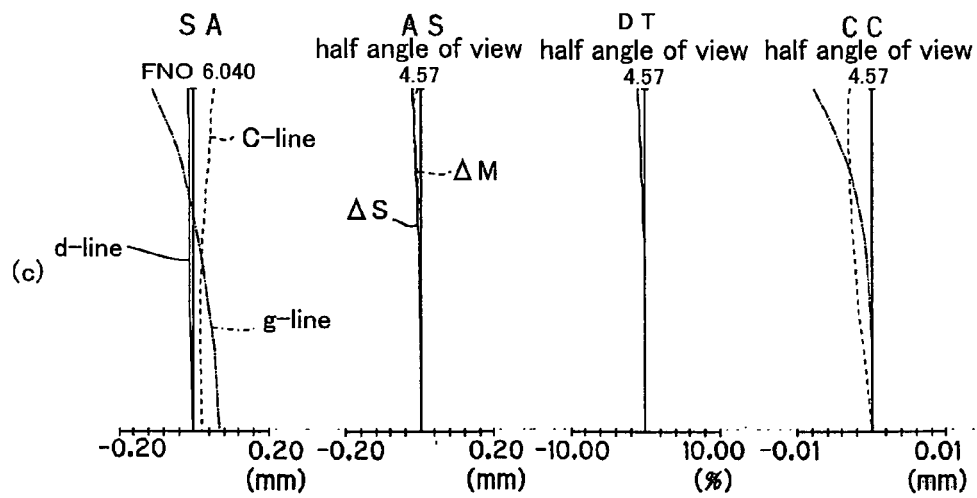
(c)

Example 3

FIG.17
Example 4
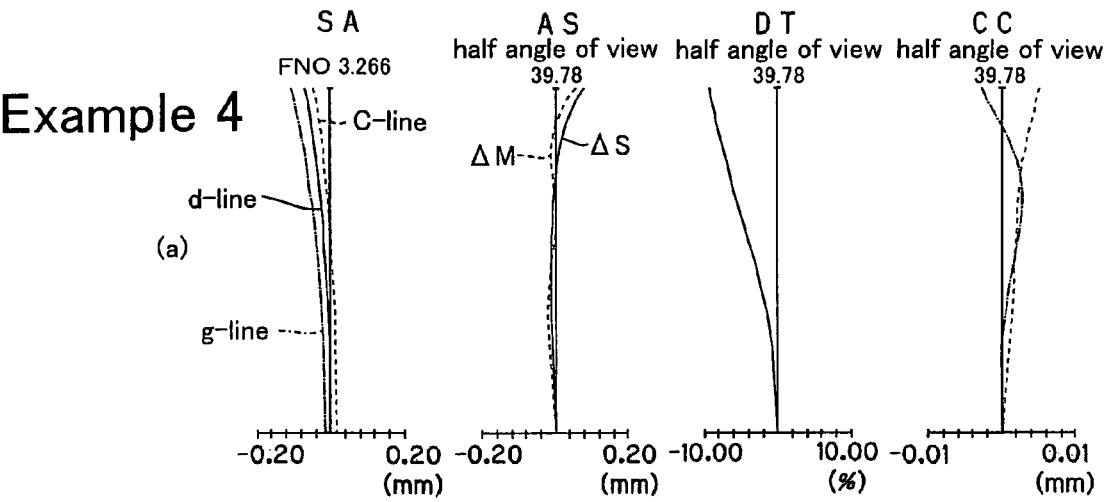
(a)
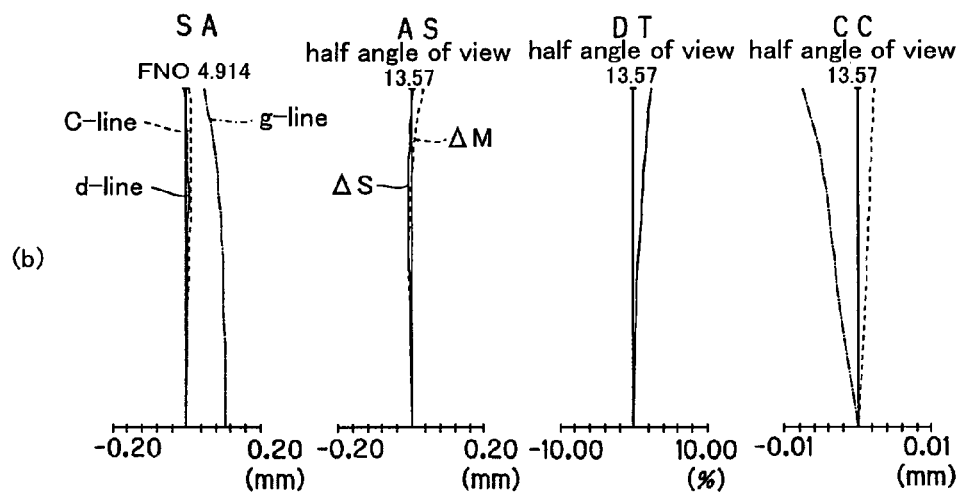
(b)
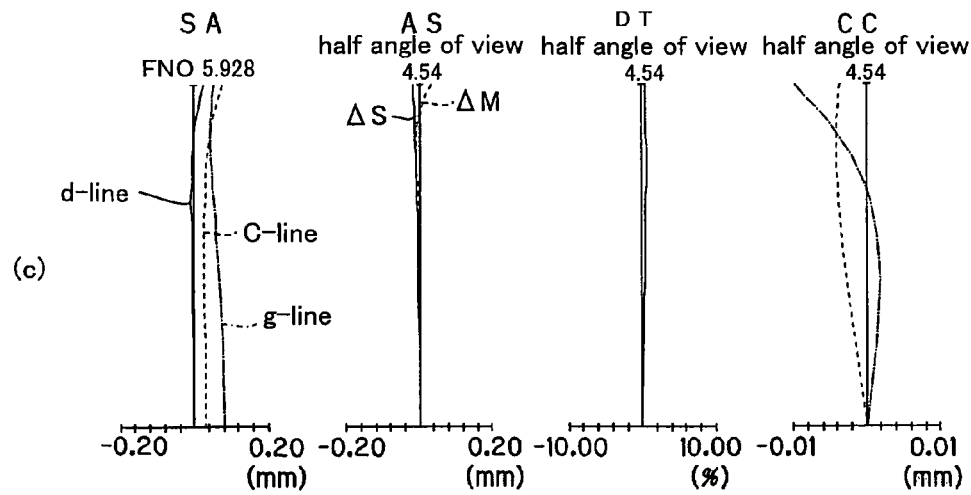
(c)

Example 5

FIG.19 Example 6

FIG.21 Example 8

FIG.23
Example 10
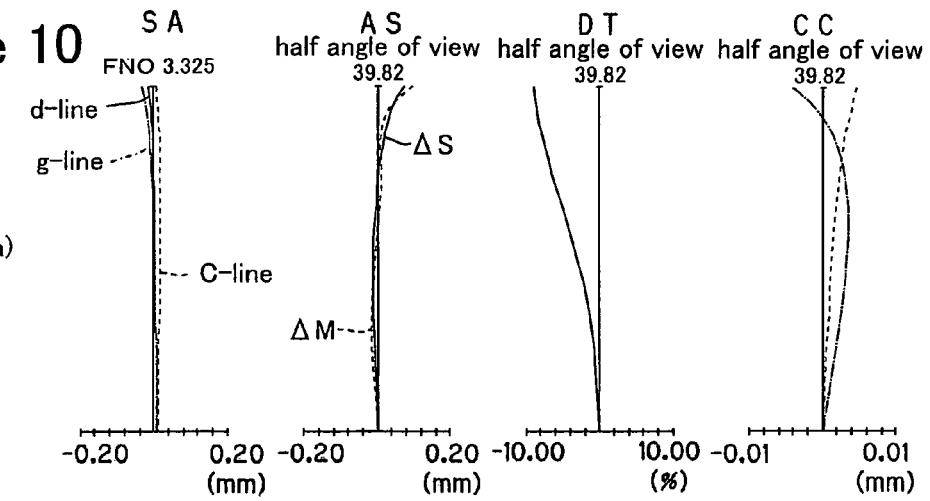
(a)
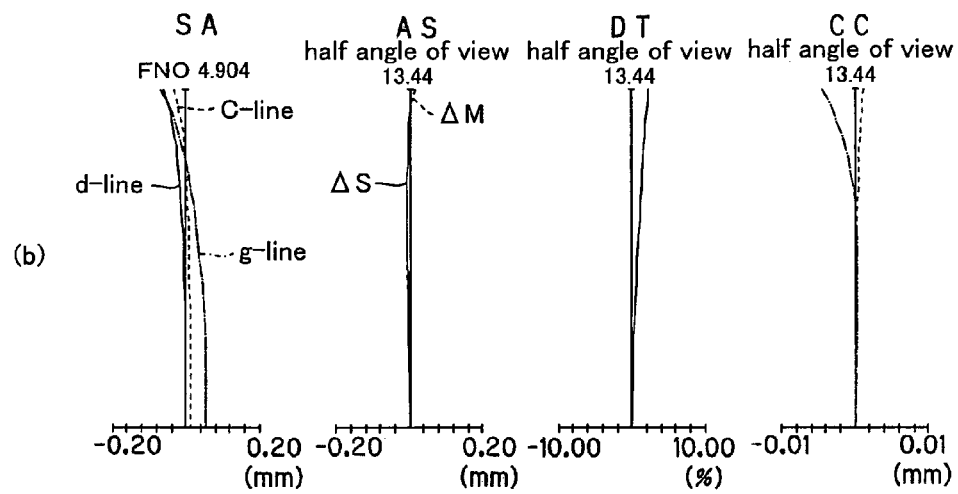
(b)
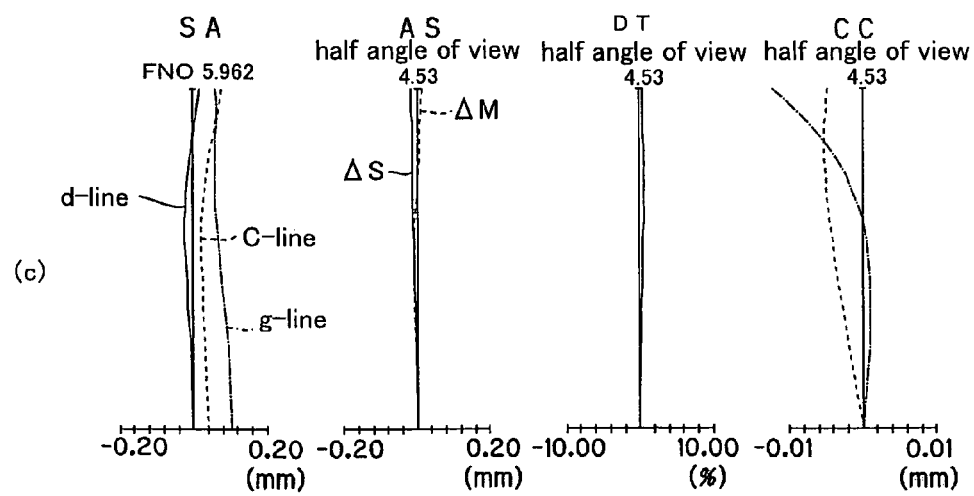
(c)

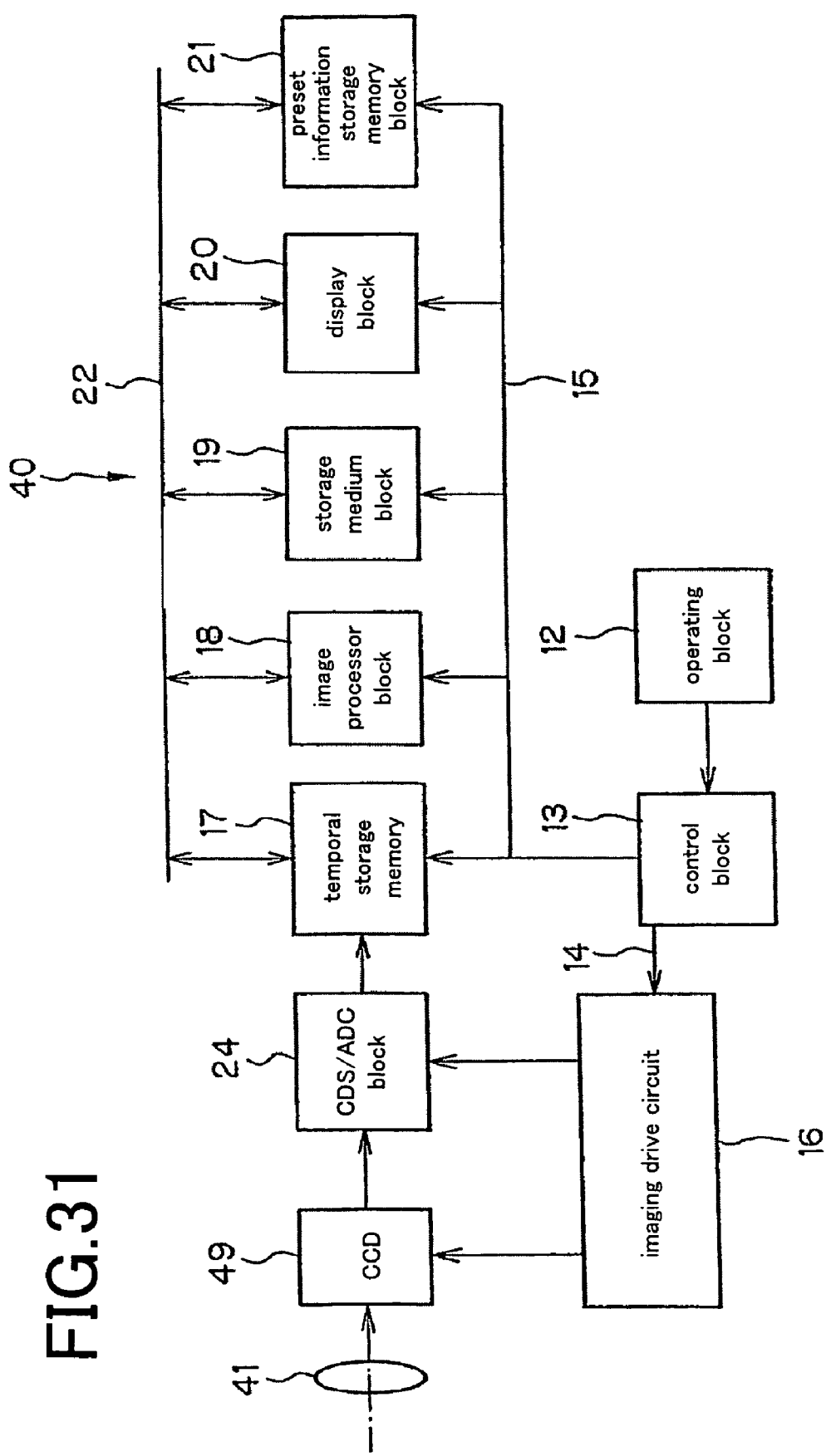

ZOOM LENS AND IMAGING APPARATUS INCORPORATING THE SAME

This application claims benefit of Japanese Application No. 2007-334017 filed in Japan on Dec. 26, 2007, the content of which are incorporated by this reference.

BACKGROUND OF THE INVENTION

The present invention relates generally to a zoom lens, and more specifically to imaging apparatus incorporating a zoom lens, for instance, video cameras, and digital cameras.

In recent years, imaging apparatus such as digital cameras designed to take images of subjects using solid-state imaging devices such as CCDs or CMOSs have gone mainstream in place of silver-halide film cameras. Further, they have now a wide spectrum of categories from the commercial high-end type to the compact low-end type.

Users of such low-end type digital cameras would enjoy snapping shots over a wide range of scenes at any time in any place. For this reason, preference is given to small-format digital cameras, especially of the type that can be well put away in the pockets of clothing or baggage, are convenient to carry around, and are slimmed down in their thickness direction, and there is a mounting demand for size reductions, higher zoom ratios, and wider-angle arrangements of zoom lenses mounted on digital cameras or the like, too. On the other hand, as the pixels of imaging devices are now on the increase, there is also a mounting demand for the zoom lens to have higher optical performance.

To meet such demands, a zoom lens system of the type that has a lens group of positive refracting power located nearest to its object side has been proposed in the art. This type of zoom lens has the merit of easily achieving higher zoom ratios. Among prior zoom lenses having relatively high zoom ratios and compact format, for instance, there is a type comprising, in order from its object side, a first lens group of positive refracting power, a second lens group of negative refracting power, a third lens group of positive refracting power and a fourth lens group of positive refracting power, as set forth in the following patent publications.

[Patent Publication 1]
JP(A) 2006-330657
[Patent Publication 2]
JP(A) 11-52244
[Patent Publication 3]
JP(A) 2007-3554

For the lenses proposed in Patent Publications 1, 2 and 3, however, much is still desired in terms of size reductions, because the first lens group is thick as a whole and the full length of the lens system is large relative to an image height.

Having been made in view of such problems as mentioned above, the present invention has for its object the provision of a zoom lens system of the type having a lens group of positive refracting power located nearest to its object side, which works for making sure size reductions and optical performance. Another object of the invention is to provide an imaging apparatus using such a zoom lens.

SUMMARY OF THE INVENTION

According to the invention, the aforesaid object is accomplishable by the provision of a zoom lens, characterized by comprising, in order from an object side to an image side thereof, a first lens group of positive refracting power, a second lens group of negative refracting power, and a third lens group that is located on an image side with respect to the second lens group and has positive refracting power, wherein upon zooming from a wide-angle end to a telephoto end, the spacing between said first lens group and said second lens group grows wider at the telephoto end than at the wide-angle end, the spacing between said second lens group and said third lens group becomes narrower at the telephoto end than at the wide-angle end, and wherein the first lens group comprises a negative lens and a positive lens; the first lens group comprises one negative lens, and at least one positive lens in the first lens group satisfies the following conditions (1) and (2):

$$1.80 < n_{dlp} < 2.0 \quad (1)$$

$$50.0 < \nu_{dlp} < 70.0 \quad (2)$$

where $n_{dlp}$ is the d-line refractive index of said at least one positive lens in the first lens group, and $\nu_{dlp}$ is the Abbe constant of said at least one positive lens in the first lens group.

The reasons of why such arrangement is relied upon, and the advantages of that arrangement are now explained.

The inventive zoom lens comprises, in order from the object side to the image side, the first lens group of positive refracting power, the second lens group of negative refracting power and the third lens group that is located on the image side with respect to the second lens group and has positive refracting power, and is designed such that upon zooming from the wide-angle end to the telephoto end, the spacing between the first lens group and the second lens group grows wider at the telephoto end than at the wide-angle end and the spacing between the second lens group and the third lens group becomes narrower at the telephoto end than at the wide-angle end.

Such arrangement makes sure the efficient zoom sharing of the second lens group and the third lens group so that it is easy to get hold of zoom ratios while reducing fluctuations of aberrations at the time of zooming from the wide-angle end to the telephoto end.

The first lens group comprises one negative lens and one positive lens so that various aberrations occurring at the positive lens can be canceled out with aberrations produced at the negative lens. For instance, it is possible to make correction of chromatic aberration of magnification on the wide-angle side and longitudinal chromatic aberration on the telephoto side. At this time, if the number of the negative lens having a function of correcting aberrations is only one, it is then easy to make the first lens group thin.

If it is intended to achieve size reductions with a zoom lens which comprises, in order from its object side, a first lens group of positive refracting power and a second lens group of negative refracting power and further comprises a third lens group of positive refracting power on an image side with respect to the second lens group, as is the case with the inventive basic arrangement, it is then required for the first lens group to have stronger power.

For this reason, the surfaces in general, and the object-side surface in particular of the positive lens in the first lens group is likely to decrease in the paraxial radius of curvature (absolute value).

Usually in the first lens group having positive power, the positive lens has low dispersion because of the need of correcting it for chromatic aberrations.

However, as the paraxial radius of curvature of the surface(s) of the positive lens becomes small, there are higher-order aberrations likely to occur. In particular, the degree of dispersion affects the occurrence of chromatic aberrations. The influence of chromatic aberrations grows larger with distances from on optical axis and as the angle of view grows wider at the wide-angle end. In an attempt to obtain a wider-angle, higher-zoom-ratio zoom lens, it is thus difficult to place various aberrations at the telephoto end and chromatic aberration of magnification at the wide-angle end in good conditions.

In other words, for the purpose of balancing the amount of aberrations produced at the positive lens well against that at the negative lens, it is of vital importance to optimize the optical nature of the positive lens, because it works for a wide-angle, high-zoom-ratio, small-format arrangement while making sure imaging capabilities.

The invention is characterized in that the at least one positive lens in the first lens group satisfies the above conditions (1) and (2) with respect to the refractive index and Abbe constant.

Abiding by the lower limit of 1.80 to condition (1) works for slimming down the positive lens and reducing various aberrations such as off-axis chromatic aberration of magnification, because of making sure the refractive index of the positive lens thereby facilitating tight control of the curvature of the surfaces of the positive lens. It also facilitates reducing various aberrations of the positive lens itself, thereby balancing them well against various aberrations such as spherical aberrations and coma produced at the negative lens.

Abiding by the upper limit of 2.00 to condition (1) works for cutting down the cost of lens material. It also prevents the refractive index from growing too high, making it easy to hold back the influences of production errors of lens surfaces on aberrations.

Abiding by the lower limit of 50.0 to condition (2) works for correction of longitudinal chromatic aberration, etc. at the negative lens, because dispersion is properly held back thereby facilitating decreasing the quantity of chromatic aberrations produced at the positive lens.

Abiding by the upper limit of 70.0 to condition (2) makes sure proper dispersion, thereby facilitating holding back overcorrection of chromatic aberrations by the negative lens.

For the above reasons, it is preferable to satisfy conditions (1) and (2): it is easy to design a zoom lens that is a small-format, wide-angle, high-zoom-ratio arrangement having good enough imaging capabilities.

More preferably, condition (1) should be reduced down to $$1.80 < ndlp < 1.95 \tag{1}$$

Even more preferably, condition (1) should be reduced down to $$1.82 < ndlp < 1.90 \tag{1}$$

More preferably, condition (2) should be reduced down to $$50.0 < vdlp < 60.0 \tag{2}$$

Even more preferably, condition (2) should be reduced down to $$52.0 < vdlp < 55.0 \tag{2}$$

It is here noted that the upper and lower limit values of conditions (1) and (2) may optionally be changed without departing from the ranges defined by them. Likewise, the upper and lower limit values of conditions (3) to (11) given later may just as well be changed without departing from the ranges defined by them.

The positive lens in the first lens group should preferably be configured into a shape whose convex surface of strong power is directed toward the object side so as to achieve a wide-angle arrangement. A small angle of incidence of off-axis rays on the lens surface on the wide-angle side facilitates holding back the occurrence of off-axis aberrations on the wide-angle side. It is then preferable to satisfy condition (3):

$$-5.0 < SFlp < -0.05 \tag{3}$$

SFlp here is defined as SFlp=(Rlpf+Rlpr)/(Rlpf−Rlpr) where
Rlpf is the paraxial radius of curvature of the object-side surface of the aforesaid at least one positive lens in the first lens group, and
Rlpr is the paraxial radius of curvature of the image-side surface of the aforesaid at least one positive lens in the first lens group.

Abiding by the lower limit of −5.0 to condition (3) works for reducing higher-order chromatic aberrations or the like, because the paraxial radius of curvature getting too small is avoided, so that it is easy to get hold of positive power.

Abiding by the upper limit of −0.05 to condition (3) makes sure the object-side surface of the positive lens has a proper curvature, facilitating holding back the occurrence of off-axis aberrations.

More preferably, condition (3) should be reduced down to $$-3.0 < SFlp < -0.1 \tag{3}$$

Even more preferably, condition (3) should be reduced down to $$-1.5 < SFlp < -0.75 \tag{3}$$

Even one single positive lens in the first lens group contributes to aberration reductions and thickness reductions by the satisfaction of the above conditions. If the first lens group is made up of a few lenses or two lenses: one negative lens and one positive lens, it then works for compactness in the optical axis and diametrical directions. Preferably at this time, the first lens group is made up of, in order from the object side, the negative lens and the positive lens. It is then possible to make the curvature of the opposite surfaces so tight that various aberrations produced at the positive lens can well be corrected by the negative lens.

The first lens group may just as well be made up of a cemented lens wherein the negative and positive lenses are cemented together. That cemented lens allows for efficient correction of longitudinal chromatic aberration likely to occur at the time the focal length at the telephoto end grows long as the zoom ratio grows high. It also allows for reducing deterioration of optical performance due to relative decentration of the lenses resulting from assembly errors, working for yield improvements and cost reductions.

Alternatively, the first lens group may be made up of independent lens components: the negative lens is separate from the positive lens. This lens arrangement works for correction of distortion and coma at the wide-angle end and coma at the telephoto end.

When the first lens group is made up of two lenses: negative and positive, it is preferable that there are differences in the refractive index and Abbe constant between the negative lens and the positive lens for the purpose of reducing monochromatic aberrations and chromatic aberrations or achieving good enough aberration performance while allowing the first lens group to have a relatively strong positive power. Regarding an optical material in general, on the other hand, the refractive index tends to go low as the Abbe constant grows large.

It is therefore preferable for the negative and positive lenses to satisfy conditions (5) and (6) with respect to their material:

$$0.001 < ndln - ndlp < 0.50 \tag{5}$$

$$20.0 < vdlp - vdln < 55.0 \tag{6}$$

where ndln is the d-line refractive index of the negative lens in the first lens group, and vdln is the Abbe constant of the negative lens in the first lens group.

Abiding by the lower limit of 0.001 to condition (5) works for reducing various aberrations in general, and coma in particular at the telephoto end, because the refractive index of the negative lens in the first lens group is so ensured that the curvature of the surfaces of that negative lens is tightly controlled.

Abiding by the upper limit of 0.50 to condition (5) works for offering a sensible balance between getting hold of the function of correcting aberrations and reducing material cost, because the refractive index of the negative lens is prevented from growing too high while making sure the refractive index of the positive lens in the first lens group.

Abiding by the lower limit of 20.0 to condition (6) facilitates correction of chromatic aberrations within the first lens group, because the difference in dispersion between the positive lens and the negative lens is ensured while making sure the refractive index of the positive lens in the first lens group.

Abiding by the upper limit of 55.0 to condition (6) contributes to getting hold of the function of correcting chromatic aberrations and reducing material cost, because the dispersion of the negative lens is prevented from growing too excessive while making sure the proper dispersion of the positive lens.

More preferably, condition (5) should be reduced down to:

$$0.05 < ndln - ndlp < 0.40 \quad (5)'$$

Even more preferably, condition (5) should be reduced down to:

$$0.05 < ndln - ndlp < 0.20 \quad (5)''$$

More preferably, condition (6) should be reduced down to:

$$25.0 < vdlp - vdln < 47.0 \quad (6)'$$

Even more preferably, condition (6) should be reduced down to:

$$30.0 < vdlp - vdln < 35.0 \quad (6)''$$

For the first lens group, it is further preferable to satisfy the following condition (7) with respect to power:

$$0.20 < f1/ft < 1.00 \quad (7)$$

where f1 is the focal length of the first lens group, and ft is the focal length of the whole zoom lens system at the telephoto end.

Abiding by the lower limit of 0.20 to condition (7) allows the power of the first lens group to be properly set so that spherical aberrations and coma are held back to make sure good enough imaging capabilities.

Abiding by the upper limit of 1.00 to condition (7) allows the power of the first lens group to be ensured, and so works for reducing the full length of the whole zoom lens system and the thickness of that upon received in a lens mount.

More preferably, condition (7) should be reduced down to:

$$0.40 < f1/ft < 0.95 \quad (7)'$$

Even more preferably, condition (7) should be reduced down to:

$$0.62 < f1/ft < 0.85 \quad (7)''$$

For the second lens group, it is further preferable to satisfy the following condition with respect to power:

$$0.02 < |f2/ft| < 0.50 \quad (8)$$

where f2 is the focal length of the second lens group, and ft is the focal length of the whole zoom lens system at the telephoto end.

This condition is about the balance between size reductions and aberration performance. Abiding by the lower limit of 0.02 to condition (8) allows the negative power of the second lens group to be properly set so that the occurrence of off-axis various aberrations on the wide-angle side and spherical aberrations on the telephoto side can easily be held back.

Abiding by the upper limit of 0.50 to condition (8) allows the negative power of the second lens group to be ensured; so it works for making sure the angle of view and high zoom ratios at the wide-angle end, and size reductions of the whole zoom lens system as well.

More preferably, condition (8) should be reduced down to:

$$0.08 < |f2/ft| < 0.36 \quad (8)'$$

Even more preferably, condition (8) should be reduced down to:

$$0.12 < |f2/ft| < 0.16 \quad (8)''$$

The inventive zoom lens may as well be set up in the form of a four-group zoom lens comprising, in order from its object side, a first lens group of positive refracting power, a second lens group of negative refracting power, a third lens group of positive refracting power, and a fourth lens group of positive refracting power.

The location of the fourth lens group having positive refracting power makes it easy to space an exit pupil away from an image plane, thereby reducing shadings.

Preferably in this case, the four-group zoom lens further comprises an aperture stop between the aforesaid second lens group and the aforesaid fourth lens group, and upon zooming from the wide-angle end to the telephoto end, the first lens group moves such that it is positioned more on the object side at the telephoto end than at the wide-angle end; the second lens group moves; the third lens group moves such that it is positioned more on the object side at the telephoto end than at the wide-angle end; the fourth lens group moves; and the aperture stop moves such that it is positioned more on the object side at the telephoto end than at the wide-angle end.

Shortening the whole zoom lens length at the wide-angle end contributes well to reductions in the size of the first lens group in the diametrical direction. Such movement of each lens group as described above works for making sure the desired zoom ratios and reducing fluctuations of aberrations and pupil position.

Upon zooming from the wide-angle end to the telephoto end, the first lens group may as well move toward the object side only, or move in a convex locus toward the object or image side.

Upon zooming from the wide-angle end to the telephoto end, the second lens group may as well move toward the object side only, or move in a convex locus toward the object or image side.

Upon zooming from the wide-angle end to the telephoto end, the third lens group may as well move toward the object side only, or move in a convex locus toward the object side.

Upon zooming from the wide-angle end to the telephoto end, the fourth lens group may as well move such that it is positioned more on the object or image side at the telephoto end than at the wide-angle end. Alternatively, it may move monotonously in one direction only, or move in a convex locus toward the object or image side.

Further, the inventive zoom lens should preferably satisfy the following condition (9):

$$4.0 < ft/fw < 40.0 \quad (9)$$

where ft is the focal length of the whole zoom lens system at the telephoto end, and fw is the focal length of the whole zoom lens system at the wide-angle end.

It is preferable to abide by the lower limit of 4.0 to condition (9), because of resulting in a wide-angle, high-zoom-ratio zoom lens that has the desired zoom ratio and takes full advantage of the invention.

It is preferable to abide by the upper limit of 40.0 to condition (9), because of resulting in a wide-angle, high-zoom-ratio zoom lens that is well balanced among size, imaging capabilities, how many times it is used by an operator, cost, and so on.

More preferably, condition (9) should be reduced down to:

$$6.5 < ft/fw < 30.0 \quad (9)$$

Even more preferably, condition (9) should be reduced down to:

$$9.5 < ft/fw < 12.0 \quad (9)$$

Preferably, any one of the above zoom lenses is used on imaging apparatus such as digital cameras, because of their improved performance. More specifically, the imaging apparatus comprises a zoom lens and an imaging device that is located on the image side of that zoom lens and adapted to convert an image formed through that zoom lens into electric signals, and is characterized in that the zoom lens is defined by any one of the above zoom lenses.

More preferably, the thickness of the first lens group should be reduced as much as possible within a proper range, because the zoom lens can be more slimmed down in the thickness direction upon received in a lens mount. The height of rays incident on the zoom lens can also be lowered, leading to reductions in the diametrical size of the zoom lens. More specifically, it is preferable to satisfy the following condition (4):

$$0.40 < \Sigma dlG/Im < 3.00 \quad (4)$$

where $\Sigma dlg$ is the thickness on the optical axis of the first lens group, and Im is half the diagonal length of an effective imaging area of the imaging device, provided that when that effective imaging area is variable, it is the greatest possible value.

Abiding by the lower limit of 0.40 to condition (4) makes sure the thickness on the optical axis of the first lens group, working for making sure the refracting power of the first lens group and lens processing due to the ensured lens thickness.

Abiding by the upper limit of 3.00 to condition (4) makes it easy to reduce the size and weight of the first lens group, working for slimming down the zoom lens upon received in a lens mount.

More preferably, condition (4) should be reduced down to:

$$0.70 < \Sigma dlG/Im < 2.10 \quad (4)$$

Even more preferably, condition (4) should be reduced down to:

$$0.90 < \Sigma dlG/Im < 1.25 \quad (4)$$

For the inventive zoom lens, it is further preferable to satisfy the following condition (10):

$$0.50 < Im/fw < 1.00 \quad (10)$$

where Im is half the diagonal length of an effective imaging area of the imaging device, provided that when that effective imaging area is variable, it is the greatest possible value, and fw is the focal length of the whole zoom lens system at the wide-angle end.

Given the lower limit of 0.50 to condition (10), the shortened focal length of the zoom lens at the wide-angle end spells some effects (for instance, a large number of people can be shot at a short object distance).

Given the upper limit of 1.00 to condition (10), the focal length of the zoom lens is prevented from getting too short; it is easy to design a zoom lens having high zoom ratios.

More preferably, condition (10) should be reduced down to $$0.60 < Im/fw < 0.95 \quad (10)$$

Even more preferably, condition (10) should be reduced down to $$0.70 < Im/fw < 0.80 \quad (10)$$

For the total lens length, it is preferable to satisfy the following condition (11):

$$5.0 < Lt/Im < 17.5 \quad (11)$$

where Lt is the total length of the whole zoom lens system at the telephoto end, and Im is half the diagonal length of an effective imaging area of the imaging device, provided that when that effective imaging area is variable, it is the greatest possible value.

Given the lower limit of 5.0 to condition (11), the refracting power of each lens group can be kept small so that the occurrence of various aberrations can easily be reduced.

Given the upper limit of 17.5 to condition (11), the size of the lens barrel upon received in a lens mount can easily be reduced.

More preferably, condition (11) should be reduced down to $$8.0 < Lt/Im < 17.2 \quad (11)$$

More preferably, condition (11) should be reduced down to $$14.0 < Lt/Im < 17.0 \quad (11)$$

Preferably, the inventive imaging apparatus further comprises an image transformation block adapted to transform electric signals including distortion from the zoom lens into image signals with corrected distortion by way of imaging processing. Allowance of distortion from the zoom lens works more for reducing the number of lenses and the size of the zoom lens.

In any one of the aforesaid inventions, when the zoom lens has a focusing function, the conditions are supposed to have values upon focusing on the farthest distance.

More preferably, any one of the aforesaid inventions should satisfy a plurality of conditions at the same time.

The respective conditions may have values defined by the upper or lower limit of the conditions for which only the lower or upper limit is more tightly limited.

As can be appreciated from the foregoing, the present invention can provide a zoom lens that has a lens group of positive refracting power located nearest to the object side, and works more for size reductions and making sure optical performance, and an imaging apparatus comprising the same.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

FIG. 15 is an aberration diagram for Example 2 upon focusing on an object point at infinity.

FIG. 17 is an aberration diagram for Example 4 upon focusing on an object point at infinity.

FIG. 23 is an aberration diagram for Example 10 upon focusing on an object point at infinity.

FIG. 31 is a block diagram illustrative of the construction of internal circuits in part of the digital camera of FIG. 28.

DESCRIPTION OF EXEMPLARY EMBODIMENTS

In the following examples that underlie the invention, there is a zoom lens optical system provided, which, through such contrivances as described above, meets simultaneously the requirements for a downsized arrangement and a wide-angle, higher-zoom-ratio arrangement for cameras that satisfy users demands for taking scenes wider than ever before without detrimental to the ability of cameras to be carried around, enables the quality of taken images to be well maintained, and lends itself to electronic imaging devices such as CCDs or CMOSs.

The following examples are each directed to an imaging apparatus incorporating a zoom lens of the type wherein lenses are let out at the startup. More exactly, Examples 1 to 13 each provide a zoom lens having higher optical performance and improved in terms of compactness. Throughout Examples 1 to 13, the effective imaging area is of constant rectangular shape in all zooming states. In the respective examples, the values for the specific conditions have been found at the time of focusing on an object point at infinity. Total Length is the axial distance from the entrance surface to the exit surface of the zoom lens plus a back focus as calculated on an air basis.

The zoom lenses of the invention are now explained with reference to Examples 1 to 13. FIGS. 1 to 13 are illustrative in lens arrangement section of Examples 1 to 13 at the wide-angle end (a), at the point of change on the wide-angle side (b), in the intermediate setting (c) (where the first lens group is positioned nearest to the image side), at the point of change on the telephoto side (d) and at the telephoto end (e) upon focusing on an object point at infinity. Throughout FIGS. 1 to 13, G1 stands for the first lens group; G2 the second lens group; S the aperture stop; G3 the third lens group; G4 the fourth lens group; F an optical low-pass filter, C the cover glass of a CCD that is an electronic imaging device; and I the image plane of the CCD. Note here that for a near infrared sharp cut coating, for instance, it may be coated directly on the optical low-pass filter F or, alternatively, there may be another infrared cut absorption filter located.

Figure 1:
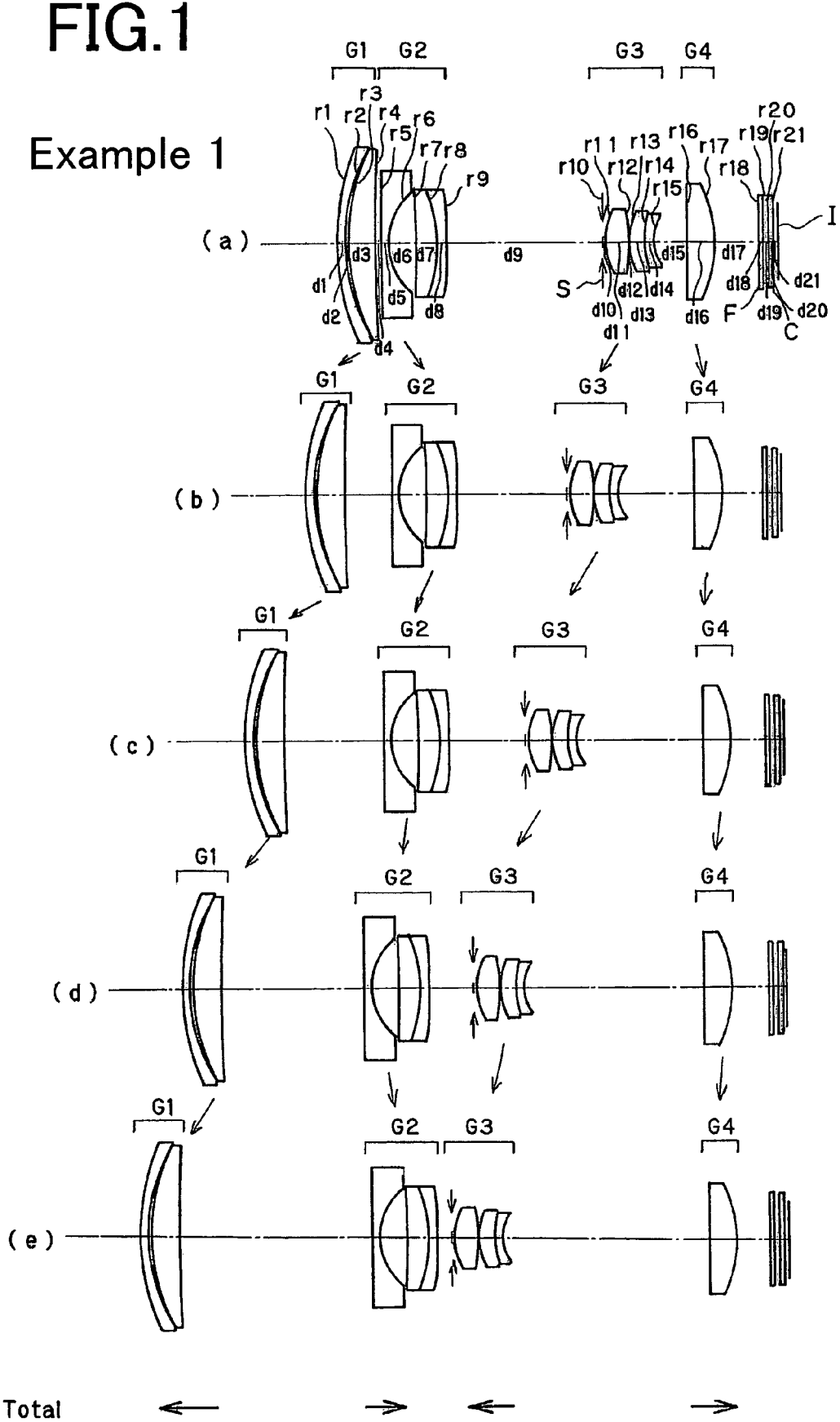
FIG. 1 is illustrative in lens arrangement section of Example 1 of the inventive zoom lens at a wide-angle end (a), at a point of change on a wide-angle side (b), in an intermediate setting (c), at a point of change on a telephoto side (d) and at a telephoto end (e) upon focusing on an object point at infinity.

Example 1 is directed to a zoom lens made up of, in order from its object side, the first lens group G1 of positive refracting power, the aperture stop S, the second lens group G2 of negative refracting power, the third lens group G3 of positive refracting power and the fourth lens group G4 of negative refracting power, as shown in FIG. 1.

Upon zooming from the wide-angle end to the telephoto end, the respective lens groups move as follows.

The first lens group G1 moves toward the object side from the wide-angle end to the telephoto end.

From the wide-angle end to the point of change on the wide-angle side, the second lens group G2 moves toward the image side while the spacing between the first lens group G1 and it grows wide and the spacing between it and the third lens group G3 becomes narrow; from the point of change on the wide-angle side to the point of change on the telephoto side, it moves toward the object side while the spacing between the first lens group G1 and it grows wide and the spacing between it and the third lens group G3 becomes narrow; from the point of change on the telephoto side to the telephoto end, it moves toward the image side while the spacing between the first lens group G1 and it grows wide and the spacing between it and the third lens group G3 becomes narrow; from the wide-angle end to the intermediate setting, it moves in a convex locus toward the image side; and from the intermediate setting to the telephoto end, it moves in a convex locus toward the object side. At the telephoto end, the second lens group G2 is positioned a little more on the object side than at the wide-angle end and in the intermediate setting, and a little more on the image side than at the point of change on the telephoto side.

From the wide-angle end to the telephoto end, the aperture stop S and the third lens group G3 move in unison toward the object side with a decreasing spacing between the second lens group G2 and them and an increasing spacing between them and the fourth lens group G4.

From the wide-angle end to the intermediate setting, the fourth lens group G4 moves toward the image side with an increasing spacing between the third lens group G3 and it; from the intermediate setting to the point of change on the telephoto side, it moves toward the object side with an increasing spacing between the third lens group G3 and it; from the point of change on the telephoto side to the telephoto end, it moves toward the image side with an increasing spacing between the third lens group G3 and it, and from the intermediate setting to the telephoto end, it moves in a convex locus toward the object side. At the telephoto end, the fourth lens group G4 is positioned a little more on the image side than in the intermediate setting.

In order from the object side, the first lens group G1 is made up of a negative meniscus lens convex on its object side and a positive meniscus lens convex on its object side; the second lens group G2 is made up of a double-concave negative lens and a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one positive meniscus lens convex on its image side.

Six aspheric surfaces are used: two at both surfaces of the double-concave negative lens in the second lens group G2, one at the surface nearest to the image side of the cemented lens in the second lens group G2, two at both surfaces of the double-convex positive lens in the third lens group G3; one at the image-side surface of the positive meniscus lens in the fourth lens group G4.

Figure 2:
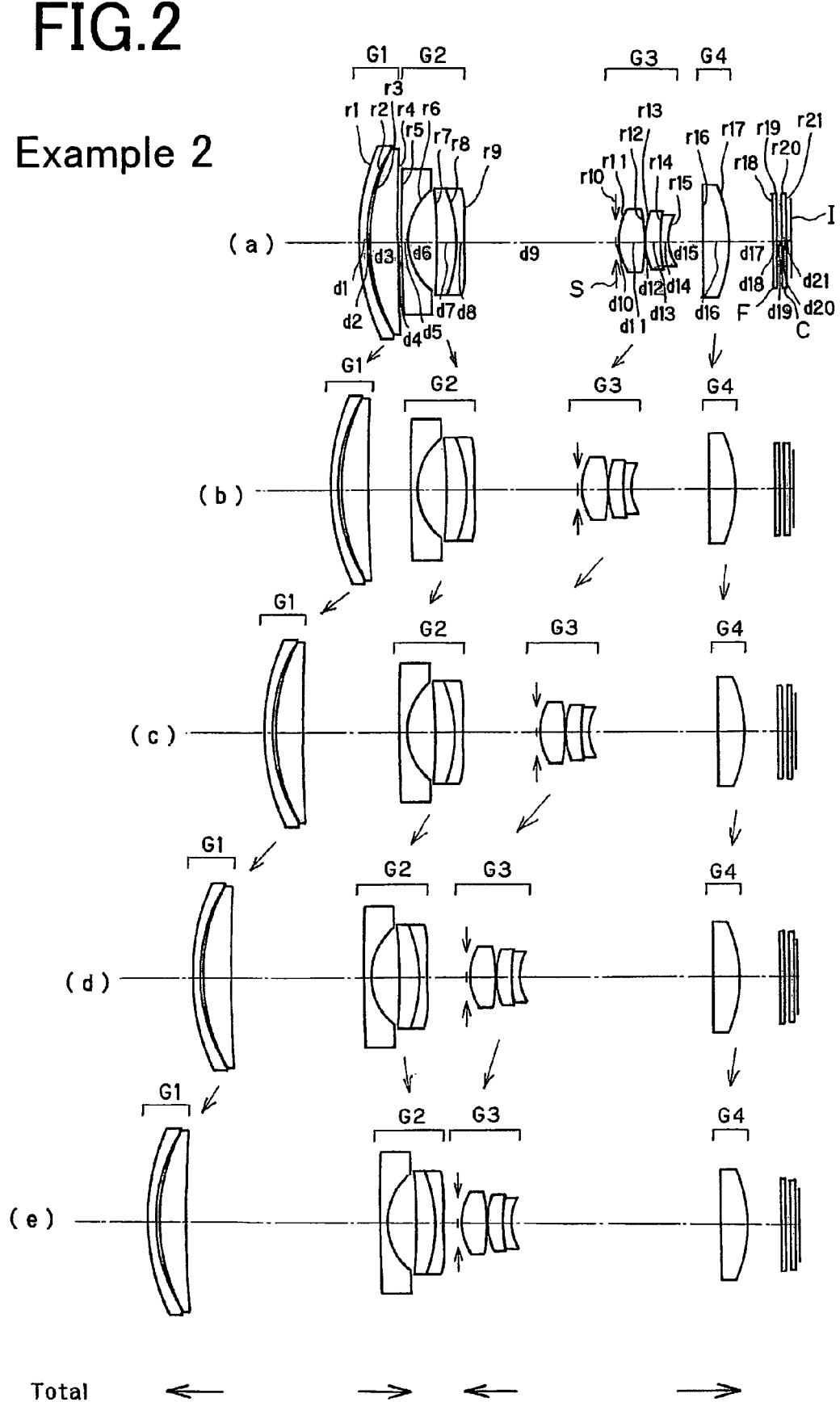
FIG. 2 is illustrative, as in FIG. 1, of Example 2 of the inventive zoom lens.

Example 2 is directed to a zoom lens made up of, in order from its object side, the first lens group G1 of positive refracting power, the aperture stop S, the second lens group G2 of negative refracting power, the third lens group G3 of positive refracting power and the fourth lens group G4 of negative refracting power, as shown in FIG. 2.

Upon zooming from the wide-angle end to the telephoto end, the respective lens groups move as follows.

The first lens group G1 moves toward the object side from the wide-angle end to the telephoto end.

From the wide-angle end to the point of change on the wide-angle side, the second lens group G2 moves toward the image side while the spacing between the first lens group G1 and it grows wide and the spacing between it and the third lens group G3 becomes narrow; from the point of change on the wide-angle side to the point of change on the telephoto side, it moves toward the object side while the spacing between the first lens group G1 and it grows wide and the spacing between it and the third lens group G3 becomes narrow; from the point of change on the telephoto side to the telephoto end, it moves toward the image side while the spacing between the first lens group G1 and it grows wide and the spacing between it and the third lens group G3 becomes narrow; from the wide-angle end to the intermediate setting, it moves in a convex locus toward the image side; and from the intermediate setting to the telephoto end, it moves in a convex locus toward the object side. At the telephoto end, the second lens group G2 is positioned a little more on the object side than at the wide-angle end and in the intermediate setting, and a little more on the image side than at the point of change on the telephoto side.

From the wide-angle end to the telephoto end, the aperture stop S and the third lens group G3 move in unison toward the object side with a decreasing spacing between the second lens group G2 and them and an increasing spacing between them and the fourth lens group G4.

From the wide-angle end to the intermediate setting, the fourth lens group G4 moves toward the image side with an increasing spacing between the third lens group G3 and it; from the intermediate setting to the point of change on the telephoto side, it moves toward the object side with an increasing spacing between the third lens group G3 and it; from the point of change on the telephoto side to the telephoto end, it moves toward the image side with an increasing spacing between the third lens group G3 and it; and from the intermediate setting to the telephoto end, it moves in a convex locus toward the object side. At the telephoto end, the fourth lens group G4 is positioned a little more on the image side than in the intermediate setting, and a little more on the image side than at the point of change on the wide-angle side and the point of change on the telephoto side.

In order from the object side, the first lens group G1 is made up of a negative meniscus lens convex on its object side and a positive meniscus lens convex on its object side; the second lens group G2 is made up of a negative meniscus lens convex on its object side and a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Six aspheric surfaces are used: two at both surfaces of the negative meniscus lens in the second lens group G2, one at the surface nearest to the image side of the cemented lens in the second lens group G2, two at both surfaces of the double-convex positive lens in the third lens group G3; one at the image-side surface of the positive meniscus lens in the fourth lens group G4.

Figure 3:
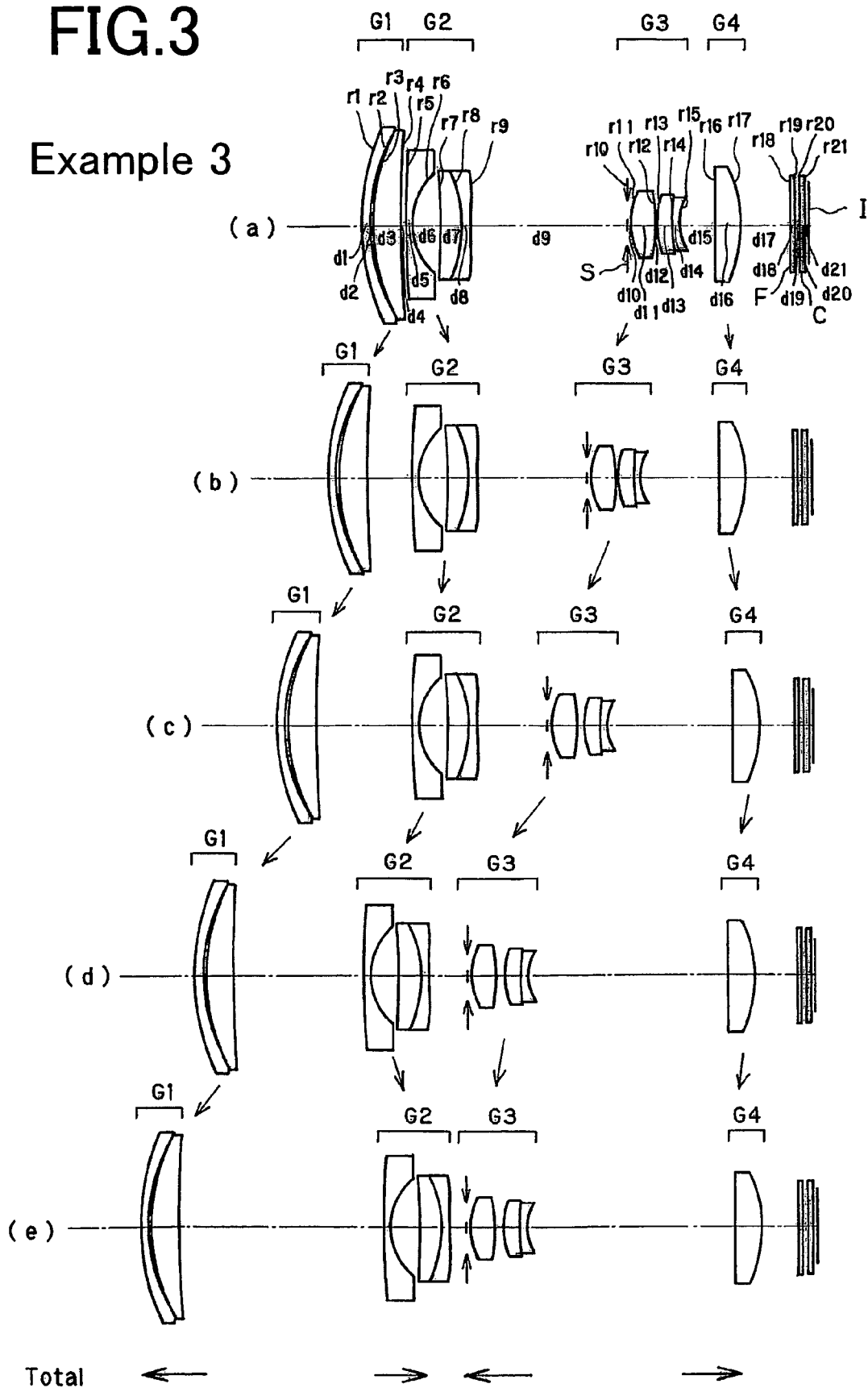
FIG. 3 is illustrative, as in FIG. 1, of Example 3 of the inventive zoom lens.

Example 3 is directed to a zoom lens made up of, in order from its object side, the first lens group G1 of positive refracting power, the aperture stop S, the second lens group G2 of negative refracting power, the third lens group G3 of positive refracting power and the fourth lens group G4 of negative refracting power, as shown in FIG. 3.

Upon zooming from the wide-angle end to the telephoto end, the respective lens groups move as follows.

The first lens group G1 moves toward the object side from the wide-angle end to the telephoto end.

From the wide-angle end to the intermediate setting, the second lens group G2 moves toward the image side while the spacing between the first lens group G1 and it grows wide and the spacing between it and the third lens group G3 becomes narrow; from the intermediate setting to the point of change on the telephoto side, it moves toward the object side while the spacing between the first lens group G1 and it grows wide and the spacing between it and the third lens group G3 becomes narrow; from the point of change on the telephoto side to the telephoto end, it moves toward the image side while the spacing between the first lens group G1 and it grows wide and the spacing between it and the third lens group G3 becomes narrow; and from the intermediate setting to the telephoto end, it moves in a convex locus toward the object side. At the telephoto end, the second lens group G2 is positioned a little more on the object side than at the wide-angle end, and a little more on the image side than at the point of change on the telephoto side.

From the wide-angle end to the telephoto end, the aperture stop S and the third lens group G3 move in unison toward the object side with a decreasing spacing between the second lens group G2 and them and an increasing spacing between them and the fourth lens group G4.

From the wide-angle end to the intermediate setting, the fourth lens group G4 moves toward the image side with an increasing spacing between the third lens group G3 and it; from the intermediate setting to the point of change on the telephoto side, it moves toward the object side with an increasing spacing between the third lens group G3 and it; and from the intermediate setting to the telephoto end, it moves in a convex locus toward the object side. At the telephoto end, the fourth lens group G4 is positioned a little more on the object side than in the intermediate setting, and a little more on the image side than at the point of change on the wide-angle side and the point of change on the telephoto side.

In order from the object side, the first lens group G1 is made up of a negative meniscus lens convex on its object side and a positive meniscus lens convex on its object side; the second lens group G2 is made up of a negative meniscus lens convex on its object side and a cemented lens of a positive meniscus lens convex on its image side and a double-concave negative lens; the third lens group G3 is made up of a double-convex positive lens and a cemented lens of a positive meniscus lens convex on its object side and a double-concave negative lens; and the fourth lens group G4 is made up of one double-convex positive lens.

Six aspheric surfaces are used: two at both surfaces of the negative meniscus lens in the second lens group G2, one at the surface nearest to the image side of the cemented lens in the second lens group G2, two at both surfaces of the double-convex positive lens in the third lens group G3; and one at the image-side surface of the double-convex positive lens in the fourth lens group G4.

Figure 4:
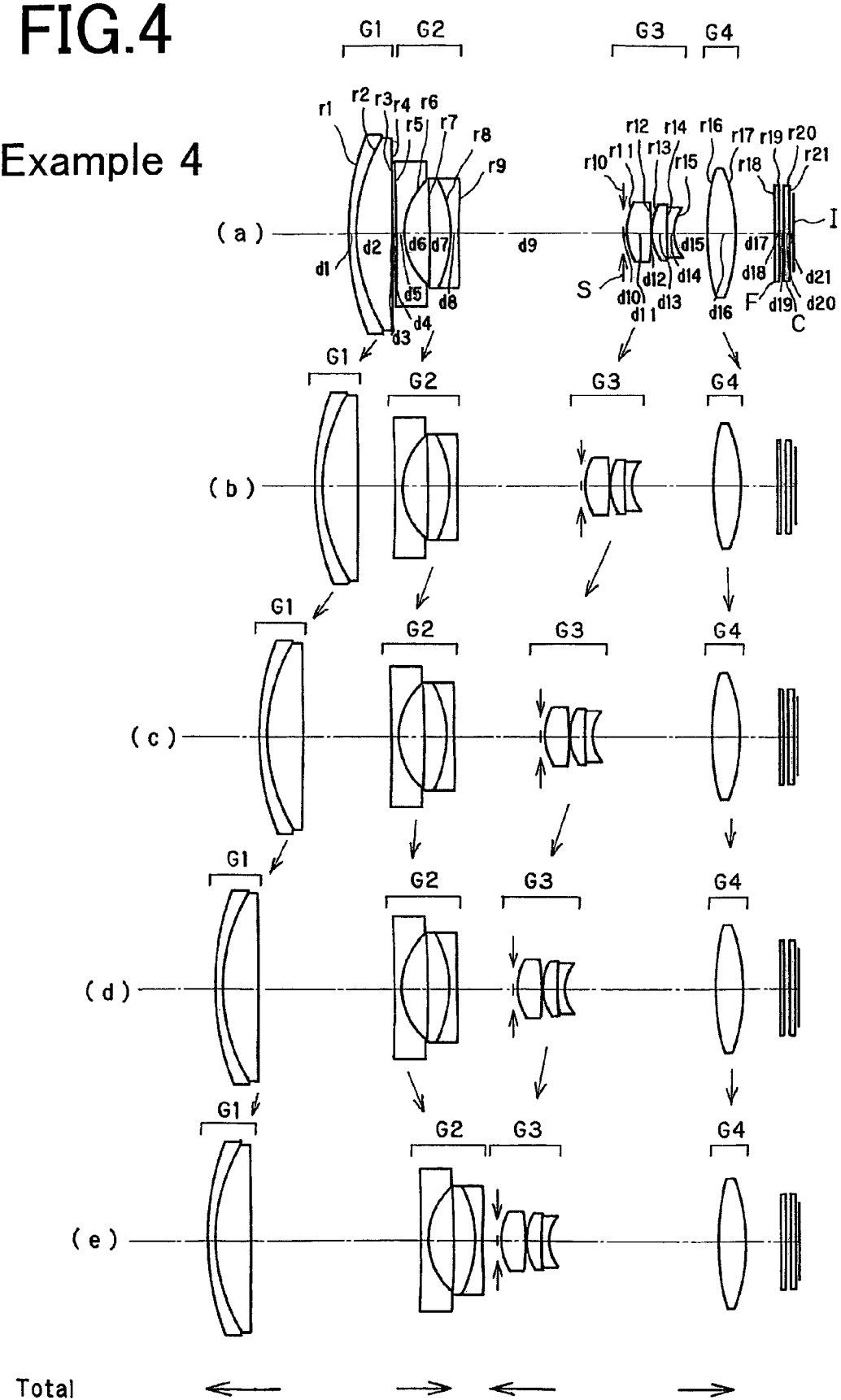
FIG. 4 is illustrative, as in FIG. 1, of Example 4 of the inventive zoom lens.

Example 4 is directed to a zoom lens made up of, in order from its object side, the first lens group G1 of positive refracting power, the aperture stop S, the second lens group G2 of negative refracting power, the third lens group G3 of positive refracting power and the fourth lens group G4 of negative refracting power, as shown in FIG. 4.

Upon zooming from the wide-angle end to the telephoto end, the respective lens groups move as follows.

The first lens group G1 moves toward the object side from the wide-angle end to the telephoto end.

From the wide-angle end to the intermediate setting, the second lens group G2 moves toward the image side while the spacing between the first lens group G1 and it grows wide and the spacing between it and the third lens group G3 becomes narrow; from the intermediate setting to the telephoto end, it moves toward the image side while the spacing between the first lens group G1 and it grows wide and the spacing between it and the third lens group G3 becomes narrow; and from the wide-angle end to the telephoto end, it moves in a convex locus toward the object side. At the telephoto end, the second lens group G2 is positioned a little more on the object side than at the wide-angle end, and a little more on the image side than at the point of change on the telephoto side.

From the wide-angle end to the telephoto end, the aperture stop S and the third lens group G3 move in unison toward the object side with a decreasing spacing between the second lens group G2 and them and an increasing spacing between them and the fourth lens group G4.

From the wide-angle end to the point of change on the wide-angle side, the fourth lens group G4 moves toward the image side with an increasing spacing between the third lens group G3 and it; from the point of change on the wide-angle side to the intermediate setting, it moves toward the object side with an increasing spacing between the third lens group G3 and it; from the intermediate setting to the telephoto end, it moves toward the image side with an increasing spacing between the third lens group G3 and it; and from the wide-angle end to the intermediate setting, it moves in a convex locus toward the image side. At the telephoto end, the fourth lens group G4 is positioned a little more on the image side than at the point of change on the wide-angle side and the point of change on the telephoto side.

In order from the object side, the first lens group G1 is made up of a cemented lens of a negative meniscus lens convex on its object side, a double-convex positive lens and a positive meniscus lens convex on its image side; the second lens group G2 is made up of a double-concave negative lens and a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Eight aspheric surfaces are used: one at the surface nearest to the image side of the cemented lens in the first lens group g1, two at both surfaces of the double-concave negative lens in the second lens group G2, one at the surface nearest to the image side of the cemented lens in the second lens group G2, two at both surfaces of the double-convex positive lens in the third lens group G3; and two at both surfaces of the double-convex positive lens in the fourth lens group G4.

Figure 5:
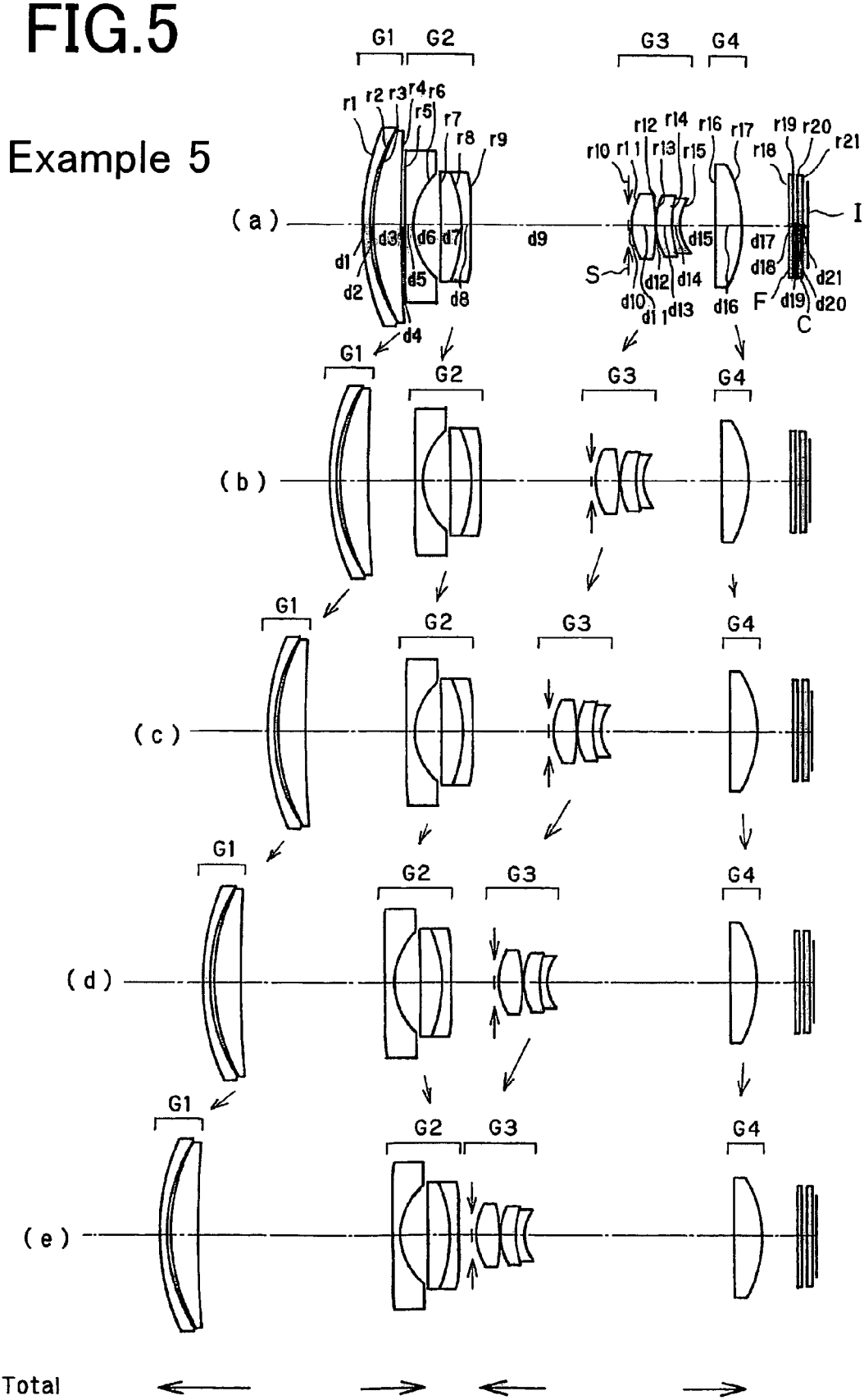
FIG. 5 is illustrative, as in FIG. 1, of Example 5 of the inventive zoom lens.

Example 5 is directed to a zoom lens made up of, in order from its object side, the first lens group G1 of positive refracting power, the aperture stop S, the second lens group G2 of negative refracting power, the third lens group G3 of positive refracting power and the fourth lens group G4 of negative refracting power, as shown in FIG. 5.

Upon zooming from the wide-angle end to the telephoto end, the respective lens groups move as follows.

The first lens group G1 moves toward the object side from the wide-angle end to the telephoto end.

From the wide-angle end to the point of change on the wide-angle side, the second lens group G2 moves toward the image side while the spacing between the first lens group G1 and it grows wide and the spacing between it and the third lens group G3 becomes narrow; from the point of change on the wide-angle side to the point of change on the telephoto side, it moves toward the object side while the spacing between the first lens group G1 and it grows wide and the spacing between it and the third lens group G3 becomes narrow; from the point of change on the telephoto side to the telephoto end, it moves toward the image side while the spacing between the first lens group G1 and it grows wide and the spacing between it and the third lens group G3 becomes narrow; from the wide-angle end to the intermediate setting, it moves in a convex locus toward the image side; and from the intermediate setting to the telephoto end, it moves in a convex locus toward the object side. At the telephoto end, the second lens group G2 is positioned a little more on the object side than at the wide-angle end and in the intermediate setting, and a little more on the image side than at the point of change on the telephoto side.

From the wide-angle end to the telephoto end, the aperture stop S and the third lens group G3 move in unison toward the object side with a decreasing spacing between the second lens group G2 and them and an increasing spacing between them and the fourth lens group G4.

From the wide-angle end to the intermediate setting, the fourth lens group G4 moves toward the image side with an increasing spacing between the third lens group G3 and it; from the intermediate setting to the point of change on the telephoto side, it moves toward the object side with an increasing spacing between the third lens group G3 and it; from the point of change on the telephoto side to the telephoto end, it moves toward the image side with an increasing spacing between the third lens group G3 and it; and from the intermediate setting to the telephoto end, it moves in a convex locus toward the object side. At the telephoto end, the fourth lens group G4 is positioned a little more on the image side than in the intermediate setting.

In order from the object side, the first lens group G1 is made up of a negative meniscus lens convex on its object side and a positive meniscus lens convex on its object side; the second lens group G2 is made up of a double-concave negative lens and a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Six aspheric surfaces are used: two at both surfaces of the double-concave negative lens in the second lens group G2, one at the surface nearest to the image side of the cemented lens in the second lens group G2, two at both surfaces of the double-convex positive lens in the third lens group G3, and one at the image-side surface of the double-convex positive lens in the fourth lens group G4.

Figure 6:
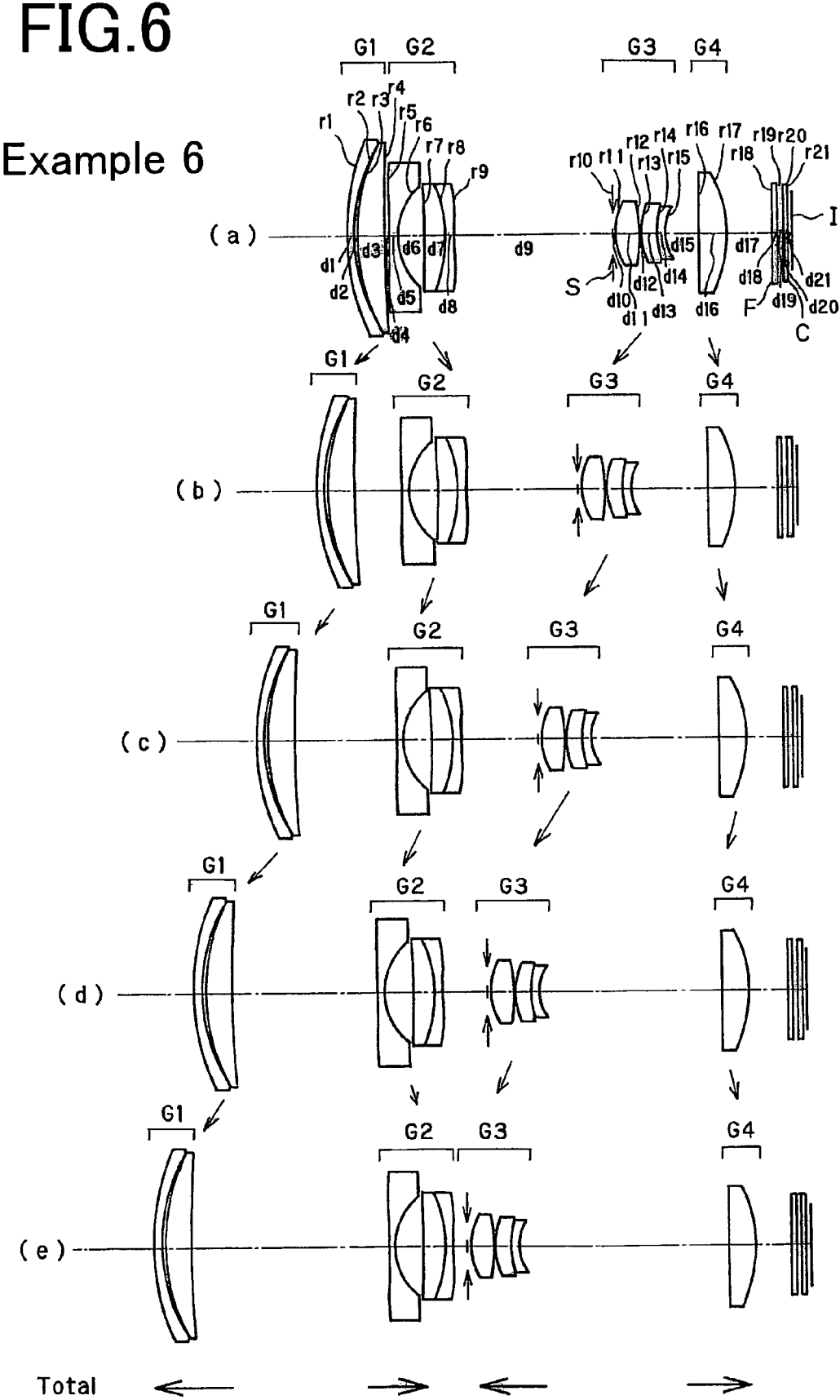
FIG. 6 is illustrative, as in FIG. 1, of Example 6 of the inventive zoom lens.

Example 6 is directed to a zoom lens made up of, in order from its object side, the first lens group G1 of positive refracting power, the aperture stop S, the second lens group G2 of negative refracting power, the third lens group G3 of positive refracting power and the fourth lens group G4 of negative refracting power, as shown in FIG. 6.

Upon zooming from the wide-angle end to the telephoto end, the respective lens groups move as follows.

The first lens group G1 moves toward the object side from the wide-angle end to the telephoto end.

From the wide-angle end to the point of change on the wide-angle side, the second lens group G2 moves toward the image side while the spacing between the first lens group G1 and it grows wide and the spacing between it and the third lens group G3 becomes narrow; from the point of change on the wide-angle side to the point of change on the telephoto side, it moves toward the object side while the spacing between the first lens group G1 and it grows wide and the spacing between it and the third lens group G3 becomes narrow; from the point of change on the telephoto side to the telephoto end, it moves toward the image side while the spacing between the first lens group G1 and it grows wide and the spacing between it and the third lens group G3 becomes narrow; from the wide-angle end to the intermediate setting, it moves in a convex locus toward the image side; and from the intermediate setting to the telephoto end, it moves in a convex locus toward the object side. At the telephoto end, the second lens group G2 is positioned more on the object side than at the wide-angle end and in the intermediate setting, and a little more on the image side than at the point of change on the telephoto side.

From the wide-angle end to the telephoto end, the aperture stop S and the third lens group G3 move in unison toward the object side with a decreasing spacing between the second lens group G2 and them and an increasing spacing between them and the fourth lens group G4.

From the wide-angle end to the intermediate setting, the fourth lens group G4 moves toward the image side with an increasing spacing between the third lens group G3 and it; from the intermediate setting to the point of change on the telephoto side, it moves toward the object side with an increasing spacing between the third lens group G3 and it; from the point of change on the telephoto side to the telephoto end, it moves toward the image side with an increasing spacing between the third lens group G3 and it; and from the intermediate setting to the telephoto end, it moves in a convex locus toward the object side. At the telephoto end, the fourth lens group G4 is positioned a little more on the image side than in the intermediate setting.

In order from the object side, the first lens group G1 is made up of a negative meniscus lens convex on its object side and a positive meniscus lens convex on its object side; the second lens group G2 is made up of a double-concave negative lens and a cemented lens of a positive meniscus lens convex n its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one positive meniscus lens convex on its image side.

Six aspheric surfaces are used: two at both surfaces of the double-concave negative lens in the second lens group G2, one at the surface nearest to the image side of the cemented lens in the second lens group G2, two at both surfaces of the double-convex positive lens in the third lens group G3, and one at the image-side surface of the positive meniscus lens in the fourth lens group G4.

Figure 7:
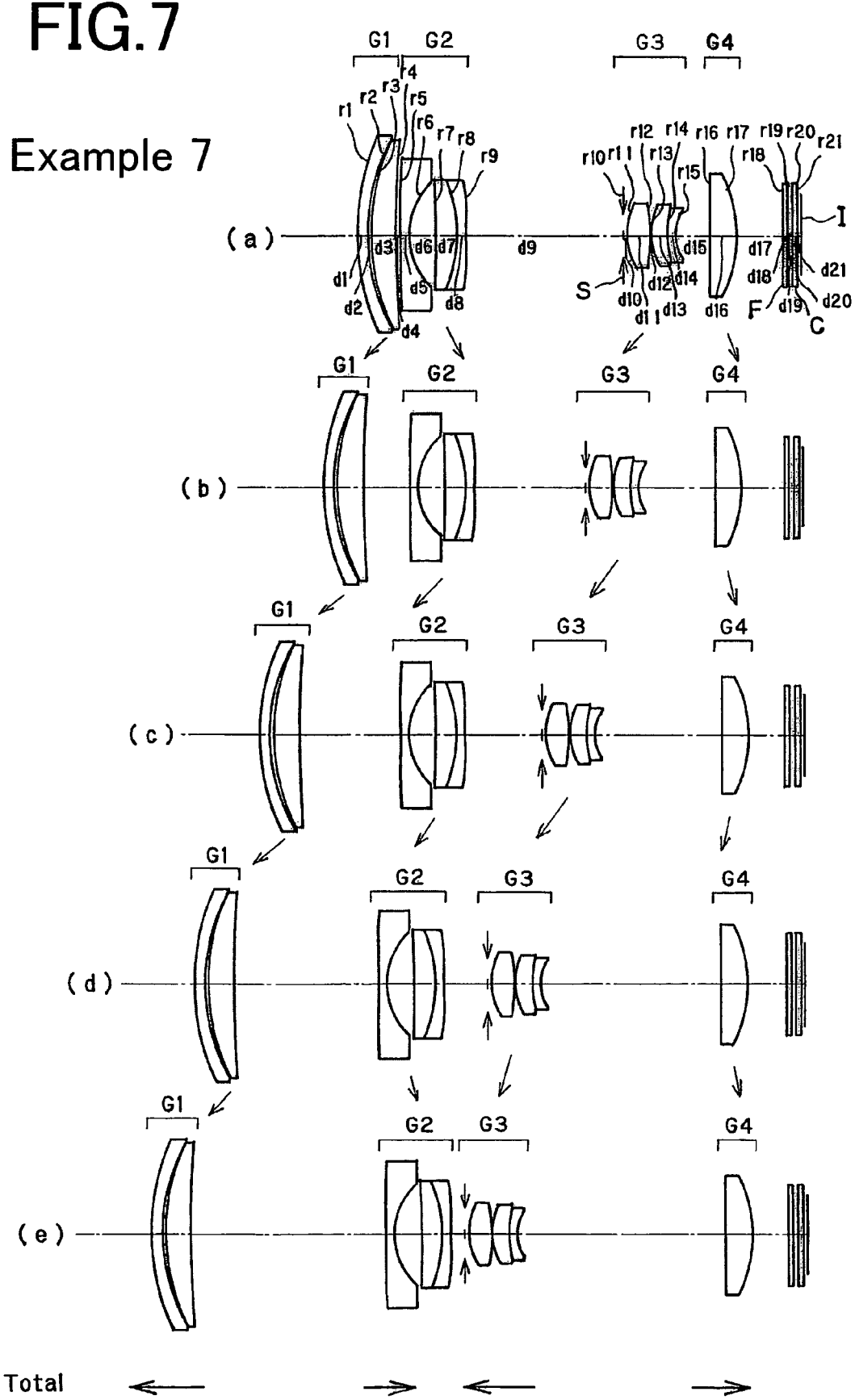
FIG. 7 is illustrative, as in FIG. 1, of Example 7 of the inventive zoom lens.

Example 7 is directed to a zoom lens made up of, in order from its object side, the first lens group G1 of positive refracting power, the aperture stop S, the second lens group G2 of negative refracting power, the third lens group G3 of positive refracting power and the fourth lens group G4 of negative refracting power, as shown in FIG. 7.

Upon zooming from the wide-angle end to the telephoto end, the respective lens groups move as follows.

The first lens group G1 moves toward the object side from the wide-angle end to the telephoto end.

From the wide-angle end to the point of change on the wide-angle side, the second lens group G2 moves toward the image side while the spacing between the first lens group G1 and it grows wide and the spacing between it and the third lens group G3 becomes narrow; from the point of change on the wide-angle side to the point of change on the telephoto side, it moves toward the object side while the spacing between the first lens group G1 and it grows wide and the spacing between it and the third lens group G3 becomes narrow; from the point of change on the telephoto side to the telephoto end, it moves toward the image side while the spacing between the first lens group G1 and it grows wide and the spacing between it and the third lens group G3 becomes narrow; from the wide-angle end to the intermediate setting, it moves in a convex locus toward the image side; and from the intermediate setting to the telephoto end, it moves in a convex locus toward the object side. At the telephoto end, the second lens group G2 is positioned more on the object side than at the wide-angle end and in the intermediate setting, and a little more on the image side than at the point of change on the telephoto side.

From the wide-angle end to the telephoto end, the aperture stop S and the third lens group G3 move in unison toward the object side with a decreasing spacing between the second lens group G2 and them and an increasing spacing between them and the fourth lens group G4.

From the wide-angle end to the intermediate setting, the fourth lens group G4 moves toward the image side with an increasing spacing between the third lens group G3 and it; from the intermediate setting to the point of change on the telephoto side, it moves toward the object side with an increasing spacing between the third lens group G3 and it; from the point of change on the telephoto side to the telephoto end, it moves toward the image side with an increasing spacing between the third lens group G3 and it; and from the intermediate setting to the telephoto end, it moves in a convex locus toward the object side. At the telephoto end, the fourth lens group G4 is positioned a little more on the image side than in the intermediate setting.

In order from the object side, the first lens group G1 is made up of a negative meniscus lens convex on its object side and a positive meniscus lens convex on its object side; the second lens group G2 is made up of a double-concave negative lens and a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one positive meniscus lens convex on its image side.

Six aspheric surfaces are used: two at both surfaces of the double-concave negative lens in the second lens group G2, one at the surface nearest to the image side of the cemented lens in the second lens group G2, two at both surfaces of the double-convex positive lens in the third lens group G3, and one at the image-side surface of the positive meniscus lens in the fourth lens group G4.

Figure 8:
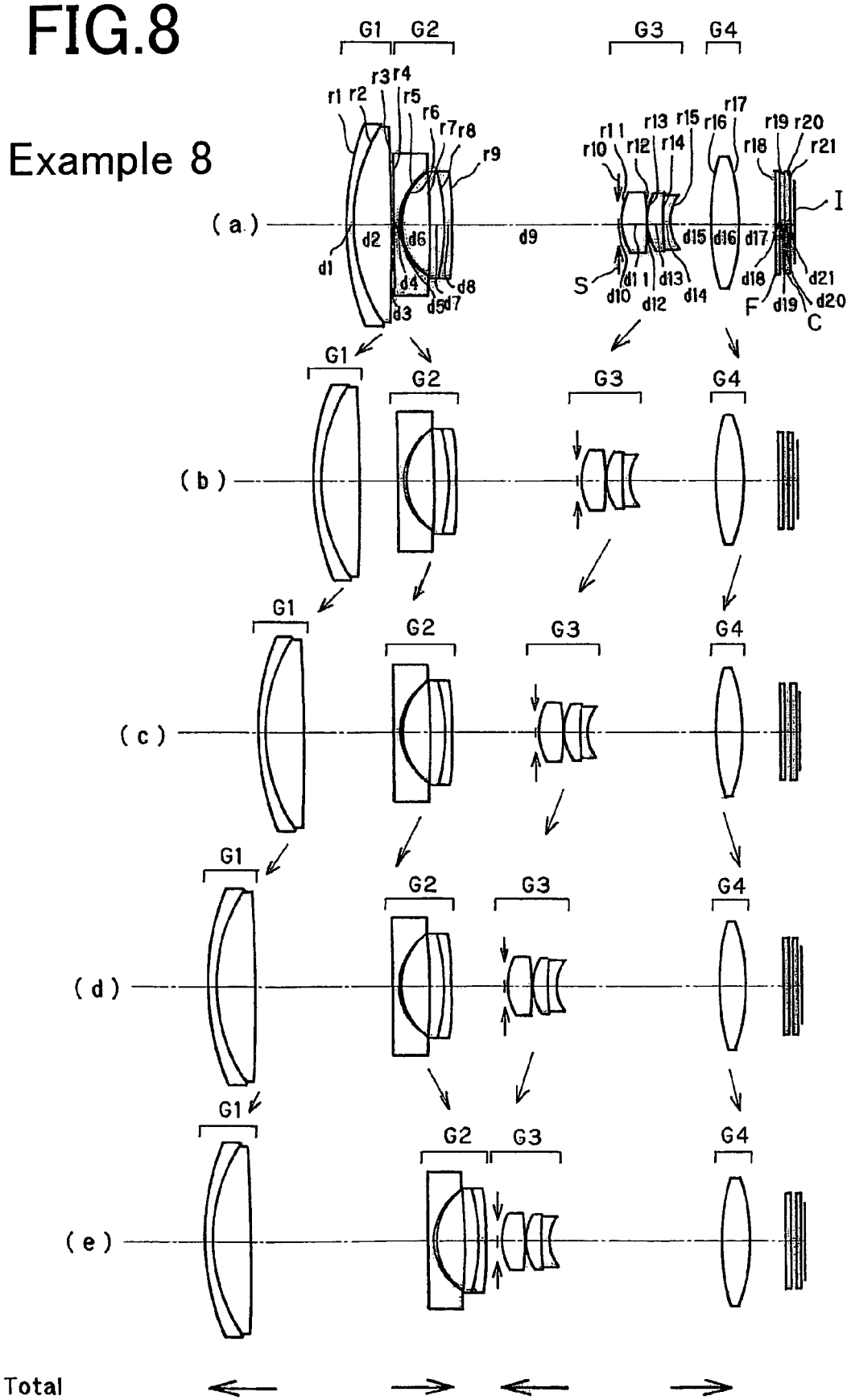
FIG. 8 is illustrative, as in FIG. 1, of Example 8 of the inventive zoom lens.

Example 8 is directed to a zoom lens made up of, in order from its object side, the first lens group G1 of positive refracting power, the aperture stop S, the second lens group G2 of negative refracting power, the third lens group G3 of positive refracting power and the fourth lens group G4 of negative refracting power, as shown in FIG. 8.

Upon zooming from the wide-angle end to the telephoto end, the respective lens groups move as follows.

The first lens group G1 moves toward the object side from the wide-angle end to the telephoto end.

From the wide-angle end to the point of change on the wide-angle side, the second lens group G2 moves toward the image side while the spacing between the first lens group G1 and it grows wide and the spacing between it and the third lens group G3; from the point of change on the wide-angle side to the point of change on the telephoto side, it moves toward the object side while the spacing between the first lens group G1 and it grows wide and the spacing between it and the third lens group G3 becomes narrow; from the point of change on the telephoto side to the telephoto end, it moves toward the image side while the spacing between the first lens group G1 and it grows wide and the spacing between it and the third lens group G3 becomes narrow; from the wide-angle end to the intermediate setting, it moves in a convex locus toward the image side; and from the intermediate setting to the telephoto end, it moves in a convex locus toward the object side. At the telephoto end, the second lens group G2 is positioned more on the image side than at the point of change on the telephoto side.

From the wide-angle end to the telephoto end, the aperture stop S and the third lens group G3 move in unison toward the object side with a decreasing spacing between the second lens group G2 and them and an increasing spacing between them and the fourth lens group G4.

From the wide-angle end to the point of change on the wide-angle side, the fourth lens group G4 moves toward the image side with an increasing spacing between the third lens group G3 and it; from the point of change on the wide-angle side to the intermediate setting, it moves toward the object side with an increasing spacing between the third lens group G3 and it; from the intermediate setting to the telephoto end, it moves toward the image side with an increasing spacing between the third lens group G3 and it; and from the wide-angle end to the intermediate setting, it moves in a convex locus toward the image side. At the telephoto end, the fourth lens group G4 is positioned a little more on the object side than at the point of change on the wide-angle side, and a little more on the image side than at the wide-angle end and the point of change on the telephoto side.

In order from the object side, the first lens group G1 is made up of a cemented lens of a negative meniscus lens convex on its object side and a double-convex positive lens; the second lens group G2 is made up of a cemented lens of a double-concave negative lens and a positive meniscus lens convex on its object side as well as a cemented lens of a positive meniscus lens convex on its image side and a negative meniscus lens convex on its image side; the third lens group G3 is made up of a double-convex positive lens and a cemented lens of a positive meniscus lens convex in its object side and a negative meniscus lens convex on its object side; and the fourth lens group G4 is made up of one double-convex positive lens.

Eight aspheric surfaces are used: one at the surface nearest to the image side of the cemented lens in the first lens group G1, one at the surface nearest to the object side, and the image side, of the object-side cemented lens in the second lens group G2, one at the surface nearest to the image side of the image-side cemented lens in the second lens group G2, two at both surfaces of the double-convex positive lens in the third lens group G3, and two at both surfaces of the double-convex positive lens in the fourth lens group G4.

Figure 9:
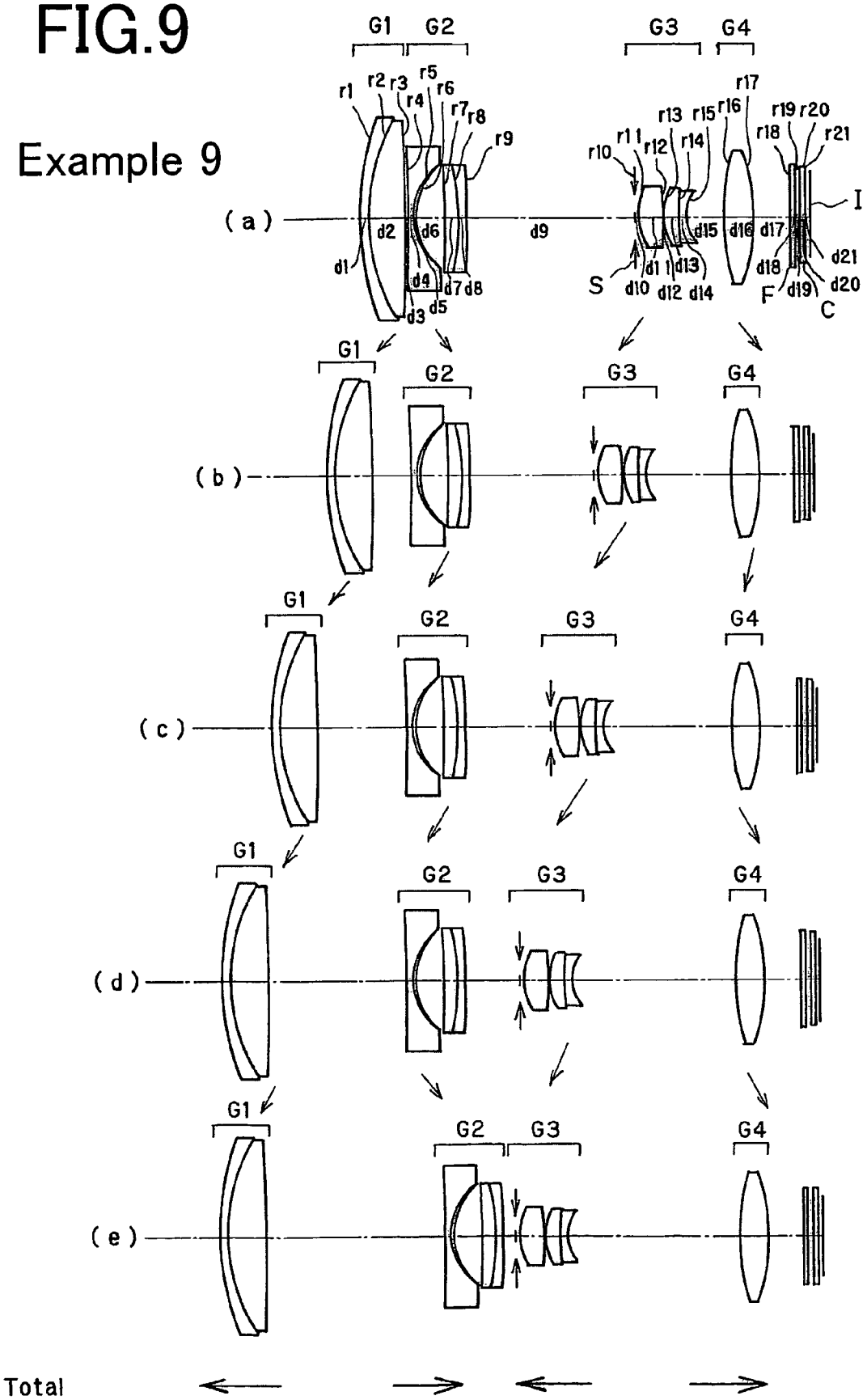
FIG. 9 is illustrative, as in FIG. 1, of Example 9 of the inventive zoom lens.

Example 9 is directed to a zoom lens made up of, in order from its object side, the first lens group G1 of positive refracting power, the aperture stop S, the second lens group G2 of negative refracting power, the third lens group G3 of positive refracting power and the fourth lens group G4 of negative refracting power, as shown in FIG. 9.

Upon zooming from the wide-angle end to the telephoto end, the respective lens groups move as follows.

The first lens group G1 moves toward the object side from the wide-angle end to the telephoto end.

From the wide-angle end to the point of change on the wide-angle side, the second lens group G2 moves toward the image side while the spacing between the first lens group G1 and it grows wide and the spacing between it and the third lens group G3 becomes narrow; from the point of change on the wide-angle side to the point of change on the telephoto side, it moves toward the object side while the spacing between the first lens group G1 and it grows wide and the spacing between it and the third lens group G3 becomes narrow; from the point of change on the telephoto side to the telephoto end, it moves toward the image side while the spacing between the first lens group G1 and it grows wide and the spacing between it and the third lens group G3 becomes narrow; from the wide-angle end to the intermediate setting, it moves in a convex locus toward the image side; and from the intermediate setting to the telephoto end, it moves in a convex locus toward the object side. At the telephoto end, the second lens group G2 is positioned more on the image side than at the point of change on the wide-angle side.

From the wide-angle end to the telephoto end, the aperture stop S and the third lens group G3 move in unison toward the object side with a decreasing spacing between the second lens group G2 and them and an increasing spacing between them and the fourth lens group G4.

From the wide-angle end to the point of change on the wide-angle side, the fourth lens group G4 moves toward the image side with an increasing spacing between the second lens group G3 and it; from the point of change on the wide-angle side to the intermediate setting, it moves toward the object side with an increasing spacing between the third lens group G3 and it; from the intermediate setting to the telephoto end, it moves toward the image side with an increasing spacing between the third lens group G3 and it; and from the wide-angle end to the intermediate setting, it moves in a convex locus toward the image side. At the telephoto end, the fourth lens group G4 is positioned at the same point as the point of change on the wide-angle side, and a little more on the image side than at the point of change on the telephoto side.

In order from the object side, the first lens group G1 is made up of a cemented lens of a negative meniscus lens convex on its object side and a double-convex positive lens; the second lens group G2 is made up of a cemented lens of a double-concave negative lens and a positive meniscus lens convex on its object side as well as a cemented lens of a positive meniscus lens convex on its image side and a double-concave negative lens; the third lens group G3 is made up of a cemented lens of a positive meniscus lens convex on its object side and a negative meniscus lens convex on its object side; and the fourth lens group G4 is made up of one double-convex positive lens.

Seven aspheric surfaces are used: one at the surface nearest to the image side of the cemented lens in the first lens group G1, one at the surface nearest to the image side of the object-side cemented lens in the second lens group G2, one at the surface nearest to the image side of the image-side cemented lens in the second lens group G2, two at both surfaces of the double-convex positive lens in the third lens group G3, and two at both surfaces of the double-convex positive lens in the fourth lens group G4.

Figure 10:
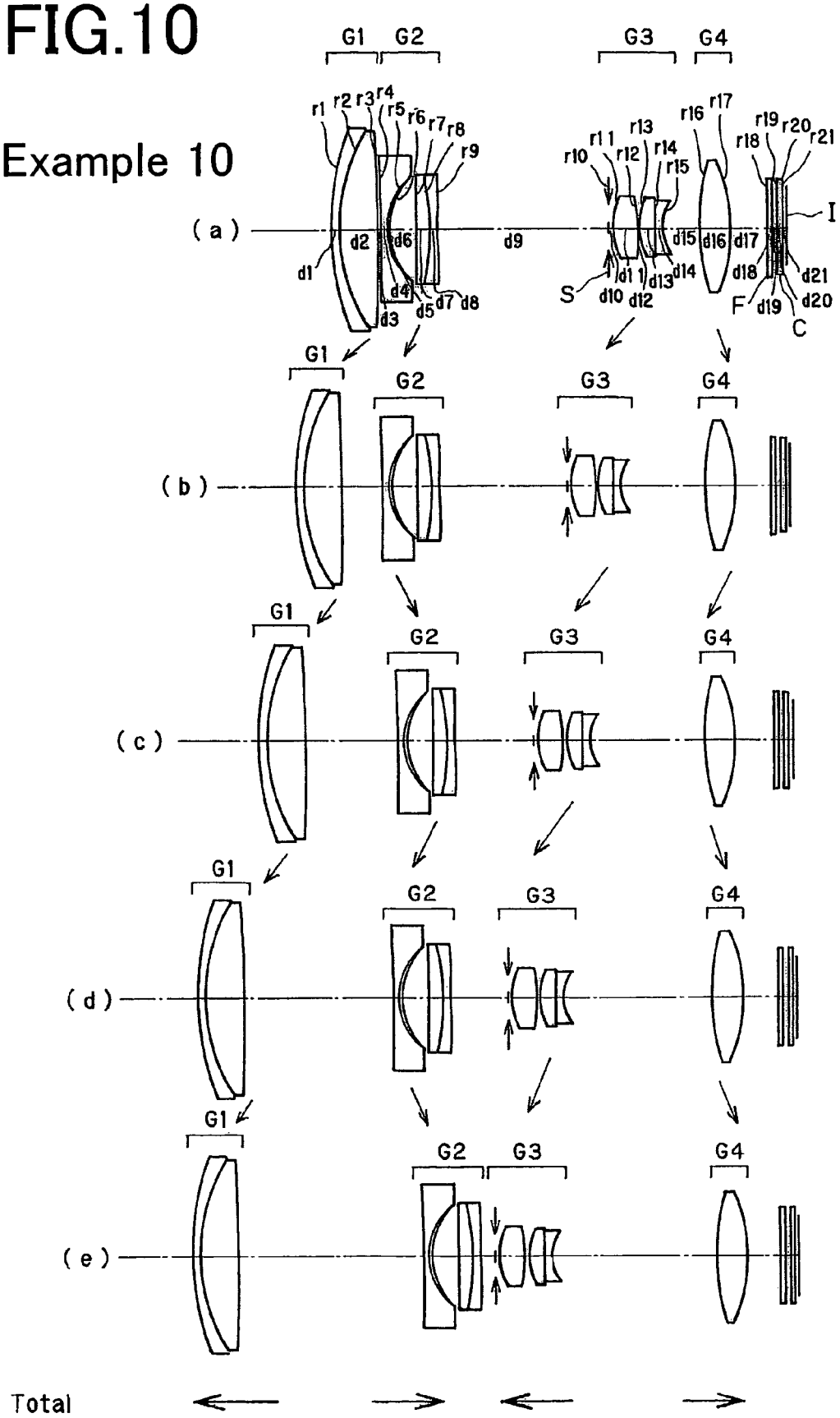
FIG. 10 is illustrative, as in FIG. 1, of Example 10 of the inventive zoom lens.

Example 10 is directed to a zoom lens made up of, in order from its object side, the first lens group G1 of positive refracting power, the aperture stop S, the second lens group G2 of negative refracting power, the third lens group G3 of positive refracting power and the fourth lens group G4 of negative refracting power, as shown in FIG. 10.

Upon zooming from the wide-angle end to the telephoto end, the respective lens groups move as follows.

The first lens group G1 moves toward the object side from the wide-angle end to the telephoto end.

From the wide-angle end to the point of change on the wide-angle side, the second lens group G2 moves toward the object side while the spacing between the first lens group G1 and it grows wide and the spacing between it and the third lens group G3 becomes narrow; from the point of change on the wide-angle side to the intermediate setting, it moves toward the image side while the spacing between the first lens group G1 and it grows wide and the spacing between it and the third lens group G3 becomes narrow; from the intermediate setting to the point of change on the telephoto side, it moves toward the object side while the spacing between the first lens group G1 and it grows wide and the spacing between it and the third lens group G3 becomes narrow; from the point of change on the telephoto side to the telephoto end, it moves toward the image side while the spacing between the first lens group G1 and it grows wide and the spacing between it and the third lens group G3 becomes narrow; from the wide-angle end to the intermediate setting, it moves in a convex locus toward the object side; and from the intermediate setting to the telephoto end, it moves in a convex locus toward the object side. At the telephoto end, the second lens group G2 is positioned more on the image side than at the wide-angle end and in the intermediate setting.

From the wide-angle end to the telephoto end, the aperture stop S and the third lens group G3 move in unison toward the object side with a decreasing spacing between the second lens group G2 and them and an increasing spacing between them and the fourth lens group G4.

From the wide-angle end to the point of change on the wide-angle side, the fourth lens group G4 moves toward the image side with an increasing spacing between the third lens group G3 and it; from the point of change on the wide-angle side to the intermediate setting, it moves toward the object side with an increasing spacing between the third lens group G3 and it; and from the intermediate setting to the telephoto end, it moves toward the image side with an increasing spacing between the third lens group G3 and it. At the telephoto end, the fourth lens group G4 is positioned more on the image side than the point of change on the wide-angle end.

In order from the object side, the first lens group G1 is made up of a cemented lens of a negative meniscus lens convex on its object side and a double-convex positive lens; the second lens group G2 is made up of a cemented lens of a double-concave negative lens and a positive meniscus lens convex on its object side as well as a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Seven aspheric surfaces are used: one at the surface nearest to the image side of the cemented lens in the first lens group G1, one at the surface nearest to the image side of the object-side cemented lens in the second lens group G2, one at the surface nearest to the image side of the image-side cemented lens in the second lens group G2, two at both surfaces of the double-convex positive lens in the third lens group G3, and two at both surfaces of the double-convex positive lens in the fourth lens group G4.

Figure 11:
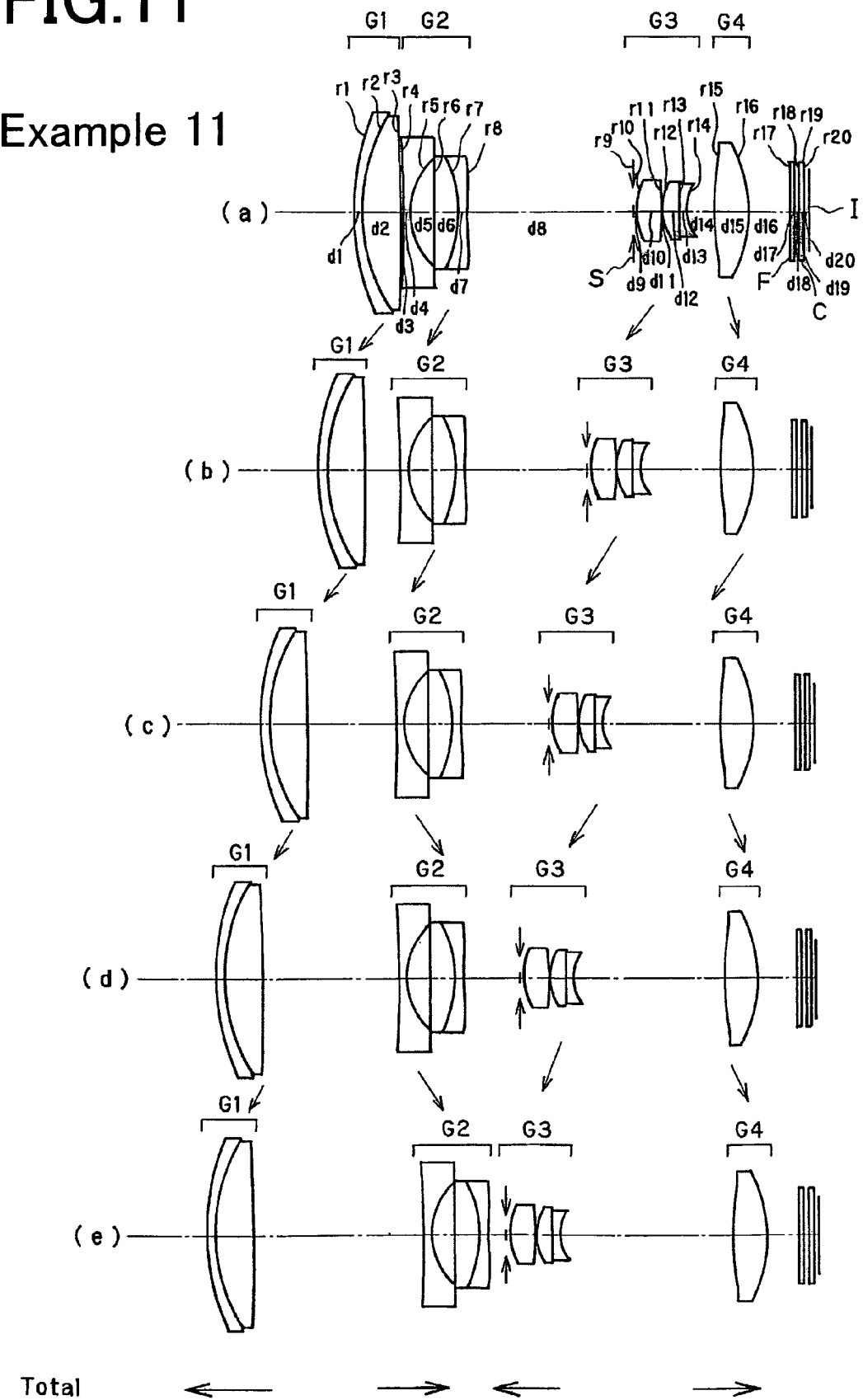
FIG. 11 is illustrative, as in FIG. 1, of Example 11 of the inventive zoom lens.

Example 11 is directed to a zoom lens made up of, in order from its object side, the first lens group G1 of positive refracting power, the aperture stop S, the second lens group G2 of negative refracting power, the third lens group G3 of positive refracting power and the fourth lens group G4 of negative refracting power, as shown in FIG. 11.

Upon zooming from the wide-angle end to the telephoto end, the respective lens groups move as follows.

The first lens group G1 moves toward the object side from the wide-angle end to the telephoto end.

From the wide-angle end to the intermediate setting, the first lens group G2 moves toward the object side while the spacing between the first lens group G1 and it grows wide and the spacing between it and the third lens group G3 becomes narrow; from the intermediate setting to the telephoto end, it moves toward the image side while the spacing between the first lens group G1 and it grows wide and the spacing between it and the third lens group G3 becomes narrow; and from the wide-angle end to the telephoto end, it moves in a convex locus toward the object side. At the telephoto end, the second lens group G2 is positioned more on the image side than at the wide-angle end.

From the wide-angle end to the telephoto end, the aperture stop S and the third lens group G3 move in unison toward the object side with a decreasing spacing between the second lens group G2 and them and an increasing spacing between them and the fourth lens group G4.

From the wide-angle end to the point of change on the wide-angle side, the fourth lens group G4 moves toward the image side with an increasing spacing between the third lens group G3 and it; from the point of change on the wide-angle side to the intermediate setting, it moves toward the object side with an increasing spacing between the third lens group G3 and it; and from the intermediate setting to the telephoto end, it moves toward the image side with an increasing spacing between the third lens group G3 and it. At the telephoto end, the fourth lens group G4 is positioned nearest to the image side.

In order from the object side, the first lens group G1 is made up of a cemented lens of a negative meniscus lens convex on its object side and a double-convex positive lens; the second lens group G2 is made up of a double-concave concave negative lens and a cemented lens of a double-convex positive lens and a double-concave negative lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Eight aspheric surfaces are used: one at the surface nearest to the image side of the cemented lens in the first lens group G1, two at both surfaces of the double-concave negative lens in the second lens group G2, one at the surface nearest to the image side of the cemented lens in the second lens group G2, two at both surfaces of the double-convex positive lens in the third lens group G3, and two at both surfaces of the double-convex positive lens in the fourth lens group G4.

Figure 12:
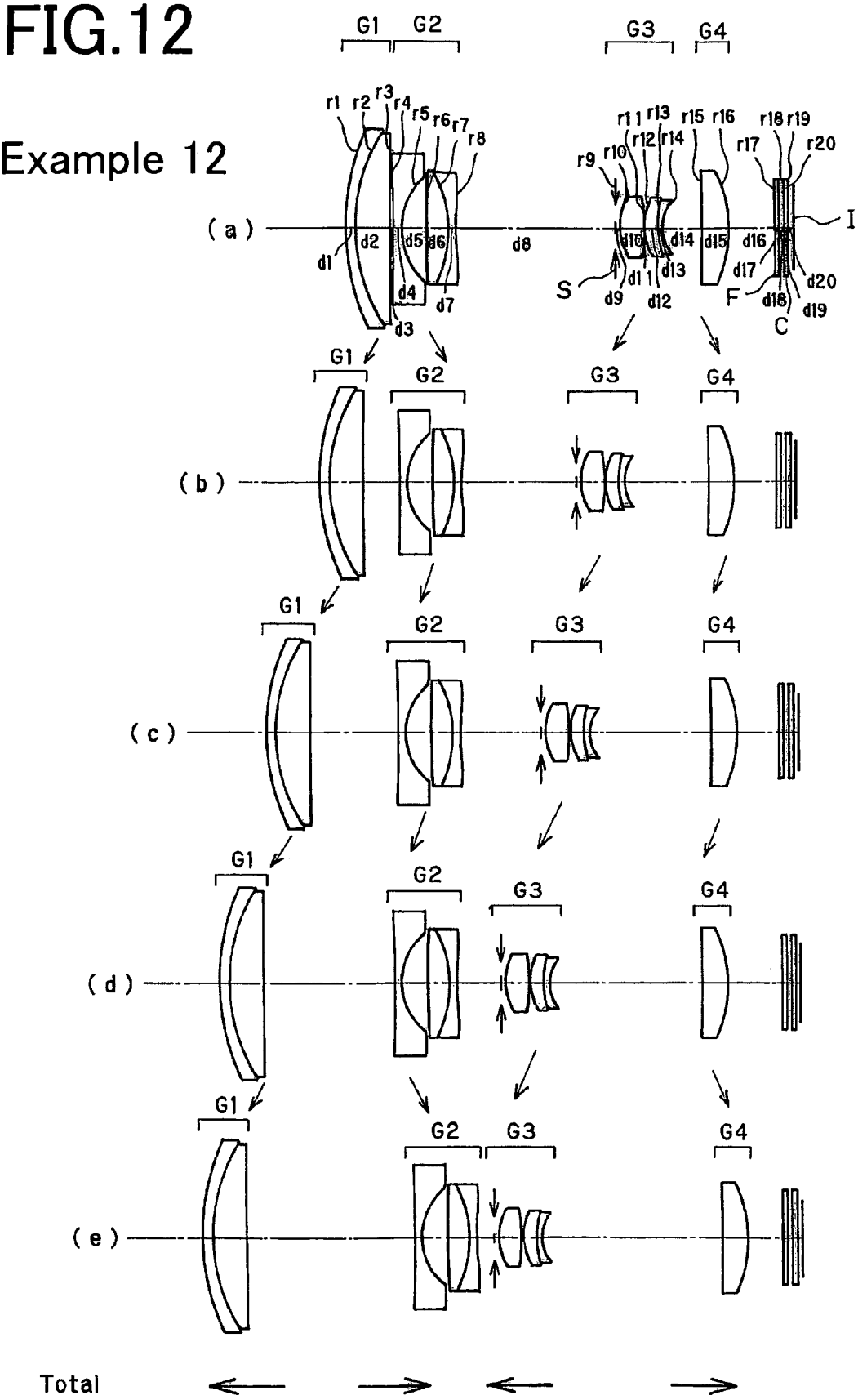
FIG. 12 is illustrative, as in FIG. 1, of Example 12 of the inventive zoom lens.

Example 12 is directed to a zoom lens made up of, in order from its object side, the first lens group G1 of positive refracting power, the aperture stop S, the second lens group G2 of negative refracting power, the third lens group G3 of positive refracting power and the fourth lens group G4 of negative refracting power, as shown in FIG. 12.

Upon zooming from the wide-angle end to the telephoto end, the respective lens groups move as follows.

The first lens group G1 moves toward the object side from the wide-angle end to the telephoto end.

From the wide-angle end to the point of change on the wide-angle side, the second lens group G2 moves toward the image side while the spacing between the first lens group G1 and it grows wide and the spacing between it and the third lens group G3; from the point of change on the wide-angle side to the point of change on the telephoto side, it moves toward the object side while the spacing between the first lens group G1 and it grows wide and the spacing between it and the third lens group G3 becomes narrow; and from the point of change on the telephoto side to the telephoto end, it moves toward the image side while the spacing between the first lens group G1 and it grows wide and the spacing between it and the third lens group G3 becomes narrow. At the telephoto end, the second lens group G2 is positioned nearest to the image side.

From the wide-angle end to the telephoto end, the aperture stop S and the third lens group G3 move in unison toward the object side with a decreasing spacing between the second lens group G2 and them and an increasing spacing between them and the fourth lens group G4.

From the wide-angle end to the point of change on the wide-angle side, the fourth lens group G4 moves toward the image side with an increasing spacing between the third lens group G3 and it; from the point of change on the wide-angle side to the point of change on the telephoto side, it moves toward the object side with an increasing spacing between the third lens group G3 and it; and from the point of change on the telephoto side to the telephoto end, it moves toward the image side with an increasing spacing between the third lens group G3 and it. At the telephoto end, the fourth lens group G4 is positioned nearest to the image side.

In order from the object side, the first lens group G1 is made up of a cemented lens of a negative meniscus lens convex on its object side and a double-convex positive lens; the second lens group G2 is made up of a negative meniscus lens convex on its object side and a cemented lens of a double-convex positive lens and a double-concave negative lens; the third lens group G3 is made up of a double-convex positive lens and a cemented lens of a positive meniscus lens convex in its object side and a negative meniscus lens convex on its object side; and the fourth lens group G4 is made up of one positive meniscus lens convex on its image side.

Eight aspheric surfaces are used: one at the surface nearest to the image side of the cemented lens in the first lens group G1, two at both surfaces of the negative meniscus lens in the second lens group G2, one at the surface nearest to the image side of the cemented lens in the second lens group G2, two at both surfaces of the double-convex positive lens in the third lens group G3, and two at both surfaces of the positive meniscus lens in the fourth lens group G4.

Figure 13:
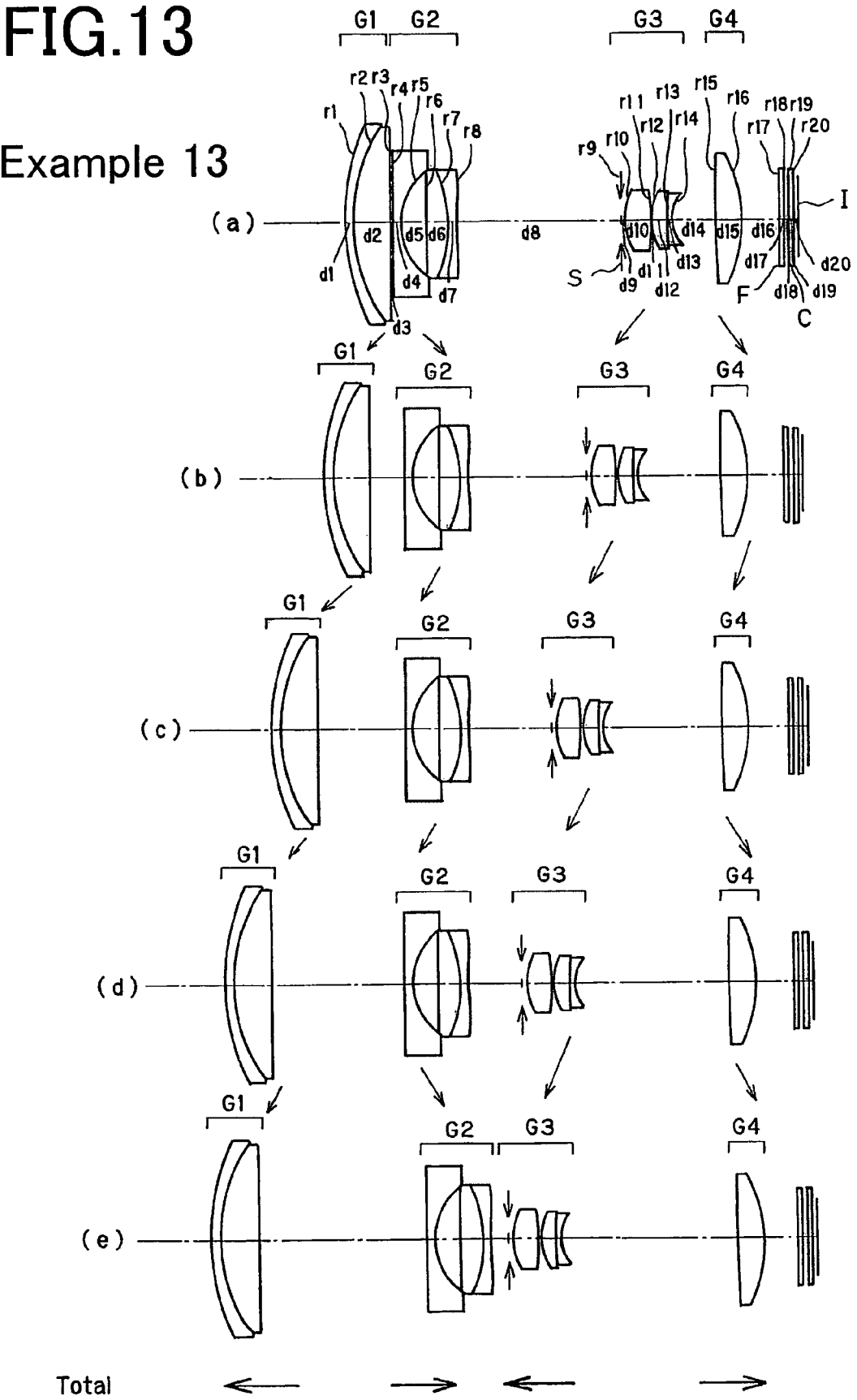
FIG. 13 is illustrative, as in FIG. 1, of Example 13 of the inventive zoom lens.
Figure 14:
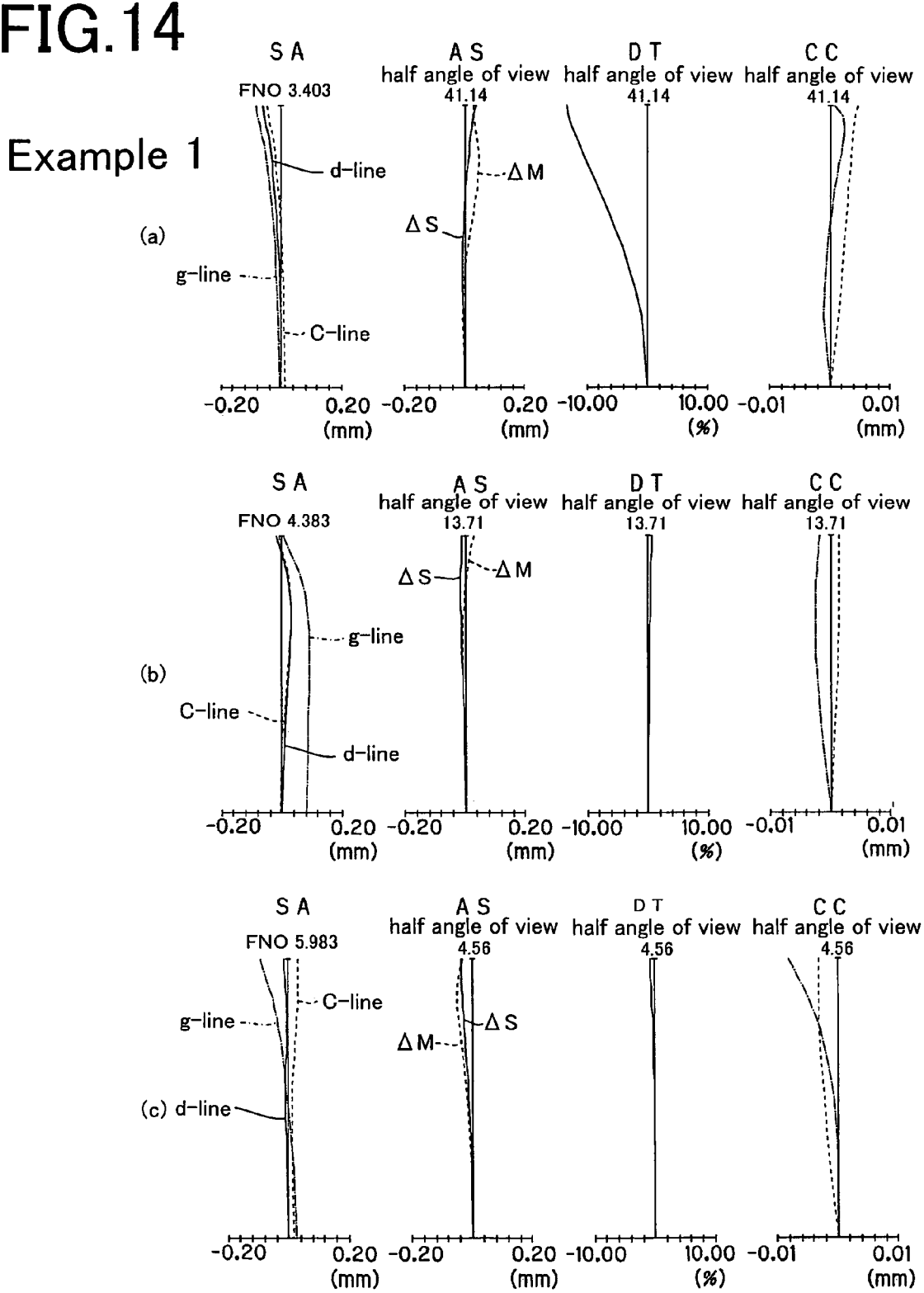
FIG. 14 is an aberration diagram for Example 1 upon focusing on an object point at infinity.
Figure 16:
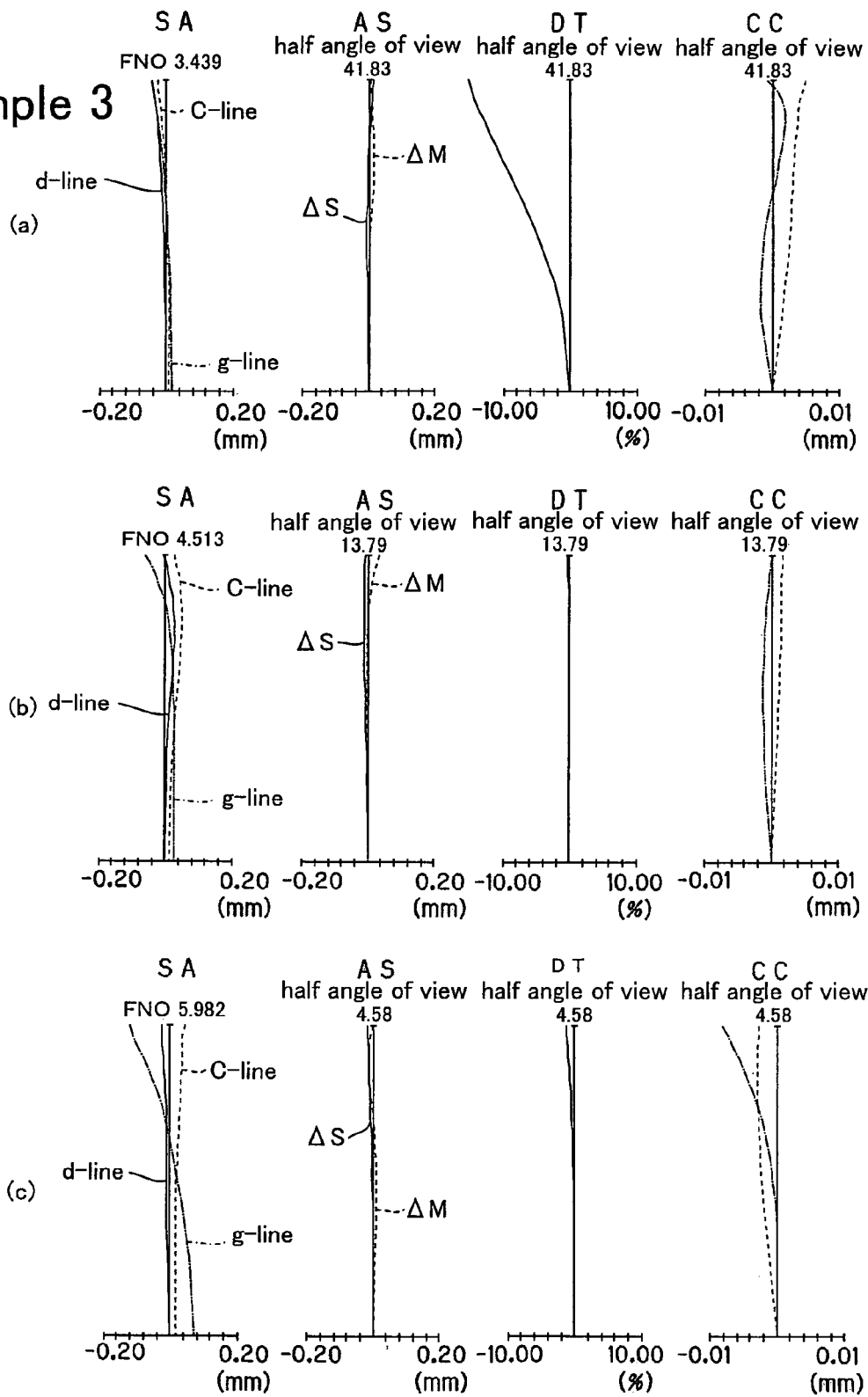
FIG. 16 is an aberration diagram for Example 3 upon focusing on an object point at infinity.

Example 13 is directed to a zoom lens made up of, in order from its object side, the first lens group G1 of positive refracting power, the aperture stop S, the second lens group G2 of negative refracting power, the third lens group G3 of positive refracting power and the fourth lens group G4 of negative refracting power, as shown in FIG. 13.

Upon zooming from the wide-angle end to the telephoto end, the respective lens groups move as follows.

The first lens group G1 moves toward the object side from the wide-angle end to the telephoto end.

From the wide-angle end to the point of change on the wide-angle side, the second lens group G2 moves toward the image side while the spacing between the first lens group G1 and it grows wide and the spacing between it and the third lens group G3 becomes narrow; from the point of change on the wide-angle side to the point of change on the telephoto side, it moves toward the object side while the spacing between the first lens group G1 and it grows wide and the spacing between it and the third lens group G3 becomes narrow; and from the point of change on the telephoto side to the telephoto end, it moves toward the image side while the spacing between the first lens group G1 and it grows wide and the spacing between it and the third lens group G3 becomes narrow. At the telephoto end, the second lens group G2 is positioned nearest to the image side.

From the wide-angle end to the telephoto end, the aperture stop S and the third lens group G3 move in unison toward the object side with a decreasing spacing between the second lens group G2 and them and an increasing spacing between them and the fourth lens group G4.

From the wide-angle end to the point of change on the wide-angle side, the fourth lens group G4 moves toward the image side with an increasing spacing between the second lens group G3 and it; from the point of change on the wide-angle side to the intermediate setting, it moves toward the object side with an increasing spacing between the third lens group G3 and it; and from the intermediate setting to the telephoto end, it moves toward the image side with an increasing spacing between the third lens group G3 and it. At the telephoto end, the fourth lens group G4 is positioned nearest to the image side.

In order from the object side, the first lens group G1 is made up of a cemented lens of a negative meniscus lens convex on its object side and a double-convex positive lens; the second lens group G2 is made up of a negative meniscus lens convex on its object side and a cemented lens of a positive meniscus lens convex on its image side and a double-concave negative lens; the third lens group G3 is made up of a double-convex positive lens and a cemented lens of a positive meniscus lens convex on its object side and a negative meniscus lens convex on its object side; and the fourth lens group G4 is made up of one double-convex positive lens.

Eight aspheric surfaces are used: one at the surface nearest to the image side of the cemented lens in the first lens group G1, two at both surfaces of the negative meniscus lens in the second lens group G2, one at the surface nearest to the image side of the cemented lens in the second lens group G2, two at both surfaces of the double-convex positive lens in the third lens group G3, and two at both surfaces of the double-convex positive lens in the fourth lens group G4.

Set out below are the numerical data about the zoom lens of each example.

Symbols mentioned hereinafter but not hereinbefore have the following meanings:

r is the radius of curvature of each lens surface,
d is the thickness of or spacing across each lens,
nd is the d-line refractive index of each lens,
vd is the d-line Abbe constant of each lens,
K is the conic coefficient,
A4, A6, A8, and A10 is the aspheric coefficients, and
E±N is ×10$^{\pm N}$.

Note here that each aspheric shape is given by the following equation using each aspheric coefficient in each example.

$$Z = (Y^2/r) / \left[ 1 + \{ 1 - (K+1) \cdot (Y/r)^2 \}^{1/2} \right] + A4 \times Y^4 + A6 \times Y^6 + A8 \times Y^8 + A10 \times Y^{10}$$

Here Z is the coordinates in the optical axis direction, and Y is the coordinates in the direction vertical to the optical axis.

Numerical Example 1

| Unit mm | | | | |
|---|---|---|---|---|
| Surface data | | | | |
| Surface No. | r | d | nd | vd |
| 1 | 23.700 | 0.80 | 1.92286 | 18.90 |
| 2 | 18.290 | 0.29 | | |
| 3 | 20.285 | 2.68 | 1.83215 | 52.64 |
| 4 | 224.814 | Variable | | |
| 5 (Aspheric surface) | −274063.885 | 0.80 | 1.83481 | 42.71 |
| 6 (Aspheric surface) | 7.042 | 2.62 | | |
| 7 | −109.853 | 2.07 | 1.94595 | 17.98 |
| 8 | −13.490 | 0.80 | 1.83481 | 42.71 |
| 9 (Aspheric surface) | 101.819 | Variable | | |
| 10 (Stop) | ∞ | 0.30 | | |
| 11 (Aspheric surface) | 5.360 | 2.31 | 1.49700 | 81.54 |
| 12 (Aspheric surface) | −13.893 | 0.10 | | |
| 13 | 6.596 | 1.51 | 1.77250 | 49.60 |
| 14 | 8.760 | 0.80 | 2.00068 | 25.47 |
| 15 | 3.811 | Variable | | |
| 16 | −863.224 | 2.67 | 1.74330 | 49.33 |
| 17 (Aspheric surface) | −12.066 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.40 | | |
| Image plane | ∞ | | | |

Aspheric surface data

5$^{th}$ surface

K = 0.000, A4 = −4.84837E−05, A6 = 1.75124E−06,
A8 = 8.67014E−10, A10 = −5.50599E−11

6$^{th}$ surface

K = 0.872, A4 = −1.23406E−04, A6 = −1.07153E−06,
A8 = −2.49932E−07, A10 = −2.37832E−09

9$^{th}$ surface

K = 0.000, A4 = −3.30543E−04, A6 = 5.07824E−07,
A8 = 6.33144E−08, A10 = −1.16455E−08

11$^{th}$ surface

K = 0.000, A4 = −6.97366E−04, A6 = −1.98689E−07,
A8 = −5.74122E−07, A10 = 2.10931E−07

12$^{th}$ surface

K = 0.000, A4 = 5.88288E−04, A6 = 7.94116E−06,
A8 = −3.06457E−07, A10 = 2.97377E−07

17$^{th}$ surface

K = 0.000, A4 = 9.09058E−05, A6 = −1.34306E−06,
A8 = 2.83530E−08

| Zoom lens data | | |
|---|---|---|
| Zoom ratio | | 9.563 |

| | Wide-angle | Point of change on the wide-angle side | Intermediate |
|---|---|---|---|
| Focal length | 5.13 | 8.78 | 15.80 |
| F-number | 3.40 | 4.24 | 4.38 |
| Angle of view | 82.27 | 48.36 | 27.42 |
| Image height | 3.88 | 3.88 | 3.88 |
| Total lens length | 42.79 | 46.15 | 52.33 |
| BF | 5.93 | 5.52 | 4.91 |
| d4 | 0.44 | 4.59 | 9.75 |
| d9 | 15.34 | 10.82 | 7.53 |
| d15 | 3.33 | 7.48 | 12.39 |
| d17 | 4.45 | 4.03 | 3.43 |

| | Point of change on the telephoto side | Telephoto |
|---|---|---|
| Focal length | 27.99 | 49.07 |
| F-number | 5.37 | 5.98 |
| Angle of view | 15.83 | 9.11 |
| Image height | 3.88 | 3.88 |
| Total lens length | 58.73 | 63.02 |
| BF | 5.08 | 4.82 |
| d4 | 13.95 | 18.80 |
| d9 | 4.36 | 1.43 |
| d15 | 17.59 | 20.23 |
| d17 | 3.59 | 3.33 |

| Data on zoom lens groups | | |
|---|---|---|
| Group | Starting surface | Focal length |
| 1 | 1 | 38.03 |
| 2 | 5 | −7.68 |
| 3 | 10 | 10.82 |
| 4 | 12 | 16.44 |

Numerical Example 2

Unit mm

Surface data

| Surface No. | r | d | nd | vd |
|---|---|---|---|---|
| 1 | 23.389 | 0.80 | 1.92286 | 18.90 |
| 2 | 18.160 | 0.25 | | |
| 3 | 19.779 | 2.60 | 1.83215 | 52.64 |
| 4 | 143.273 | Variable | | |
| 5 (Aspheric surface) | 161.987 | 0.80 | 1.83481 | 42.71 |
| 6 (Aspheric surface) | 6.905 | 2.69 | | |
| 7 | −80.337 | 2.04 | 1.94595 | 17.98 |
| 8 | −13.334 | 0.80 | 1.83481 | 42.71 |
| 9 (Aspheric surface) | 106.434 | Variable | | |
| 10 (Stop) | ∞ | 0.30 | | |
| 11 (Aspheric surface) | 5.845 | 2.46 | 1.59201 | 67.02 |
| 12 (Aspheric surface) | −16.354 | 0.10 | | |
| 13 | 7.694 | 1.51 | 1.77250 | 49.60 |
| 14 | 12.481 | 0.80 | 2.00068 | 25.47 |
| 15 | 4.166 | Variable | | |
| 16 | 634.377 | 2.66 | 1.74330 | 49.33 |
| 17 (Aspheric surface) | −12.596 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.40 | | |
| Image plane | ∞ | | | |

Aspheric surface data $5^{th}$ surface

K = 0.000, A4 = −8.14440E−05, A6 = 1.42313E−06,
A8 = 2.33537E−08, A10 = −2.31846E−10

$6^{th}$ surface

K = 0.872, A4 = −1.44875E−04, A6 = −1.97010E−06,
A8 = −3.00268E−07, A10 = −2.29344E−09

$9^{th}$ surface

K = 0.000, A4 = −3.46036E−04, A6 = 4.76351E−07,
A8 = 8.87917E−08, A10 = −1.32350E−08

$11^{th}$ surface

K = 0.000, A4 = −4.81718E−04, A6 = 6.29268E−06,
A8 = 4.70679E−08, A10 = 1.43928E−07

$12^{th}$ surface

K = 0.000, A4 = 6.13589E−04, A6 = 1.28943E−05,
A8 = −2.53354E−08, A10 = 2.48912E−07

$17^{th}$ surface

K = 0.000, A4 = 9.09058E−05, A6 = −1.56385E−06,
A8 = 2.75046E−08

Zoom lens data

| Zoom ratio | | 9.557 | |
|---|---|---|---|
| | Wide-angle | Point of change on the wide-angle side | Intermediate |
| Focal length | 5.13 | 8.84 | 15.82 |
| F-number | 3.40 | 4.28 | 4.47 |
| Angle of view | 83.78 | 48.81 | 27.65 |
| Image height | 3.88 | 3.88 | 3.88 |
| Total lens length | 42.50 | 45.62 | 52.30 |
| BF | 5.87 | 5.52 | 4.80 |
| d4 | 0.43 | 4.30 | 9.66 |
| d9 | 15.10 | 10.39 | 7.34 |
| d15 | 3.31 | 7.62 | 12.70 |
| d17 | 4.38 | 4.03 | 3.31 |

-continued

Unit mm

| | Point of change on the telephoto side | Telephoto |
|---|---|---|
| Focal length | 27.94 | 49.07 |
| F-number | 5.66 | 6.04 |
| Angle of view | 15.99 | 9.14 |
| Image height | 3.88 | 3.88 |
| Total lens length | 59.62 | 64.13 |
| BF | 5.47 | 4.86 |
| d4 | 13.22 | 19.22 |
| d9 | 4.01 | 1.50 |
| d15 | 19.12 | 20.75 |
| d17 | 3.98 | 3.38 |

Data on zoom lens groups

| Group | Starting surface | Focal length |
|---|---|---|
| 1 | 1 | 39.23 |
| 2 | 5 | −7.66 |
| 3 | 10 | 10.71 |
| 4 | 12 | 16.65 |

Numerical Example 3

Unit mm

Surface data

| Surface No. | r | d | nd | vd |
|---|---|---|---|---|
| 1 | 24.211 | 0.80 | 1.92286 | 18.90 |
| 2 | 18.623 | 0.20 | | |
| 3 | 19.936 | 2.59 | 1.83215 | 52.64 |
| 4 | 129.590 | Variable | | |
| 5 (Aspheric surface) | 81.732 | 0.80 | 1.83481 | 42.71 |
| 6 (Aspheric surface) | 7.132 | 2.71 | | |
| 7 | −59.487 | 2.10 | 1.94595 | 17.98 |
| 8 | −12.471 | 0.80 | 1.83481 | 42.71 |
| 9 (Aspheric surface) | 62.561 | Variable | | |
| 10 (Stop) | ∞ | 0.30 | | |
| 11 (Aspheric surface) | 6.101 | 2.49 | 1.59201 | 67.02 |
| 12 (Aspheric surface) | −15.222 | 0.10 | | |
| 13 | 7.637 | 1.51 | 1.77250 | 49.60 |
| 14 | 14.729 | 0.80 | 2.00068 | 25.47 |
| 15 | 4.231 | Variable | | |
| 16 | 688.493 | 2.62 | 1.74330 | 49.33 |
| 17 (Aspheric surface) | −12.421 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.40 | | |
| Image plane | ∞ | | | |

Aspheric surface data $5^{th}$ surface

K = 0.000, A4 = −9.19298E−05, A6 = 1.00400E−06,
A8 = 3.12893E−08, A10 = −2.90427E−10

$6^{th}$ surface

K = 0.872, A4 = −1.43244E−04, A6 = −1.37907E−06,
A8 = −1.81017E−07, A10 = −4.81387E−09

$9^{th}$ surface

K = 0.000, A4 = −3.06944E−04, A6 = −2.21317E−06,
A8 = 2.88630E−07, A10 = −1.38285E−08

-continued

Unit mm

11th surface

K = 0.000, A4 = −4.72499E−04, A6 = 2.36906E−06,
A8 = 1.41953E−07, A10 = 1.19080E−07

12th surface

K = 0.000, A4 = 5.49305E−04, A6 = 8.85354E−06,
A8 = −1.33567E−07, A10 = 2.05010E−07

17th surface

K = 0.000, A4 = 9.09058E−05, A6 = −1.89437E−06,
A8 = 3.63383E−08

Zoom lens data

Zoom ratio 9.582

|  | Wide-angle | Point of change on the wide-angle side | Intermediate |
|---|---|---|---|
| Focal length | 5.12 | 8.67 | 15.84 |
| F-number | 3.44 | 4.29 | 4.51 |
| Angle of view | 83.66 | 49.93 | 27.59 |
| Image height | 3.88 | 3.88 | 3.88 |
| Total lens length | 42.97 | 46.43 | 51.44 |
| BF | 6.24 | 6.01 | 4.85 |
| d4 | 0.39 | 4.33 | 9.22 |
| d9 | 15.19 | 10.66 | 6.81 |
| d15 | 3.33 | 7.55 | 12.11 |
| d17 | 4.75 | 4.53 | 3.36 |

|  | Point of change on the telephoto side | Telephoto |
|---|---|---|
| Focal length | 28.06 | 49.08 |
| F-number | 5.91 | 5.98 |
| Angle of view | 16.00 | 9.15 |
| Image height | 3.88 | 3.88 |
| Total lens length | 59.61 | 65.07 |
| BF | 5.45 | 4.93 |
| d4 | 12.49 | 19.73 |
| d9 | 3.79 | 1.68 |
| d15 | 19.33 | 20.20 |
| d17 | 3.96 | 3.44 |

Data on zoom lens groups

| Group | Starting surface | Focal length |
|---|---|---|
| 1 | 1 | 40.88 |
| 2 | 5 | −7.48 |
| 3 | 10 | 10.92 |
| 4 | 12 | 16.44 |

Numerical Example 4

Unit mm

Surface data

| Surface No. | r | d | nd | vd |
|---|---|---|---|---|
| 1 | 26.609 | 0.80 | 2.00170 | 20.64 |
| 2 | 18.391 | 3.39 | 1.83215 | 52.64 |
| 3 | −1367.926 | 0.14 | 1.63494 | 23.22 |
| 4 (Aspheric surface) | −213.165 | Variable | | |
| 5 (Aspheric surface) | −439.187 | 0.80 | 1.85135 | 40.10 |
| 6 (Aspheric surface) | 7.060 | 2.45 | | |
| 7 | −139.219 | 2.11 | 2.00170 | 20.64 |
| 8 | −11.205 | 0.70 | 1.83481 | 42.71 |
| 9 (Aspheric surface) | 45.942 | Variable | | |
| 10 (Stop) | ∞ | 0.30 | | |
| 11 (Aspheric surface) | 5.399 | 2.38 | 1.69350 | 53.21 |
| 12 (Aspheric surface) | −21.389 | 0.11 | | |
| 13 | 5.521 | 1.46 | 1.49700 | 81.54 |
| 14 | 52.651 | 0.66 | 2.00330 | 28.27 |
| 15 | 3.576 | Variable | | |
| 16 (Aspheric surface) | 26.533 | 2.63 | 1.76802 | 49.24 |
| 17 (Aspheric surface) | −16.230 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.40 | | |
| Image plane | ∞ | | | |

Aspheric surface data

4th surface

K = 0.000, A4 = 7.95333E−06, A6 = −2.92707E−09,
A8 = −7.44900E−11, A10 = 3.72264E−13

5th surface

K = 9.661, A4 = −6.11679E−06, A6 = 5.90825E−07,
A8 = −5.03278E−08, A10 = 5.65254E−10

6th surface

K = 0.487, A4 = 4.99288E−05, A6 = 5.21229E−06,
A8 = 7.33746E−08, A10 = −2.83903E−08

9th surface

K = −1.646, A4 = −3.43583E−04, A6 = −4.01983E−06,
A8 = 3.80485E−07, A10 = −6.14071E−09

11th surface

K = 0.978, A4 = −1.13379E−03, A6 = −3.22422E−05,
A8 = −1.96033E−06, A10 = 3.05621E−08

12th surface

K = −10.036, A4 = 6.38984E−04, A6 = 2.38255E−05,
A8 = −1.52100E−06, A10 = 5.89495E−07

16th surface

K = 0.000, A4 = 6.42603E−05, A6 = 2.21368E−07

17th surface

K = 0.000, A4 = 1.08681E−04, A6 = −1.93327E−06,
A8 = 4.07343E−08

Zoom lens data

Zoom ratio 9.477

|  | Wide-angle | Point of change on the wide-angle side | Intermediate |
|---|---|---|---|
| Focal length | 5.13 | 8.70 | 15.69 |
| F-number | 3.27 | 4.14 | 4.91 |
| Angle of view | 79.56 | 47.78 | 27.14 |
| Image height | 3.88 | 3.88 | 3.88 |
| Total lens length | 42.71 | 46.18 | 51.60 |
| BF | 5.35 | 4.98 | 5.20 |
| D4 | 0.25 | 3.44 | 8.41 |
| D9 | 15.95 | 12.01 | 8.48 |
| D15 | 3.22 | 7.82 | 11.58 |
| D17 | 3.87 | 3.5 | 3.72 |

|  | Point of change on the telephoto side | Telephoto |
|---|---|---|
| Focal length | 27.76 | 48.65 |
| F-number | 5.52 | 5.93 |
| Angle of view | 15.67 | 9.08 |
| Image height | 3.88 | 3.88 |
| Total lens length | 55.90 | 56.74 |
| BF | 4.97 | 4.83 |
| D4 | 12.91 | 16.18 |
| D9 | 5.59 | 1.48 |

-continued

| Unit mm | | |
|---|---|---|
| D15 | 14.50 | 16.32 |
| D17 | 3.48 | 3.34 |

Data on zoom lens groups

| Group | Starting surface | Focal length |
|---|---|---|
| 1 | 1 | 31.78 |
| 2 | 5 | -7.27 |
| 3 | 10 | 10.94 |
| 4 | 12 | 13.47 |

Numerical Example 5

Unit mm

Surface data

| Surface No. | r | d | nd | vd |
|---|---|---|---|---|
| 1 | 23.700 | 0.80 | 1.92286 | 18.90 |
| 2 | 18.290 | 0.29 | | |
| 3 | 20.285 | 2.50 | 1.90000 | 52.64 |
| 4 | 123.654 | Variable | | |
| 5 (Aspheric surface) | -274063.885 | 0.80 | 1.83481 | 42.71 |
| 6 (Aspheric surface) | 7.054 | 2.62 | | |
| 7 | -120.042 | 2.07 | 1.94595 | 17.98 |
| 8 | -13.569 | 0.80 | 1.83481 | 42.71 |
| 9 (Aspheric surface) | 98.727 | Variable | | |
| 10 (Stop) | ∞ | 0.30 | | |
| 11 (Aspheric surface) | 5.374 | 2.31 | 1.49700 | 81.54 |
| 12 (Aspheric surface) | -13.893 | 0.10 | | |
| 13 | 6.596 | 1.51 | 1.77250 | 49.60 |
| 14 | 8.760 | 0.80 | 2.00068 | 25.47 |
| 15 | 3.811 | Variable | | |
| 16 | 528.073 | 2.67 | 1.64000 | 60.08 |
| 17 (Aspheric surface) | -10.930 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.40 | | |
| Image plane | ∞ | | | |

Aspheric surface data $5^{th}$ surface

K = 0.000, A4 = -3.96819E-05, A6 = 1.43089E-06,
A8 = 3.64293E-09, A10 = -3.98658E-11

$6^{th}$ surface

K = 0.872, A4 = -1.23406E-04, A6 = -1.07153E-06,
A8 = -2.49932E-07, A10 = -2.37832E-09

$9^{th}$ surface

K = 0.000, A4 = -3.30543E-04, A6 = 5.07824E-07,
A8 = 6.33144E-08, A10 = -1.16455E-08

$11^{th}$ surface

K = 0.000, A4 = -6.96330E-04, A6 = 3.09050E-07,
A8 = -3.39759E-07, A10 = 1.87064E-07

$12^{th}$ surface

K = 0.000, A4 = 5.88288E-04, A6 = 7.94116E-06,
A8 = -3.06457E-07, A10 = 2.97377E-07

$17^{th}$ surface

K = 0.000, A4 = 8.77117E-05, A6 = -2.24876E-06,
A8 = 1.41726E-08, A10 = 1.66976E-09

-continued

Unit mm

Zoom lens data

| Zoom ratio | 9.454 | |
|---|---|---|

| | Wide-angle | Point of change on the wide-angle side | Intermediate |
|---|---|---|---|
| Focal length | 5.20 | 8.88 | 15.94 |
| F-number | 3.44 | 4.27 | 4.42 |
| Angle of view | 82.51 | 48.51 | 27.65 |
| Image height | 3.88 | 3.88 | 3.88 |
| Total lens length | 42.61 | 45.96 | 52.14 |
| BF | 5.93 | 5.53 | 4.92 |
| d4 | 0.44 | 4.59 | 9.75 |
| d9 | 15.34 | 10.82 | 7.53 |
| d15 | 3.33 | 7.47 | 12.37 |
| d17 | 4.44 | 4.04 | 3.43 |

| | Point of change on the telephoto side | Telephoto |
|---|---|---|
| Focal length | 28.17 | 49.20 |
| F-number | 5.41 | 6.02 |
| Angle of view | 16.04 | 9.28 |
| Image height | 3.88 | 3.88 |
| Total lens length | 58.54 | 62.83 |
| BF | 5.09 | 4.84 |
| d4 | 13.95 | 18.80 |
| d9 | 4.36 | 1.43 |
| d15 | 17.57 | 20.19 |
| d17 | 3.6 | 3.35 |

Data on zoom lens groups

| Group | Starting surface | Focal length |
|---|---|---|
| 1 | 1 | 38.14 |
| 2 | 5 | -7.72 |
| 3 | 10 | 10.86 |
| 4 | 12 | 16.76 |

Numerical Example 6

Unit mm

Surface data

| Surface No. | r | d | nd | vd |
|---|---|---|---|---|
| 1 | 23.471 | 0.80 | 2.00170 | 22.00 |
| 2 | 18.361 | 0.29 | | |
| 3 | 20.285 | 2.50 | 1.90000 | 60.00 |
| 4 | 130.126 | Variable | | |
| 5 (Aspheric surface) | -274063.885 | 0.80 | 1.83481 | 42.71 |
| 6 (Aspheric surface) | 7.042 | 2.62 | | |
| 7 | -109.825 | 2.07 | 1.94595 | 17.98 |
| 8 | -13.490 | 0.80 | 1.83481 | 42.71 |
| 9 (Aspheric surface) | 101.819 | Variable | | |
| 10 (Stop) | ∞ | 0.30 | | |
| 11 (Aspheric surface) | 5.360 | 2.31 | 1.49700 | 81.54 |
| 12 (Aspheric surface) | -13.893 | 0.10 | | |
| 13 | 6.596 | 1.51 | 1.77250 | 49.60 |
| 14 | 8.760 | 0.80 | 2.00068 | 25.47 |
| 15 | 3.811 | Variable | | |
| 16 | -863.224 | 2.67 | 1.74330 | 49.33 |
| 17 (Aspheric surface) | -12.070 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.40 | | |
| Image plane | ∞ | | | |

-continued

Unit mm

Aspheric surface data $5^{th}$ surface

K = 0.000, A4 = −4.28139E−05, A6 = 1.84355E−06,
A8 = −7.33883E−09, A10 = 6.11785E−11

$6^{th}$ surface

K = 0.872, A4 = −1.23406E−04, A6 = −1.07153E−06,
A8 = −2.49932E−07, A10 = −2.37832E−09

$9^{th}$ surface

K = 0.000, A4 = −3.30543E−04, A6 = 5.07824E−07,
A8 = 6.33144E−08, A10 = −1.16455E−08

$11^{th}$ surface

K = 0.000, A4 = −6.96620E−04, A6 = 1.55392E−08,
A8 = −5.00511E−07, A10 = 1.96666E−07

$12^{th}$ surface

K = 0.000, A4 = 5.88288E−04, A6 = 7.94116E−06,
A8 = −3.06457E−07, A10 = 2.97377E−07

$17^{th}$ surface

K = 0.000, A4 = 8.83171E−05, A6 = −2.05423E−06,
A8 = −5.50036E−08, A10 = 3.23958E−09

Zoom lens data

| | Zoom ratio | 9.570 | |
|---|---|---|---|
| | Wide-angle | Point of change on the wide-angle side | Intermediate |
| Focal length | 5.13 | 8.79 | 15.81 |
| F-number | 3.40 | 4.24 | 4.39 |
| Angle of view | 83.01 | 48.83 | 27.76 |
| Image height | 3.88 | 3.88 | 3.88 |
| Total lens length | 42.61 | 45.97 | 52.16 |
| BF | 5.93 | 5.52 | 4.91 |
| d4 | 0.44 | 4.59 | 9.75 |
| d9 | 15.34 | 10.82 | 7.53 |
| d15 | 3.33 | 7.48 | 12.40 |
| d17 | 4.44 | 4.03 | 3.42 |

| | Point of change on the telephoto side | Telephoto |
|---|---|---|
| Focal length | 28.03 | 49.14 |
| F-number | 5.38 | 5.99 |
| Angle of view | 16.05 | 9.24 |
| Image height | 3.88 | 3.88 |
| Total lens length | 58.57 | 62.85 |
| BF | 5.07 | 4.81 |
| d4 | 13.95 | 18.80 |
| d9 | 4.36 | 1.43 |
| d15 | 17.61 | 20.25 |
| d17 | 3.58 | 3.32 |

Data on zoom lens groups

| Group | Starting surface | Focal length |
|---|---|---|
| 1 | 1 | 38.05 |
| 2 | 5 | −7.68 |
| 3 | 10 | 10.82 |
| 4 | 12 | 16.45 |

Numerical Example 7

Unit mm

Surface data

| Surface No. | r | d | nd | νd |
|---|---|---|---|---|
| 1 | 23.363 | 0.90 | 2.00170 | 22.00 |
| 2 | 18.463 | 0.29 | | |
| 3 | 20.285 | 2.50 | 1.88000 | 62.00 |
| 4 | 135.226 | Variable | | |
| 5 (Aspheric surface) | −274063.885 | 0.80 | 1.83481 | 42.71 |
| 6 (Aspheric surface) | 7.037 | 2.62 | | |
| 7 | −110.649 | 2.07 | 1.94595 | 17.98 |
| 8 | −13.490 | 0.80 | 1.83481 | 42.71 |
| 9 (Aspheric surface) | 101.819 | Variable | | |
| 10 (Stop) | ∞ | 0.30 | | |
| 11 (Aspheric surface) | 5.360 | 2.31 | 1.49700 | 81.54 |
| 12 (Aspheric surface) | −13.893 | 0.10 | | |
| 13 | 6.596 | 1.51 | 1.77250 | 49.60 |
| 14 | 8.760 | 0.80 | 2.00068 | 25.47 |
| 15 | 3.811 | Variable | | |
| 16 | −863.224 | 2.67 | 1.74330 | 49.33 |
| 17 (Aspheric surface) | −12.070 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.40 | | |
| Image plane | ∞ | | | |

Aspheric surface data $5^{th}$ surface

K = 0.000, A4 = −5.15244E−05, A6 = 2.04584E−06,
A8 = −5.44892E−09, A10 = 2.75042E−12

$6^{th}$ surface

K = 0.872, A4 = −1.23406E−04, A6 = −1.07153E−06,
A8 = −2.49932E−07, A10 = −2.37832E−09

$9^{th}$ surface

K = 0.000, A4 = −3.30543E−04, A6 = 5.07824E−07,
A8 = 6.33144E−08, A10 = −1.16455E−08

$11^{th}$ surface

K = 0.000, A4 = −6.97857E−04, A6 = −4.72698E−07,
A8 = −6.63166E−07, A10 = 2.23242E−07

$12^{th}$ surface

K = 0.000, A4 = 5.88288E−04, A6 = 7.94116E−06,
A8 = −3.06457E−07, A10 = 2.97377E−07

$17^{th}$ surface

K = 0.000, A4 = 8.37344E−05, A6 = −2.71293E−06,
A8 = 3.84733E−08, A10 = 9.29507E−10

Zoom lens data

| | Zoom ratio | 9.549 | |
|---|---|---|---|
| | Wide-angle | Point of change on the wide-angle side | Intermediate |
| Focal length | 5.14 | 8.80 | 15.82 |
| F-number | 3.40 | 4.23 | 4.38 |
| Angle of view | 82.91 | 48.83 | 27.72 |
| Image height | 3.88 | 3.88 | 3.88 |
| Total lens length | 42.71 | 46.07 | 52.24 |
| BF | 5.93 | 5.52 | 4.93 |
| d4 | 0.44 | 4.59 | 9.75 |
| d9 | 15.34 | 10.82 | 7.53 |
| d15 | 3.33 | 7.47 | 12.36 |
| d17 | 4.44 | 4.03 | 3.44 |

-continued

Unit mm

|  | Point of change on the telephoto side | Telephoto |
|---|---|---|
| Focal length | 28.02 | 49.12 |
| F-number | 5.36 | 5.98 |
| Angle of view | 16.01 | 9.21 |
| Image height | 3.88 | 3.88 |
| Total lens length | 58.64 | 62.92 |
| BF | 5.10 | 4.84 |
| d4 | 13.95 | 18.80 |
| d9 | 4.36 | 1.43 |
| d15 | 17.55 | 20.19 |
| d17 | 3.61 | 3.35 |

Data on zoom lens groups

| Group | Starting surface | Focal length |
|---|---|---|
| 1 | 1 | 38.14 |
| 2 | 5 | −7.68 |
| 3 | 10 | 10.82 |
| 4 | 12 | 16.45 |

Numerical Example 8

Unit mm

Surface data

| Surface No. | r | d | nd | νd |
|---|---|---|---|---|
| 1 | 25.439 | 0.80 | 2.00170 | 20.64 |
| 2 | 17.417 | 3.62 | 1.77250 | 49.60 |
| 3 (Aspheric surface) | −175.427 | Variable | | |
| 4 (Aspheric surface) | −298.762 | 0.60 | 1.83215 | 52.64 |
| 5 | 5.810 | 0.18 | 1.63494 | 23.22 |
| 6 (Aspheric surface) | 6.908 | 2.77 | | |
| 7 | −52.263 | 1.36 | 2.10225 | 16.79 |
| 8 | −20.087 | 0.70 | 1.83481 | 42.71 |
| 9 (Aspheric surface) | −439.754 | Variable | | |
| 10 (Stop) | ∞ | 0.30 | | |
| 11 (Aspheric surface) | 5.672 | 2.38 | 1.69350 | 53.21 |
| 12 (Aspheric surface) | −19.883 | 0.10 | | |
| 13 | 5.524 | 1.46 | 1.49700 | 81.54 |
| 14 | 28.650 | 0.70 | 2.00330 | 28.27 |
| 15 | 3.573 | Variable | | |
| 16 (Aspheric surface) | 22.853 | 2.63 | 1.76802 | 49.24 |
| 17 (Aspheric surface) | −19.395 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.40 | | |
| Image plane | ∞ | | | |

Aspheric surface data $3^{th}$ surface

K = 0.000, A4 = 6.40596E−06, A6 = 2.90241E−09, A8 = −1.31621E−10, A10 = 5.56532E−13

$4^{th}$ surface

K = 9.661, A4 = 6.64183E−05, A6 = −1.72799E−07, A8 = −3.07650E−08, A10 = 2.41368E−10

$6^{th}$ surface

K = 0.487, A4 = 1.64831E−04, A6 = 1.00413E−05, A8 = 2.05487E−07, A10 = −1.14355E−08

-continued

Unit mm $9^{th}$ surface

K = −2.956, A4 = −3.23248E−04, A6 = −5.07611E−06, A8 = 2.29980E−07, A10 = −1.09950E−08

$11^{th}$ surface

K = 0.983, A4 = −1.14283E−03, A6 = −3.98324E−05, A8 = −1.29308E−06, A10 = −7.14395E−08

$12^{th}$ surface

K = −9.537, A4 = 3.27310E−04, A6 = −5.55283E−06, A8 = 2.95069E−07, A10 = 1.14587E−07

$16^{th}$ surface

K = 0.000, A4 = 6.07309E−05, A6 = −1.51566E−06

$17^{th}$ surface

K = 0.000, A4 = 8.53815E−05, A6 = −4.11223E−06, A8 = 4.70838E−08

Zoom lens data

| Zoom ratio | | 9.492 | |
|---|---|---|---|
| | Wide-angle | Point of change on the wide-angle side | Intermediate |
| Focal length | 5.14 | 8.83 | 15.86 |
| F-number | 3.34 | 4.22 | 5.04 |
| Angle of view | 79.40 | 46.95 | 26.86 |
| Image height | 3.88 | 3.88 | 3.88 |
| Total lens length | 42.76 | 46.10 | 51.62 |
| BF | 5.14 | 4.84 | 5.11 |
| d3 | 0.20 | 3.68 | 8.61 |
| d9 | 16.01 | 11.71 | 8.09 |
| d15 | 3.81 | 8.26 | 12.21 |
| d17 | 3.65 | 3.35 | 3.62 |

|  | Point of change on the telephoto side | Telephoto |
|---|---|---|
| Focal length | 28.04 | 48.77 |
| F-number | 5.74 | 5.94 |
| Angle of view | 15.55 | 9.04 |
| Image height | 3.88 | 3.88 |
| Total lens length | 56.53 | 57.12 |
| BF | 4.98 | 4.94 |
| d3 | 13.19 | 16.98 |
| d9 | 5.18 | 1.13 |
| d15 | 15.58 | 16.47 |
| d17 | 3.49 | 3.45 |

Data on zoom lens groups

| Group | Starting surface | Focal length |
|---|---|---|
| 1 | 1 | 32.77 |
| 2 | 5 | −7.38 |
| 3 | 10 | 11.01 |
| 4 | 12 | 14.04 |

Numerical Example 9

Unit mm

Surface data

| Surface No. | r | d | nd | νd |
|---|---|---|---|---|
| 1 | 25.880 | 0.80 | 2.00170 | 20.64 |
| 2 | 17.671 | 3.62 | 1.77250 | 49.60 |

-continued

| Unit mm | | | | |
|---|---|---|---|---|
| 3 (Aspheric surface) | −164.365 | Variable | | |
| 4 | −180.336 | 0.60 | 1.83215 | 52.64 |
| 5 | 6.048 | 0.24 | 1.63494 | 23.22 |
| 6 (Aspheric surface) | 7.067 | 2.71 | | |
| 7 | −91.586 | 1.36 | 2.10225 | 16.79 |
| 8 | −23.544 | 0.70 | 1.83481 | 42.71 |
| 9 (Aspheric surface) | 195.656 | Variable | | |
| 10 (Stop) | ∞ | 0.30 | | |
| 11 (Aspheric surface) | 5.583 | 2.38 | 1.69350 | 53.21 |
| 12 (Aspheric surface) | −19.917 | 0.10 | | |
| 13 | 5.590 | 1.46 | 1.49700 | 81.54 |
| 14 | 28.691 | 0.70 | 2.00330 | 28.27 |
| 15 | 3.526 | Variable | | |
| 16 (Aspheric surface) | 23.217 | 2.63 | 1.76802 | 49.24 |
| 17 (Aspheric surface) | −18.513 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.40 | | |
| Image plane | ∞ | | | |

Aspheric surface data $3^{rd}$ surface

K = 0.000, A4 = 6.29279E−06, A6 = 8.10385E−10,
A8 = −8.17382E−11, A10 = 3.01198E−13

$6^{th}$ surface

K = 0.487, A4 = 7.46193E−05, A6 = 7.43989E−06,
A8 = −3.77797E−07, A10 = 5.21077E−09

$9^{th}$ surface

K = −2.956, A4 = −3.42179E−04, A6 = 1.31938E−09,
A8 = −7.19390E−09, A10 = −3.76676E−09

$11^{th}$ surface

K = 0.984, A4 = −1.22535E−03, A6 = −3.59267E−05,
A8 = −2.57618E−06, A10 = −2.81953E−08

$12^{th}$ surface

K = −9.994, A4 = 3.06117E−04, A6 = 4.59705E−06,
A8 = −1.85219E−06, A10 = 2.64829E−07

$16^{th}$ surface

K = 0.000, A4 = 6.74779E−05, A6 = −8.77704E−07

$17^{th}$ surface

K = 0.000, A4 = 8.71693E−05, A6 = −3.04534E−06,
A8 = 3.89734E−08

Zoom lens data

| | Zoom ratio | 9.520 | |
|---|---|---|---|
| | Wide-angle | Point of change on the wide-angle side | Intermediate |
| Focal length | 5.12 | 8.80 | 15.86 |
| F-number | 3.31 | 4.22 | 5.07 |
| Angle of view | 79.74 | 47.13 | 26.94 |
| Image height | 3.88 | 3.88 | 3.88 |
| Total lens length | 42.78 | 46.23 | 51.76 |
| BF | 5.19 | 4.83 | 5.07 |
| d3 | 0.20 | 3.69 | 8.52 |
| d9 | 16.21 | 11.97 | 8.29 |
| d15 | 3.58 | 8.13 | 12.29 |
| d17 | 3.7 | 3.35 | 3.58 |

| | Point of change on the telephoto side | Telephoto |
|---|---|---|
| Focal length | 28.09 | 48.78 |
| F-number | 5.79 | 5.98 |
| Angle of view | 15.58 | 9.06 |
| Image height | 3.88 | 3.88 |
| Total lens length | 56.69 | 57.17 |

-continued

| Unit mm | | |
|---|---|---|
| BF | 4.95 | 4.85 |
| d3 | 13.22 | 17.06 |
| d9 | 5.34 | 1.28 |
| d15 | 15.58 | 16.39 |
| d17 | 3.47 | 3.35 |

Data on zoom lens groups

| Group | Starting surface | Focal length |
|---|---|---|
| 1 | 1 | 32.99 |
| 2 | 5 | −7.46 |
| 3 | 10 | 11.04 |
| 4 | 12 | 13.79 |

Numerical Example 10

| Unit mm | | | | |
|---|---|---|---|---|
| Surface data | | | | |
| Surface No. | r | d | nd | vd |
| 1 | 26.646 | 0.80 | 2.00170 | 20.64 |
| 2 | 17.953 | 3.62 | 1.77250 | 49.60 |
| 3 (Aspheric surface) | −162.646 | Variable | | |
| 4 | −236.052 | 0.60 | 1.83215 | 52.64 |
| 5 | 6.289 | 0.24 | 1.63494 | 23.22 |
| 6 (Aspheric surface) | 7.233 | 2.52 | | |
| 7 | −149.168 | 1.36 | 2.10225 | 16.79 |
| 8 | −24.338 | 0.70 | 1.83481 | 42.71 |
| 9 (Aspheric surface) | 59.636 | Variable | | |
| 10 (Stop) | ∞ | 0.30 | | |
| 11 (Aspheric surface) | 5.629 | 2.38 | 1.69350 | 53.21 |
| 12 (Aspheric surface) | −15.404 | 0.13 | | |
| 13 | 5.807 | 1.46 | 1.49700 | 81.54 |
| 14 | 77.126 | 0.70 | 2.00330 | 28.27 |
| 15 | 3.551 | Variable | | |
| 16 (Aspheric surface) | 22.964 | 2.63 | 1.76802 | 49.24 |
| 17 (Aspheric surface) | −18.454 | Variable | | |
| 18 | ∞ | 0.40 | 1.54771 | 62.84 |
| 19 | ∞ | 0.50 | | |
| 20 | ∞ | 0.50 | 1.51633 | 64.14 |
| 21 | ∞ | 0.40 | | |
| Image plane | ∞ | | | |

Aspheric surface data $3^{th}$ surface

K = 0.000, A4 = 5.58584E−06, A6 = 4.21703E−09,
A8 = −1.12281E−10, A10 = 4.72629E−13

$6^{th}$ surface

K = 0.487, A4 = 8.69716E−05, A6 = 7.12828E−06,
A8 = −3.55339E−07, A10 = 5.92395E−10

$9^{th}$ surface

K = −2.956, A4 = −3.31230E−04, A6 = 1.22795E−06,
A8 = 4.76799E−09, A10 = −2.51623E−09

$11^{th}$ surface

K = 0.811, A4 = −1.28273E−03, A6 = −4.09585E−05,
A8 = −3.01714E−06, A10 = −1.43046E−08

$12^{th}$ surface

K = −9.525, A4 = −1.36598E−05, A6 = −1.00435E−05,
A8 = −2.96772E−06,
A10 = 2.15875E−07

-continued

Unit mm

16th surface

K = 0.000, A4 = 8.21715E−05, A6 = −3.38254E−06

17th surface

K = 0.000, A4 = 9.59443E−05, A6 = −6.15221E−06,
A8 = 5.13697E−08

Zoom lens data

Zoom ratio 9.561

|  | Wide-angle | Point of change on the wide-angle side | Intermediate |
|---|---|---|---|
| Focal length | 5.11 | 8.74 | 15.88 |
| F-number | 3.32 | 4.20 | 4.90 |
| Angle of view | 79.64 | 47.50 | 26.87 |
| Image height | 3.88 | 3.88 | 3.88 |
| Total lens length | 42.77 | 46.48 | 50.33 |
| BF | 5.24 | 5.00 | 5.40 |
| d3 | 0.20 | 3.80 | 8.74 |
| d9 | 16.28 | 12.15 | 7.57 |
| d15 | 3.62 | 8.08 | 10.95 |
| d17 | 3.75 | 3.51 | 3.91 |

|  | Point of change on the telephoto side | Telephoto |
|---|---|---|
| Focal length | 28.04 | 48.85 |
| F-number | 5.54 | 5.96 |
| Angle of view | 15.52 | 9.05 |
| Image height | 3.88 | 3.88 |
| Total lens length | 56.41 | 57.20 |
| BF | 4.96 | 4.79 |
| d3 | 14.13 | 17.48 |
| d9 | 5.56 | 1.50 |
| d15 | 14.19 | 15.70 |
| d17 | 3.47 | 3.3 |

Data on zoom lens groups

| Group | Starting surface | Focal length |
|---|---|---|
| 1 | 1 | 33.95 |
| 2 | 5 | −7.25 |
| 3 | 10 | 10.93 |
| 4 | 12 | 13.70 |

Numerical Example 11

Unit mm

Surface data

| Surface No. | r | d | nd | vd |
|---|---|---|---|---|
| 1 | 24.015 | 0.80 | 2.00170 | 20.64 |
| 2 | 16.974 | 3.62 | 1.77250 | 49.60 |
| 3 (Aspheric surface) | −253.655 | Variable | | |
| 4 (Aspheric surface) | −243.002 | 0.80 | 1.83481 | 42.71 |
| 5 (Aspheric surface) | 7.120 | 2.31 | | |
| 6 | 544.958 | 2.28 | 1.92286 | 20.88 |
| 7 | −11.937 | 0.80 | 1.83481 | 42.71 |
| 8 (Aspheric surface) | 41.477 | Variable | | |
| 9 (Stop) | ∞ | 0.30 | | |
| 10 (Aspheric surface) | 6.151 | 2.40 | 1.83215 | 52.64 |
| 11 (Aspheric surface) | −35.853 | 0.11 | | |
| 12 | 5.789 | 1.46 | 1.49700 | 81.54 |
| 13 | 56.461 | 0.72 | 2.00330 | 28.27 |
| 14 | 3.690 | Variable | | |
| 15 (Aspheric surface) | 36.030 | 3.21 | 1.76802 | 49.24 |
| 16 (Aspheric surface) | −13.321 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.40 | | |
| Image plane | ∞ | | | |

Aspheric surface data

3th surface

K = 0.000, A4 = 6.81732E−06, A6 = −1.87037E−09,
A8 = −1.55320E−10, A10 = 9.02677E−13

4th surface

K = 9.661, A4 = −3.93280E−05, A6 = −2.00203E−07,
A8 = 3.14929E−08, A10 = −3.33174E−10

5th surface

K = 0.420, A4 = 1.01051E−05, A6 = 4.74267E−06,
A8 = −3.60845E−07, A10 = 1.07778E−08

8th surface

K = −2.310, A4 = −3.40789E−04, A6 = −1.41899E−06,
A8 = 4.66531E−08, A10 = −4.58829E−09

10th surface

K = 1.136, A4 = −8.36807E−04, A6 = −1.43011E−05,
A8 = −2.79474E−06, A10 = 1.19726E−07

11th surface

K = −2.974, A4 = 4.74908E−04, A6 = 2.49079E−05,
A8 = −4.47656E−06, A10 = 5.01551E−07

15th surface

K = 0.000, A4 = 6.93230E−05, A6 = −4.75813E−06

16th surface

K = 0.000, A4 = 1.85197E−04, A6 = −6.73714E−06,
A8 = 3.90176E−08

Zoom lens data

Zoom ratio 9.626

|  | Wide-angle | Point of change on the wide-angle side | Intermediate |
|---|---|---|---|
| Focal length | 5.13 | 8.88 | 15.73 |
| F-number | 3.20 | 4.12 | 4.84 |
| Angle of view | 81.58 | 47.25 | 27.06 |
| Image height | 3.88 | 3.88 | 3.88 |
| Total lens length | 42.99 | 46.61 | 52.19 |
| BF | 5.40 | 5.11 | 5.30 |
| d3 | 0.18 | 3.37 | 8.37 |
| d8 | 15.82 | 11.68 | 8.42 |
| d14 | 2.78 | 7.64 | 11.28 |
| d16 | 3.92 | 3.62 | 3.81 |

|  | Point of change on the telephoto side | Telephoto |
|---|---|---|
| Focal length | 28.05 | 49.36 |
| F-number | 5.46 | 6.03 |
| Angle of view | 15.48 | 8.93 |
| Image height | 3.88 | 3.88 |
| Total lens length | 56.69 | 57.77 |
| BF | 5.15 | 4.46 |
| d3 | 12.90 | 16.11 |
| d8 | 5.46 | 1.81 |
| d14 | 14.36 | 16.57 |
| d16 | 3.66 | 2.97 |

-continued

Unit mm

Data on zoom lens groups

| Group | Starting surface | Focal length |
|---|---|---|
| 1 | 1 | 32.00 |
| 2 | 5 | −7.26 |
| 3 | 10 | 10.92 |
| 4 | 12 | 13.03 |

Numerical Example 12

Unit mm

Surface data

| Surface No. | r | d | nd | vd |
|---|---|---|---|---|
| 1 | 22.671 | 0.80 | 2.00170 | 20.64 |
| 2 | 16.396 | 3.45 | 1.77250 | 49.60 |
| 3 (Aspheric surface) | −1488.590 | Variable | | |
| 4 (Aspheric surface) | 1299.471 | 0.80 | 1.83481 | 42.71 |
| 5 (Aspheric surface) | 6.672 | 2.32 | | |
| 6 | 104.804 | 2.16 | 1.92286 | 20.88 |
| 7 | −11.068 | 0.80 | 1.83481 | 42.71 |
| 8 (Aspheric surface) | 28.360 | Variable | | |
| 9 (Stop) | ∞ | 0.30 | | |
| 10 (Aspheric surface) | 4.896 | 2.31 | 1.49700 | 81.54 |
| 11 (Aspheric surface) | −14.013 | 0.10 | | |
| 12 | 5.674 | 1.29 | 1.83215 | 52.64 |
| 13 | 7.987 | 0.49 | 2.00330 | 28.27 |
| 14 | 3.398 | Variable | | |
| 15 (Aspheric surface) | −181.101 | 2.51 | 1.74330 | 49.33 |
| 16 (Aspheric surface) | −11.855 | Variable | | |
| 17 | ∞ | 0.40 | 1.54771 | 62.84 |
| 18 | ∞ | 0.50 | | |
| 19 | ∞ | 0.50 | 1.51633 | 64.14 |
| 20 | ∞ | 0.40 | | |
| Image plane | ∞ | | | |

Aspheric surface data $3^{th}$ surface

K = −3.972, A4 = 4.13394E−06, A6 = 4.63395E−08, A8 = −6.50879E−10, A10 = 2.90626E−12

$4^{th}$ surface

K = −0.111, A4 = −6.14674E−05, A6 = −3.33679E−07, A8 = 2.92803E−08, A10 = −2.45626E−10

$5^{th}$ surface

K = 0.413, A4 = 3.81035E−05, A6 = 2.66968E−06, A8 = −4.09971E−07, A10 = 1.54581E−09

$8^{th}$ surface

K = −4.603, A4 = −3.96628E−04, A6 = −3.58192E−06, A8 = 3.21097E−07, A10 = −1.28816E−08

$10^{th}$ surface

K = 0.157, A4 = −1.15088E−03, A6 = −2.04327E−05, A8 = −1.90641E−06, A10 = 5.82253E−08

$11^{th}$ surface

K = −0.203, A4 = 4.53698E−04, A6 = 5.77349E−06, A8 = −2.08968E−06, A10 = 1.93213E−07

$15^{th}$ surface

K = 0.000, A4 = −2.25008E−04, A6 = 1.13444E−05, A8 = 2.19589E−08, A10 = −4.77186E−09

-continued

Unit mm $16^{th}$ surface

K = 0.000, A4 = −1.39272E−04, A6 = 9.25184E−07, A8 = 4.18731E−07, A10 = −9.51364E−09

Zoom lens data

| Zoom ratio | 9.497 | |
|---|---|---|
| | Wide-angle | Point of change on the wide-angle side | Intermediate |

| | Wide-angle | Point of change on the wide-angle side | Intermediate |
|---|---|---|---|
| Focal length | 5.15 | 8.81 | 15.79 |
| F-number | 3.36 | 4.23 | 4.74 |
| Angle of view | 81.46 | 48.51 | 27.59 |
| Image height | 3.88 | 3.88 | 3.88 |
| Total lens length | 42.90 | 45.61 | 50.92 |
| BF | 6.03 | 5.53 | 5.55 |
| d3 | 0.31 | 3.41 | 8.39 |
| d8 | 15.45 | 11.12 | 7.82 |
| d14 | 3.78 | 8.22 | 11.82 |
| d16 | 4.54 | 4.04 | 4.06 |

| | Point of change on the telephoto side | Telephoto |
|---|---|---|
| Focal length | 28.07 | 48.87 |
| F-number | 5.31 | 5.96 |
| Angle of view | 15.86 | 9.21 |
| Image height | 3.88 | 3.88 |
| Total lens length | 55.58 | 57.43 |
| BF | 6.67 | 4.91 |
| d3 | 12.52 | 16.07 |
| d8 | 4.28 | 1.69 |
| d14 | 14.78 | 17.43 |
| d16 | 5.18 | 3.42 |

Data on zoom lens groups

| Group | Starting surface | Focal length |
|---|---|---|
| 1 | 1 | 32.33 |
| 2 | 5 | −6.91 |
| 3 | 10 | 10.64 |
| 4 | 12 | 16.96 |

Numerical Example 13

Unit mm

Surface data

| Surface No. | r | d | nd | vd |
|---|---|---|---|---|
| 1 | 22.545 | 0.80 | 2.00170 | 20.64 |
| 2 | 16.271 | 3.62 | 1.77250 | 49.60 |
| 3 (Aspheric surface) | −1866.195 | Variable | | |
| 4 (Aspheric surface) | 336.502 | 0.80 | 1.85135 | 40.10 |
| 5 (Aspheric surface) | 6.696 | 2.45 | | |
| 6 | −538.834 | 2.11 | 2.00170 | 20.64 |
| 7 | −12.049 | 0.70 | 1.83481 | 42.71 |
| 8 (Aspheric surface) | 34.337 | Variable | | |
| 9 (Stop) | ∞ | 0.30 | | |
| 10 (Aspheric surface) | 5.566 | 2.38 | 1.69350 | 53.21 |
| 11 (Aspheric surface) | −20.592 | 0.24 | | |
| 12 | 5.325 | 1.46 | 1.49700 | 81.54 |
| 13 | 26.066 | 0.49 | 2.00330 | 28.27 |
| 14 | 3.610 | Variable | | |
| 15 (Aspheric surface) | 113.721 | 2.63 | 1.83215 | 52.64 |
| 16 (Aspheric surface) | −12.883 | Variable | | |
| 17 | ∞ | 0.40 | 1.54771 | 62.84 |

-continued

Unit mm

| | | | | |
|---|---|---|---|---|
| 18 | ∞ | 0.50 | | |
| 19 | ∞ | 0.50 | 1.51633 | 64.14 |
| 20 | ∞ | 0.40 | | |
| Image plane | | | | |

Aspheric surface data

3$^{th}$ surface

K = 0.000, A4 = 5.08364E−06, A6 = 3.41144E−08,
A8 = −5.88576E−10, A10 = 2.81863E−12

4$^{th}$ surface

K = 9.661, A4 = −4.47800E−05, A6 = −1.20108E−07,
A8 = 1.58391E−08, A10 = −1.44111E−10

5$^{th}$ surface

K = 0.487, A4 = 4.93916E−05, A6 = 3.80336E−06,
A8 = −9.83565E−08, A10 = −5.00988E−09

8$^{th}$ surface

K = −1.646, A4 = −4.04950E−04, A6 = −5.36331E−06,
A8 = 3.14517E−07, A10 = −1.26534E−08

10$^{th}$ surface

K = 1.102, A4 = −1.16204E−03, A6 = −2.33075E−05,
A8 = −2.85193E−06, A10 = 2.22370E−08

11$^{th}$ surface

K = −6.790, A4 = 6.43645E−04, A6 = 3.76891E−05,
A8 = −4.47964E−06, A10 = 7.00385E−07

15$^{th}$ surface

K = 0.000, A4 = 1.49732E−05, A6 = −1.23528E−08

16$^{th}$ surface

K = 0.000, A4 = 6.96782E−05, A6 = −2.35661E−06,
A8 = 4.80141E−08

Zoom lens data

Zoom ratio 9.464

| | Wide-angle | Point of change on the wide-angle side | Intermediate |
|---|---|---|---|
| Focal length | 5.17 | 8.82 | 15.82 |
| F-number | 3.25 | 4.05 | 4.78 |
| Angle of view | 81.47 | 48.24 | 27.47 |
| Image height | 3.88 | 3.88 | 3.88 |
| Total lens length | 43.06 | 45.56 | 50.98 |
| BF | 5.12 | 5.09 | 5.37 |
| d3 | 0.24 | 3.43 | 8.43 |
| d8 | 15.78 | 11.30 | 7.94 |
| d14 | 3.94 | 7.76 | 11.25 |
| d16 | 3.63 | 3.6 | 3.88 |

| | Point of change on the telephoto side | Telephoto |
|---|---|---|
| Focal length | 28.03 | 48.96 |
| F-number | 5.48 | 5.98 |
| Angle of view | 15.91 | 9.22 |
| Image height | 3.88 | 3.88 |
| Total lens length | 55.78 | 57.41 |
| BF | 5.19 | 4.79 |
| d3 | 12.76 | 16.12 |
| d8 | 5.21 | 1.80 |
| d14 | 14.64 | 16.72 |
| d16 | 3.7 | 3.29 |

Data on zoom lens groups

| Group | Starting surface | Focal length |
|---|---|---|
| 1 | 1 | 32.28 |
| 2 | 5 | −7.00 |

-continued

Unit mm

| | | |
|---|---|---|
| 3 | 10 | 10.49 |
| 4 | 12 | 14.04 |

FIGS. 14 to 26 are aberration diagrams for Examples 1 to 13 upon focusing on an object point at infinity. In these aberration diagrams, (a), (b) and (c) are indicative of spherical aberrations, astigmatism, distortion and chromatic aberration of magnification at the wide-angle end, in the intermediate state, and at the telephoto end, respectively.

Tabulated below are the values of conditions (1) to (11) in Examples 1 to 13.

| Condition | Example 1 | Example 2 | Example 3 | Example 4 | Example 5 |
|---|---|---|---|---|---|
| (1) | 1.83215 | 1.83215 | 1.83215 | 1.83215 | 1.90000 |
| (2) | 52.64 | 52.64 | 52.64 | 52.64 | 52.64 |
| (3) | −1.198 | −1.320 | −1.364 | −0.973 | −1.392 |
| (4) | 0.971 | 0.939 | 0.925 | 1.116 | 0.925 |
| (5) | 0.09071 | 0.09071 | 0.09071 | 0.16955 | 0.02286 |
| (6) | 33.74 | 33.74 | 33.74 | 31.99 | 33.74 |
| (7) | 0.775 | 0.799 | 0.833 | 0.653 | 0.775 |
| (8) | 0.157 | 0.156 | 0.152 | 0.150 | 0.157 |
| (9) | 9.563 | 9.557 | 9.582 | 9.477 | 9.454 |
| (10) | 0.756 | 0.756 | 0.758 | 0.756 | 0.746 |
| (11) | 16.323 | 16.608 | 16.850 | 14.703 | 16.273 |

| Condition | Example 6 | Example 7 | Example 8 | Example 9 | Example 10 |
|---|---|---|---|---|---|
| (1) | 1.90000 | 1.88000 | 1.77250 | 1.77250 | 1.77250 |
| (2) | 60.00 | 62.00 | 49.60 | 49.60 | 49.60 |
| (3) | −1.369 | −1.353 | −0.819 | −0.806 | −0.801 |
| (4) | 0.925 | 0.950 | 1.139 | 1.139 | 1.139 |
| (5) | 0.10170 | 0.12170 | 0.22920 | 0.22920 | 0.22920 |
| (6) | 38.00 | 40.00 | 28.96 | 28.96 | 28.96 |
| (7) | 0.774 | 0.776 | 0.672 | 0.676 | 0.695 |
| (8) | 0.156 | 0.156 | 0.151 | 0.153 | 0.148 |
| (9) | 9.570 | 9.549 | 9.492 | 9.520 | 9.561 |
| (10) | 0.756 | 0.754 | 0.755 | 0.757 | 0.759 |
| (11) | 16.280 | 16.298 | 14.802 | 14.815 | 14.822 |

| Condition | Example 11 | Example 12 | Example 13 |
|---|---|---|---|
| (1) | 1.77250 | 1.77250 | 1.77250 |
| (2) | 49.60 | 49.60 | 49.60 |
| (3) | −0.875 | −0.978 | −0.983 |
| (4) | 1.139 | 1.095 | 1.139 |
| (5) | 0.22920 | 0.22920 | 0.22920 |
| (6) | 28.96 | 28.96 | 28.96 |
| (7) | 0.648 | 0.662 | 0.659 |
| (8) | 0.147 | 0.141 | 0.143 |
| (9) | 9.626 | 9.497 | 9.464 |
| (10) | 0.757 | 0.754 | 0.750 |
| (11) | 14.969 | 14.881 | 14.876 |

Each example may be modified as follows.

Preferably, the total number of lenses should be 9 or less. A lot more lenses would result in increases in the size and cost of the zoom lens system.

In each example, images may be recorded or displayed while barrel distortion produced on the wide-angle side is electrically corrected. With the zoom lens of each example, there is barrel distortion produced on a rectangular photoelectric transformation plane at the wide-angle end. On the other hand, distortion is prevented from occurring in a state near an intermediate focal length or at the telephoto end. For electrical correction of distortion, the effective imaging area is configured into a barrel shape at the wide-angle end and a rectangular shape in the intermediate focal length state or at the telephoto end. And the preset effective imaging area is subjected by image processing to image transformation; it is transformed into rectangular image information with decreased distortion.

An image height IHw at the wide-angle end is supposed to be lower than an image height IHs in the intermediate focal length state or an image height IHt at the telephoto end.

For instance, the effective imaging area is determined such that the length at the wide-angle end of the photoelectric transformation plane in the short-side direction is the same as the length of the effective imaging area in the short-side direction, and there is about −3% of distortion still remaining after image processing; however, of course, an image transformed into a rectangular shape with a smaller barrel area used as the effective imaging area may be recorded and reproduced.

Figure 27:
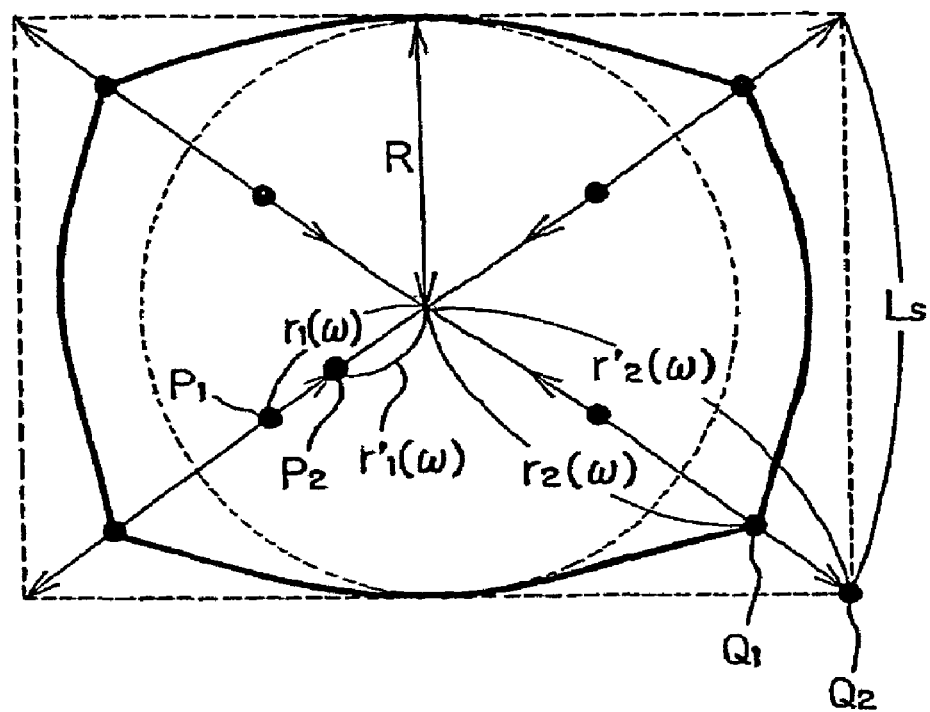
FIG. 27 is illustrative of correction of distortion.

As shown typically in FIG. 27, there is a magnification fixed on the circumference (image height) of a circle of radius R inscribed in the long side of an effective imaging plane with the point of intersection of an optical axis with the imaging plane as a center, and that circumference is used as the reference for correction. And then, points on the circumference of other arbitrary circle of radius r(ω) are moved in substantially radial directions; they are concentrically moved to a radius r (ω) for correction. In FIG. 27 as an example, a point $P_1$ on the circumference of an arbitrary circle of radius $r_1$ (ω) positioned inside the circle of radius R is moved to a point $P_2$ on the circumference of an arbitrary circle of radius $r_2$ to be corrected in a direction toward the center of the circle. On the other hand, a point $Q_1$ on the circumference of an arbitrary circle of radius $r_2$(ω) positioned outside the circle of radius R is moved to a point $Q_2$ on the circumference of a circle of radius $r_2$ (ω) to be corrected in a direction away from the center of the circle. Here, r(ω) may be represented by $r(\omega) = \alpha f \tan \omega (0 \leq \alpha \leq 1)$ where ω is a subject half angle of view, and f is the focal length of an imaging optical system (the zoom lens in the invention).

Here let Y be an ideal image height corresponding to ω on the aforesaid circle (image height) of radius R. Then, $\alpha = R/Y = R/f \tan \omega$ The optical system here is ideally rotationally symmetric about the optical axis; distortion occurs rotationally symmetrically about the optical axis, too. Therefore, when optically produced distortion is electrically corrected as described above, it would be favorable in view of the quantities of data and computation to implement correction by fixing, on a reproduced image, a magnification on the circumference (image height) of the circle of radius R inscribed in the long side of an effective imaging plane with the point of intersection of an optical axis with the imaging plane as a center, and moving points on the circumference (image height) of other arbitrary circle of radius r(ω) moved in substantially radial directions to move them concentrically to radius r(ω).

However, an optical image stops being a continuous quantity (for sampling) at the time of being imaged at an electronic imaging device. Strictly speaking, therefore, the aforesaid circle of radius R drawn on the optical image, too, stops being an accurate circle unless pixels on the electronic imaging device are lined up in a radial way. It follows that when it comes to the shape correction of image data represented per discrete coordinate point, there is none of the circle capable of fixing the aforesaid circle. It is therefore preferable to make use of a method that determines coordinates $(X_i, Y_j)$ for where the points are to be moved to per each pixel $(X_i, Y_j)$. Note that when two or more points $(X_i, Y_j)$ are moved to the coordinates $(X_i, Y_j)$, there is the average of the values the respective pixels have taken, and when there are no incoming points, interpolation may be implemented using the values of the coordinates $(X_i, Y_j)$ for some neighboring pixels.

Such a method is effective for especially when the aforesaid circle of radius R written on the aforesaid optical image becomes badly distorted and asymmetric with respect to the optical axis for the reason of fabrication errors of the optical system and electronic imaging device of an electronic imaging apparatus the zoom lens has. That method is also effective for correction of geometric distortion or the like occurring at the time of reproduction of signals as an image at the imaging device or various output devices.

With the electronic imaging apparatus of the invention, r(ω), i.e., the relation between the half angle of view and the image height or the relation between the real image height r and the ideal image height r/α may have been recorded in a recording medium built in it for the purpose of figuring out r(ω)−r(ω).

It is here noted that to prevent the image after the correction of distortion from running extremely short of light quantity at both ends in the short side direction, it is preferable for the aforesaid radius R to satisfy the following condition:

$0 \leq R \leq 0.6 L_s$ where $L_s$ is the length of the short side of the effective imaging plane.

For the aforesaid radius R it is more preferable to satisfy the following condition.

$0.3 L_s \leq R \leq 0.6 L_s$

Most preferably, the aforesaid radius R should be much the same as that of a circle inscribed in the effective imaging plane in the short side direction. Note here that the correction with the magnification fixed at or near the radius R=0, viz., at or near the optical axis is somewhat disadvantageous in terms of the substantial number of pixels; even in a wide-angle arrangement, however, there is the advantage of compactness still ensured.

It is noted that the focal length interval for which correction is in need is divided into several focal zones. And then, correction may be implemented in the same quantity as there is the result of correction obtained which satisfies substantially r(ω)=αf tan ω at or near the telephoto end within the divided focal zones. In that case, however, there is some barrel distortion still remaining at the wide-angle end within the divided focal zones. Too many divided zones are not that preferable because of the need of storing too much intrinsic data necessary for correction in the recording medium. Therefore, one or a few coefficients in association with the focal lengths in the divided focal zones have been figured out in advance. Such coefficients may have been determined on the basis of simulations or measuring devices. And then, there is the quantity of correction worked out corresponding to the result of correction that satisfies substantially r(ω)=αf tan ω at or near the telephoto end within the divided focal zones, and that amount of correction may be evenly multiplied by the aforesaid coefficients per focal length to obtain the final quantity of correction.

By the way, when there is no distortion in the image obtained by imaging an infinite object, $f = y/\tan \omega$ Here y is the height (image height) of an image point from the optical axis, f is the focal length of an imaging system (the zoom lens in the invention), and ω is the angle (subject half angle of view) with the optical axis of an object point direction corresponding to an image point formed from the center on the imaging plane to the position of y.

When there is barrel distortion in the imaging system, $$f > y/\tan \omega$$

It follows that with both the focal length f of the imaging system and the image height y kept constant, the value of ω grows large.

Preferably, the zoom lens has an image transformation block in which electric signals for an image taken through the zoom lens are transformed into image signals that are corrected by image processing for color shifts from chromatic aberration of magnification. Electric correction of the zoom lens for chromatic aberration of magnification is going to make sure much better images are obtained.

Generally speaking, an electronic still camera is designed such that the image of a subject is separated into three primary colors images: the first, the second and the third primary color image, so that the respective output signals are superposed one upon another by operation to reconstruct a color image. Suppose here that a zoom lens has chromatic aberration of magnification. Then, given an image from light of the first primary color, the positions where light of the second and the third primary color is imaged are going to be off the position where the light of the first primary color is imaged. For electronic correction of the image for chromatic aberration of magnification, the amount of shifts of the imaging positions for the second and the third primary color from that for the first primary color is previously found for each pixel of an imaging device based on aberration information about the zoom lens. Then, coordination transformation is implemented such that only the amount of the shifts from the first primary color is corrected for each pixel of the taken image. Referring typically to an image made up of three primary colors output signals of red (R), green (G) and blue (B), shifts of the imaging positions R and B from G are first found for each pixel. Then, coordination transformation is applied to the taken image to eliminate any shift from G, and finally signals of R and G are produced.

Chromatic aberration of magnification varies with zoom, focus and f numbers; it is preferable that the amount of shifts of the second and the third primary color from the first primary color is stored as correction data in a storage device for each lens position (zoom, focus and f numbers). By referring to this correction data depending on the zoom position, it is possible to produce the second and the third primary color signals that are corrected for the shifts of the second and the third primary color from the first primary color signal.

To cut off unessential light such as ghosts and flares, it is acceptable to rely on a flare stop other than the aperture stop. That flare stop may then be located somewhere on the object side of the first lens group, between the first and the second lens group, between the second and the third lens group, between the third and the fourth lens group, and between the fourth lens group and the image plane. A frame member or other member may also be located to cut off flare rays. For that purpose, the optical system may be directly printed, coated or sealed in any desired shape inclusive of round, oval, rectangular, polygonal shapes or a shape delimited by a function curve. Further, just only a harmful light beam but also coma flares around the screen may be cut off.

Each lens may be applied with an antireflection coating to reduce ghosts and flares. A multicoating is then desired because of being capable of effectively reducing ghosts and flares. Each lens, a cover glass or the like may just as well be applied with an infrared cut coating.

Desirously, focusing for adjusting the focus is implemented with the fourth lens group. Focusing with the fourth lens group eases off loads on a motor because the lens weight is light, and works for making the lens barrel compact because there is none of the change in the total length during zooming, and a drive motor is mounted in the lens barrel. As noted just above, it is desired that focusing is implemented with the fourth lens group; however, it may be implemented with the first, the second or the third lens group, or by the movement of multiple lens groups. Furthermore, focusing may be implemented by letting out the whole lens system or letting out or in some lenses.

The shading of brightness at the peripheral portion of an image may be reduced by shifting the mircolenses of a CCD. For instance, the CCD microlens design may be modified in conformity with the angle of incidence of light rays at each image height, or decreases in the quantity of light at the peripheral position of the image may be corrected by image processing.

An antireflection coating is generally applied to the air contact surface of a lens for the purpose of preventing ghosts and flares. At the cementing surface of a cemented lens, on the other hand, the refractive index of an adhesive material is much higher than that of air; in most cases, the cementing surface has a reflectivity that is on a par with or lower than that of a single layer coating, so that there is little need of applying the antireflection coating to it. However, if the antireflection coating is intentionally applied to the cementing surface too, there are then further reductions achievable in ghosts and flares, which could in turn make sure images of better quality.

Especially in recent years, vitreous materials having high refractive indices have gained popularity, and they have often been used with camera optical systems for the reasons of their enhanced effect on correction of aberrations. When a high-refractive-index vitreous material is used as a cemented lens, however, the reflection of light off the cementing surface would also be not negligible. In such a case, it would be particularly effective to have an antireflection coating applied on the cementing surface.

Effective use of cementing surface coating is disclosed in JP(A) s 2-27301, 2001-324676 and 2005-92115 and U.S. Pat. No. 7,116,482, etc. In those publications, there is the particular mention of the cementing lens surface coating in the first lens group of the zoom lens having positive power at the foremost lens group. In the invention, too, the cementing lens surface in the first lens group of positive power may just as well be coated, as set forth there.

Depending on the refractive index of the lens involved and the refractive index of the adhesive material used, use may be made of coating materials of relatively high refractive indices such as $Ta_2O_5$, $TiO_2$, $Nb_2O_5$, $ZrO_2$, $HfO_2$, $CeO_2$, $SnO_2$, $In_2O_3$, $ZnO$, and $Y_2O_3$ as well as coating materials of relatively low refractive indices such as $MgF_2$, $SiO_{21}$ and $Al_2O_3$. These coating materials may then have a suitable thickness selected in such a way as to meet phase conditions.

As a matter of course, the cementing surface coating may just as well be multi-coating as is the case with the coating to the air contact surface of the lens. By optional combinations of two- or multi-layer coating materials with thicknesses, it is possible to achieve a further lowering of reflectivity, and control the spectral and angle properties of reflectivity, etc. On the base of a similar idea, cementing surface coating can effectively be applied to lens cementing surfaces other than those in the first lens group, too.

Although not specifically shown in the numerical examples, the zoom lens of the invention may comprise five lens groups: in order from the object side, the positive first group, the negative second group, the positive third group, the negative fourth group, and the positive fifth group. It is then preferable that upon zooming from the wide-angle end to the telephoto end, the first group moves such that it is positioned more on the object side at the telephoto end than at the wide-angle end; the second group moves; the third group moves such that it is positioned more on the object side at the telephoto end than at the wide-angle end; the fourth group moves; the fifth group moves, and the aperture stop moves. In that case, the first group may move toward the object side only or in a convex locus toward the object or image side; the second lens group may move toward the object side only or in a locus toward the object or image side; the third group may move toward the object side only or in a convex locus toward the object side; the fourth group may move toward the object side only or in a locus toward the object or image side; the fifth group may move such that it is positioned more on the object or image side at the telephoto end than at the wide-angle end, or monotonously or in a convex locus toward the object or image side.

Preferably, the aperture stop and a shutter unit are located between the second group and the third group, and move in unison with the third group at the time of zooming. This is because the entrance pupil can be positioned nearer to the object side and the exit pupil can be far away from the image plane. Further, since that location is a place where the height of off-axis rays goes low, the shutter unit is prevented from getting bulky and there is a limited dead space upon the movement of the aperture stop and shutter unit.

Thus, all the lens groups are so movable that each lens group can have an effective zooming function, making it possible to achieve high performance even with a wide-angle, higher-zoom-ratio arrangement. Also, by the movement of the aperture stop, it is just only possible to make effective correction of chromatic aberration of magnification and distortion thereby achieving better performance, but also it is possible to gain proper control of the entrance and exit pupil positions. That is, a sensible balance is made between the heights of rays of off-axis light beams at the wide-angle end and telephoto end, so that the outer diameter of the first lens group and the outer diameter of the lens group nearest to the image plane side can be set up in a well-balanced, compact fashion. The decrease of the outer diameter of the first lens group at the wide-angle end in particular leads effectively to the decrease in the size of the lenses in the thickness direction. Further, since it is possible to control the fluctuations of the exit pupil position in such a way as to decrease during zooming, it is possible to keep the angle of rays incident on a CCD, a CMOS or the like within a proper range so that shading at the corners of the screen can be avoided for convenient use on the electronic imaging device.

Figure 18:
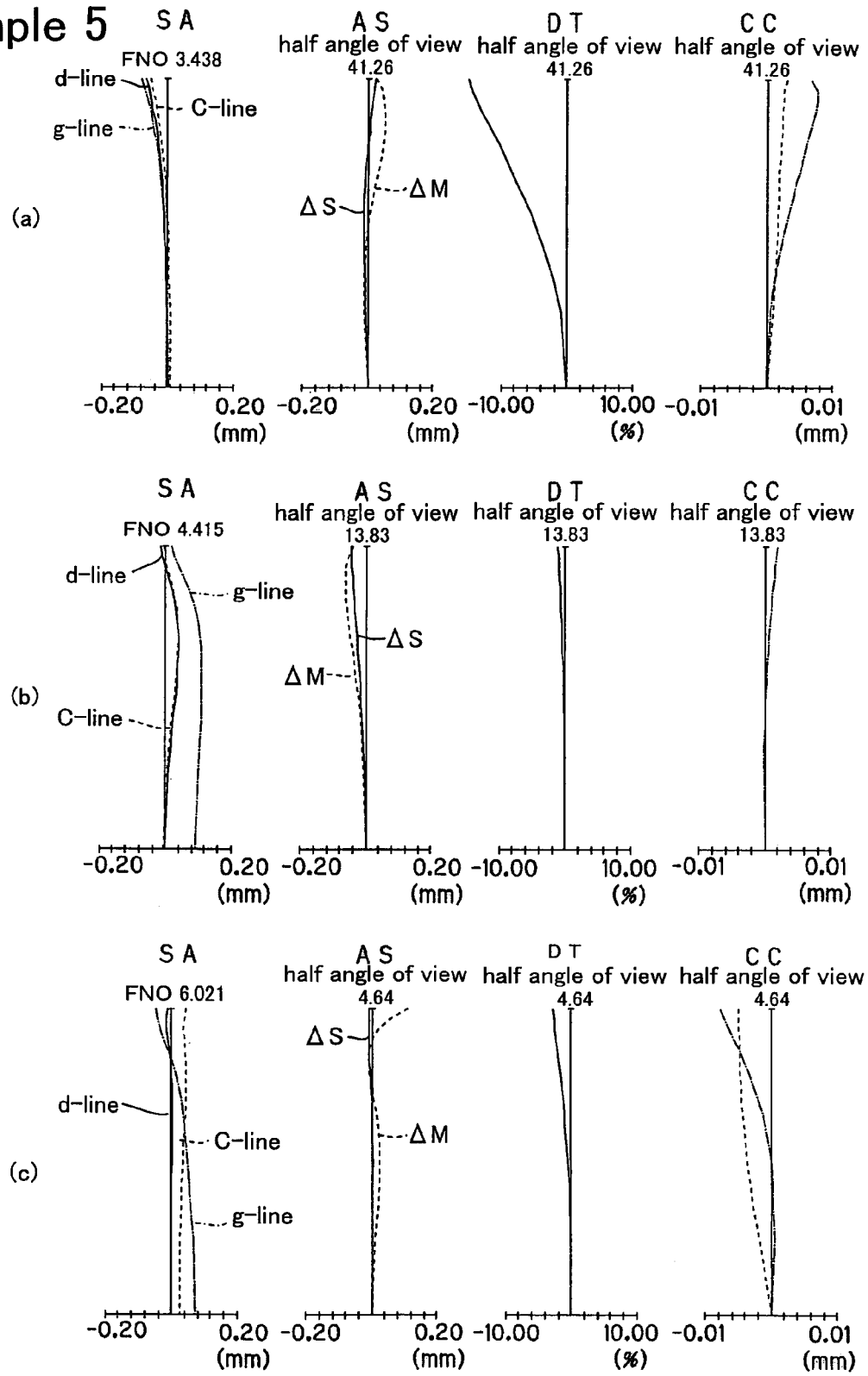
FIG. 18 is an aberration diagram for Example 5 upon focusing on an object point at infinity.
Figure 19:
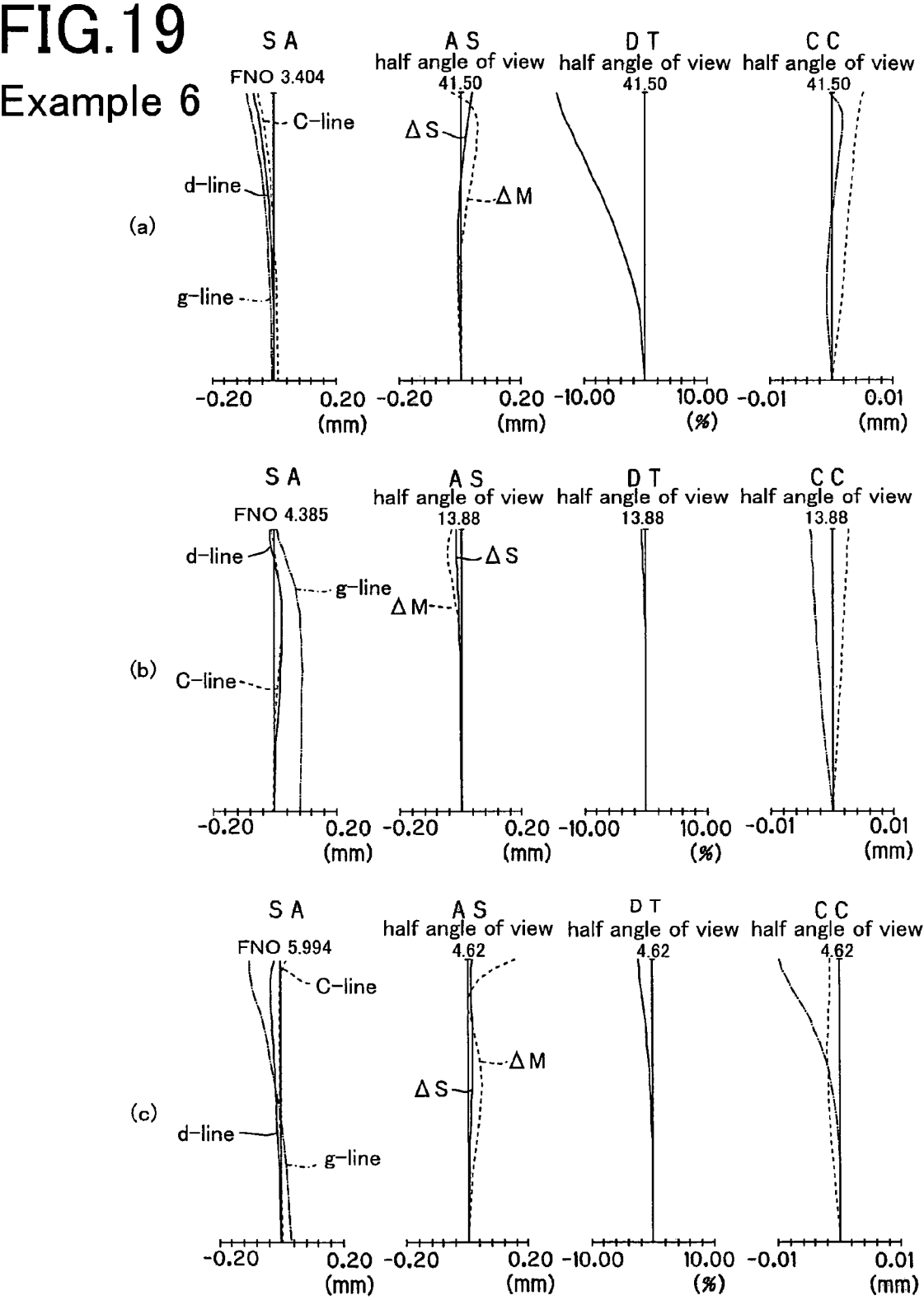
FIG. 19 is an aberration diagram for Example 6 upon focusing on an object point at infinity.
Figure 20:
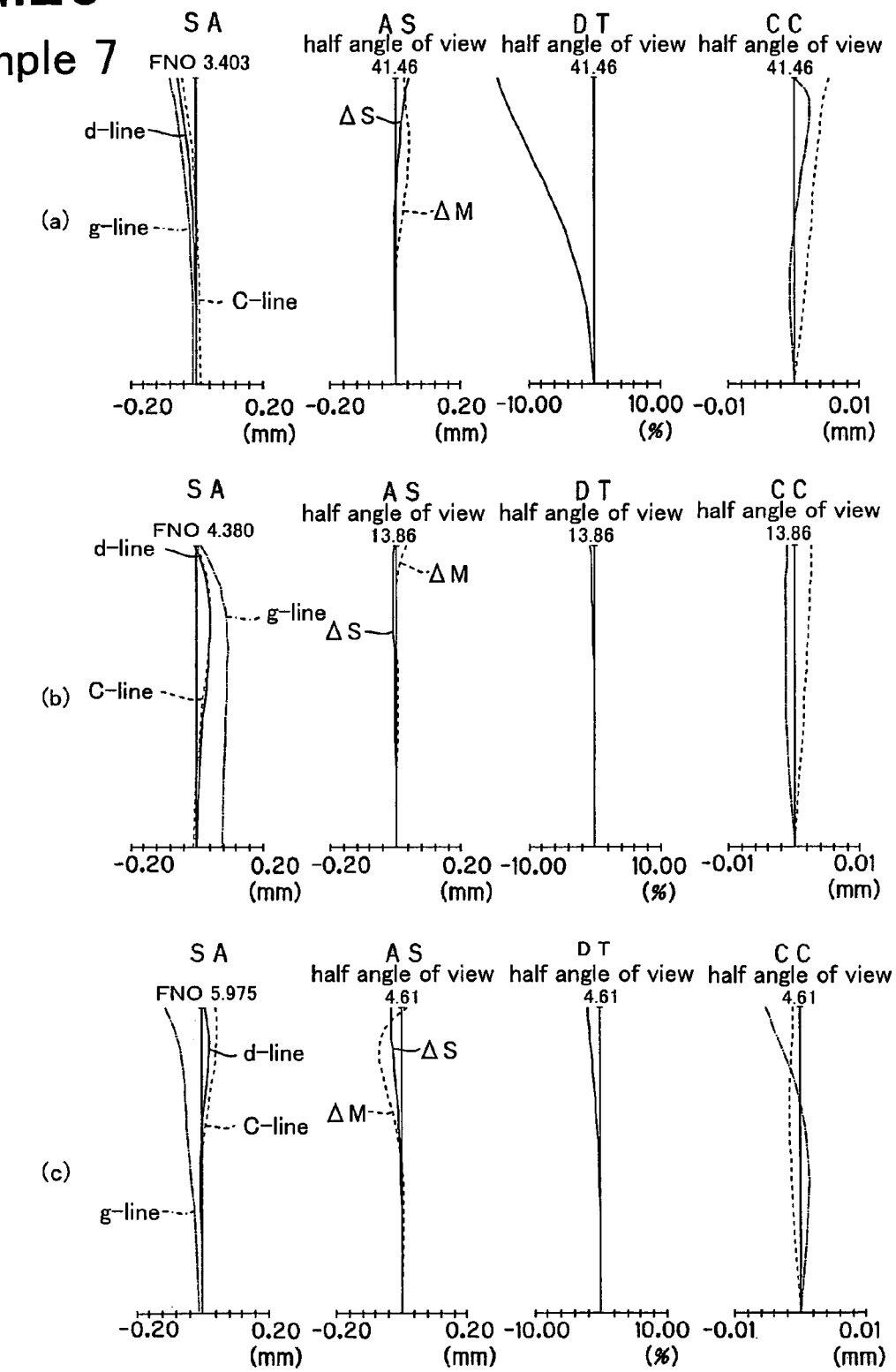
FIG. 20 is an aberration diagram for Example 7 upon focusing on an object point at infinity.
Figure 21:
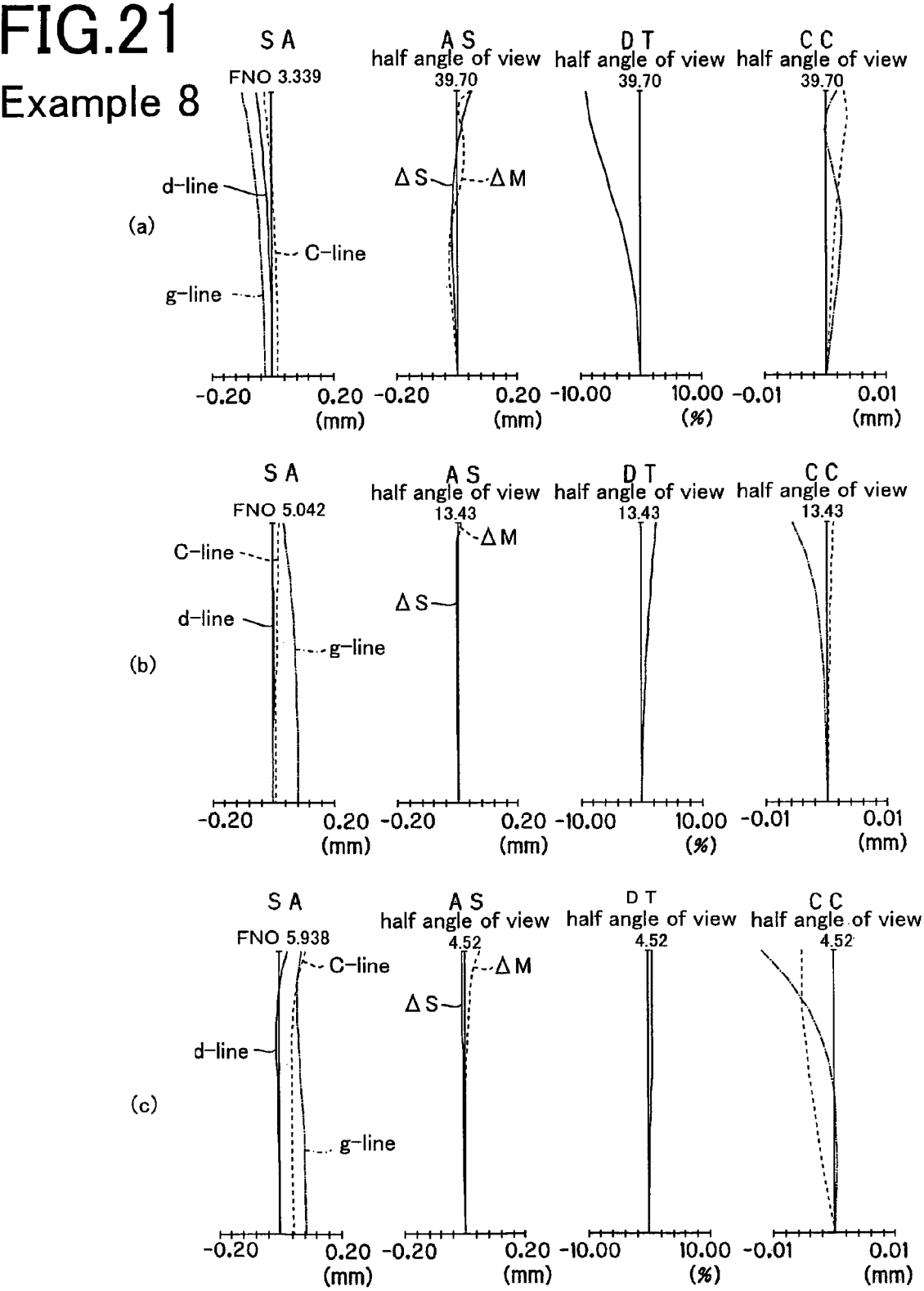
FIG. 21 is an aberration diagram for Example 8 upon focusing on an object point at infinity.
Figure 22:
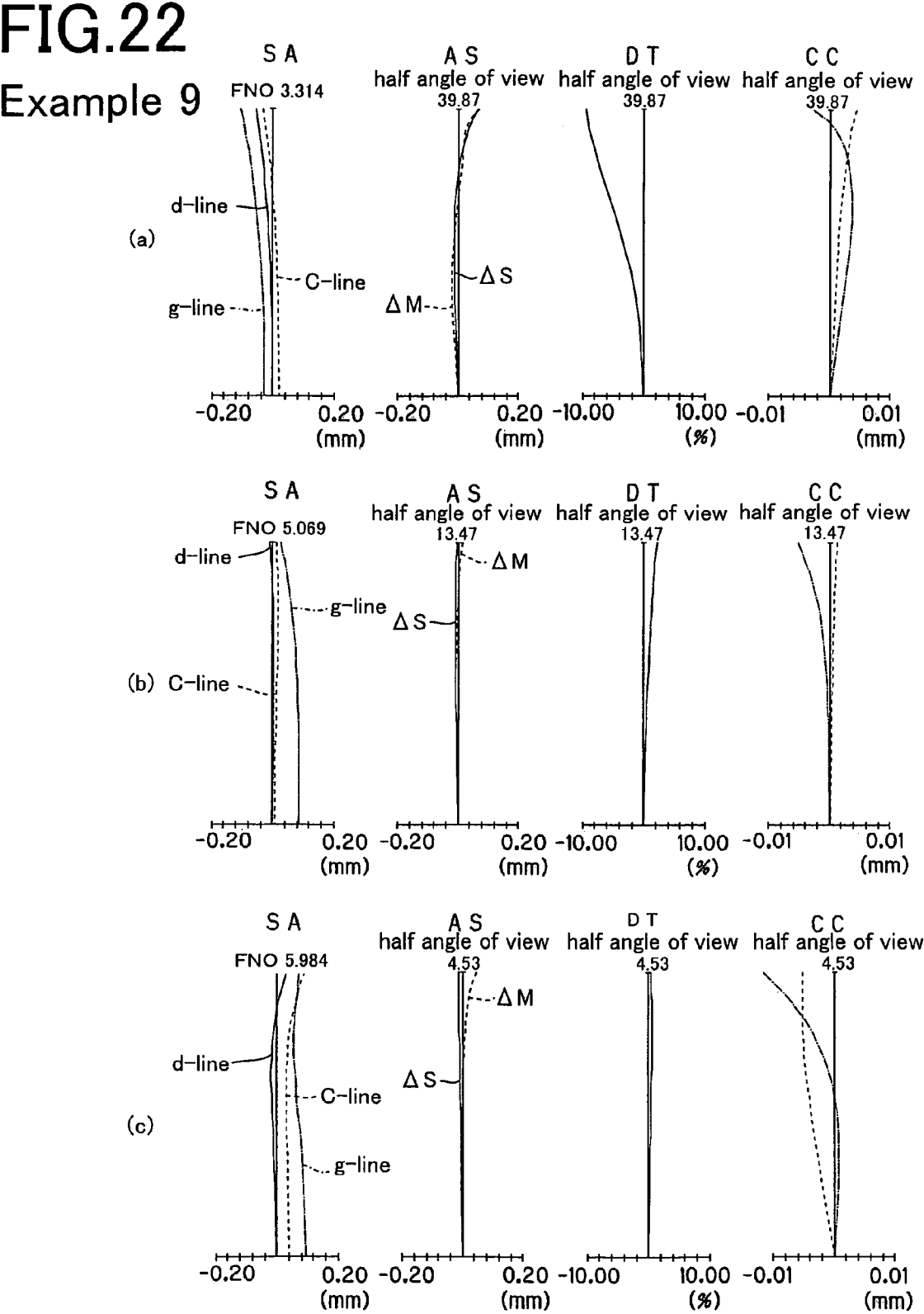
FIG. 22 is an aberration diagram for Example 9 upon focusing on an object point at infinity.
Figure 24:
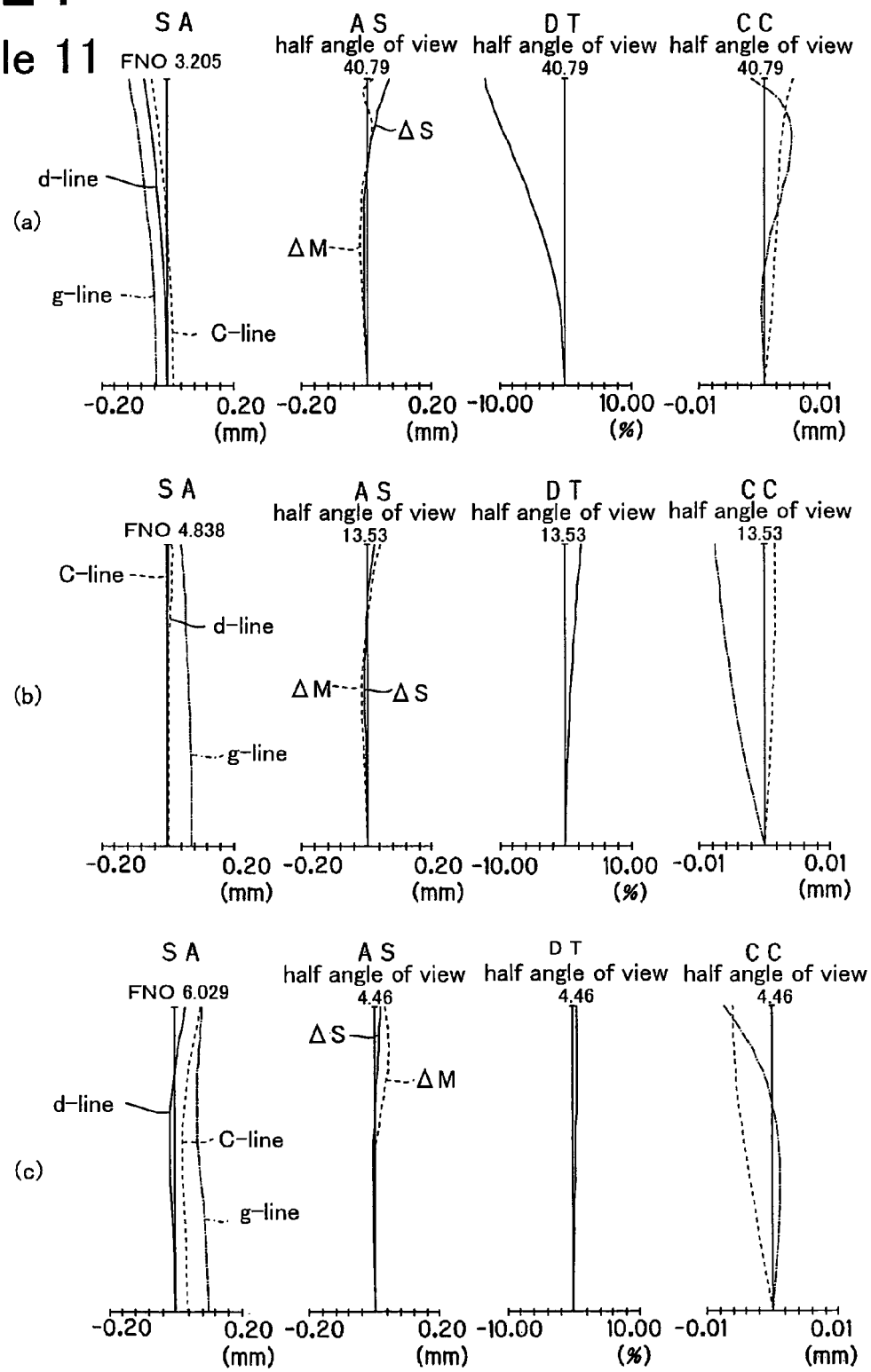
FIG. 24 is an aberration diagram for Example 11 upon focusing on an object point at infinity.
Figure 25:
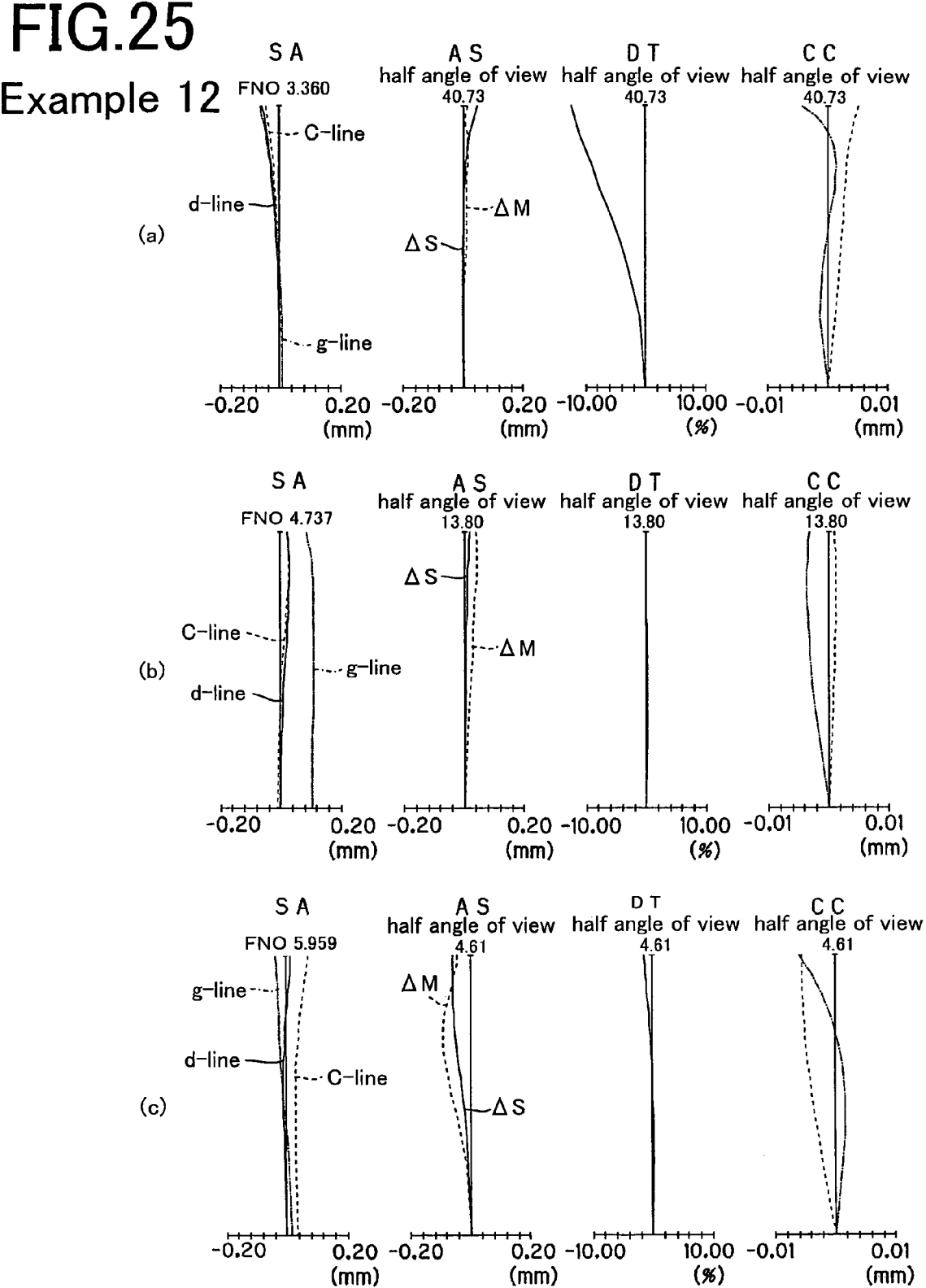
FIG. 25 is an aberration diagram for Example 12 upon focusing on an object point at infinity.
Figure 26:
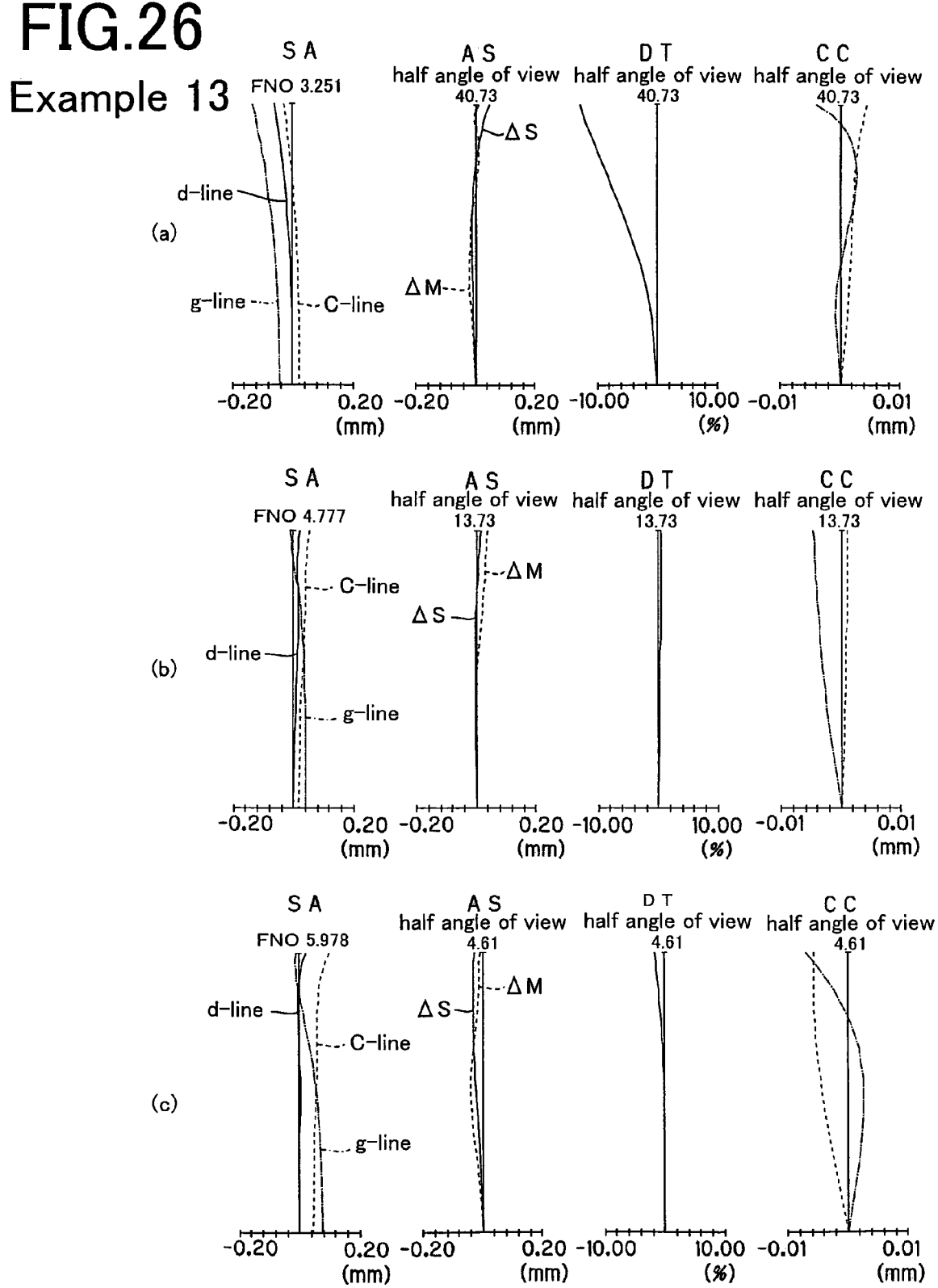
FIG. 26 is an aberration diagram for Example 13 upon focusing on an object point at infinity.
Figure 28:
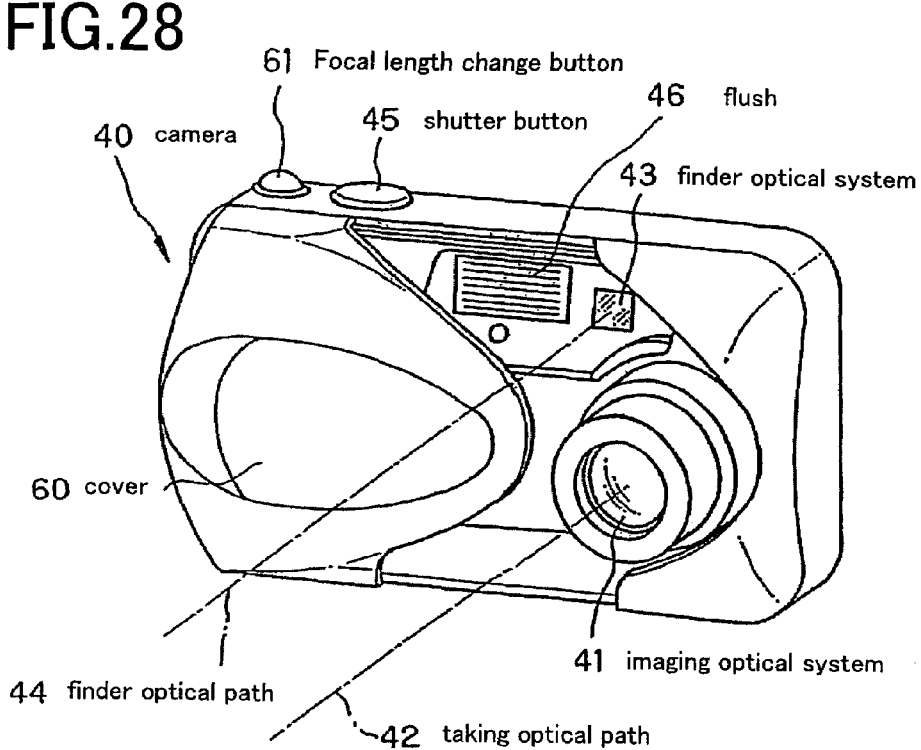
FIG. 28 is a front perspective view of the outside shape of a digital camera according to the invention.
Figure 29:
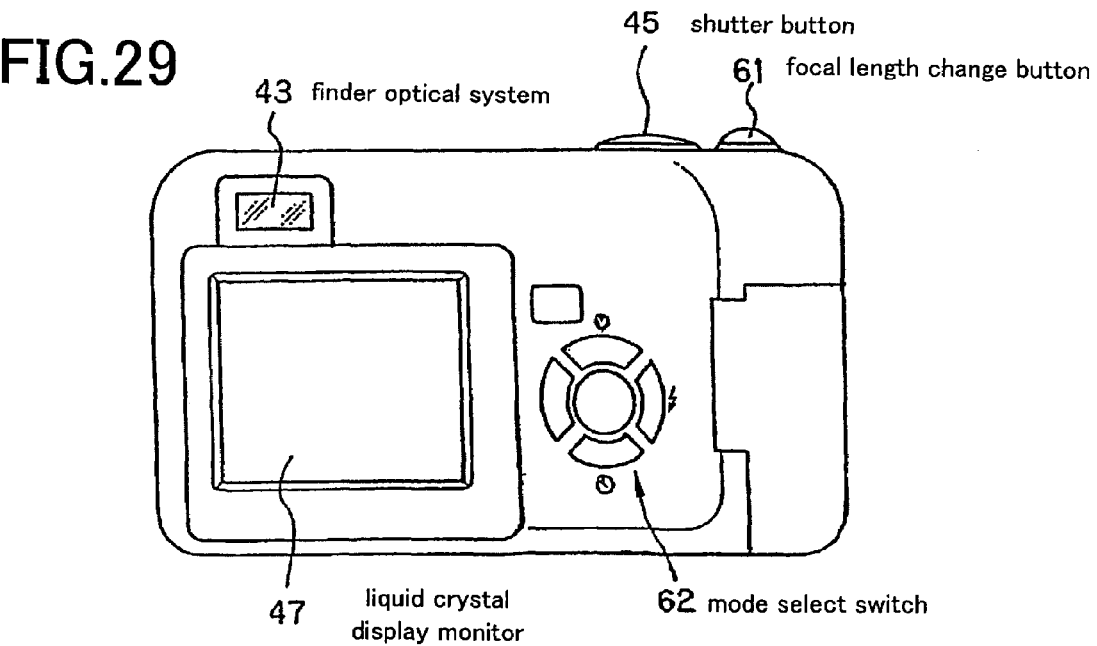
FIG. 29 is a rear perspective view of the digital camera of FIG. 28.
Figure 30:
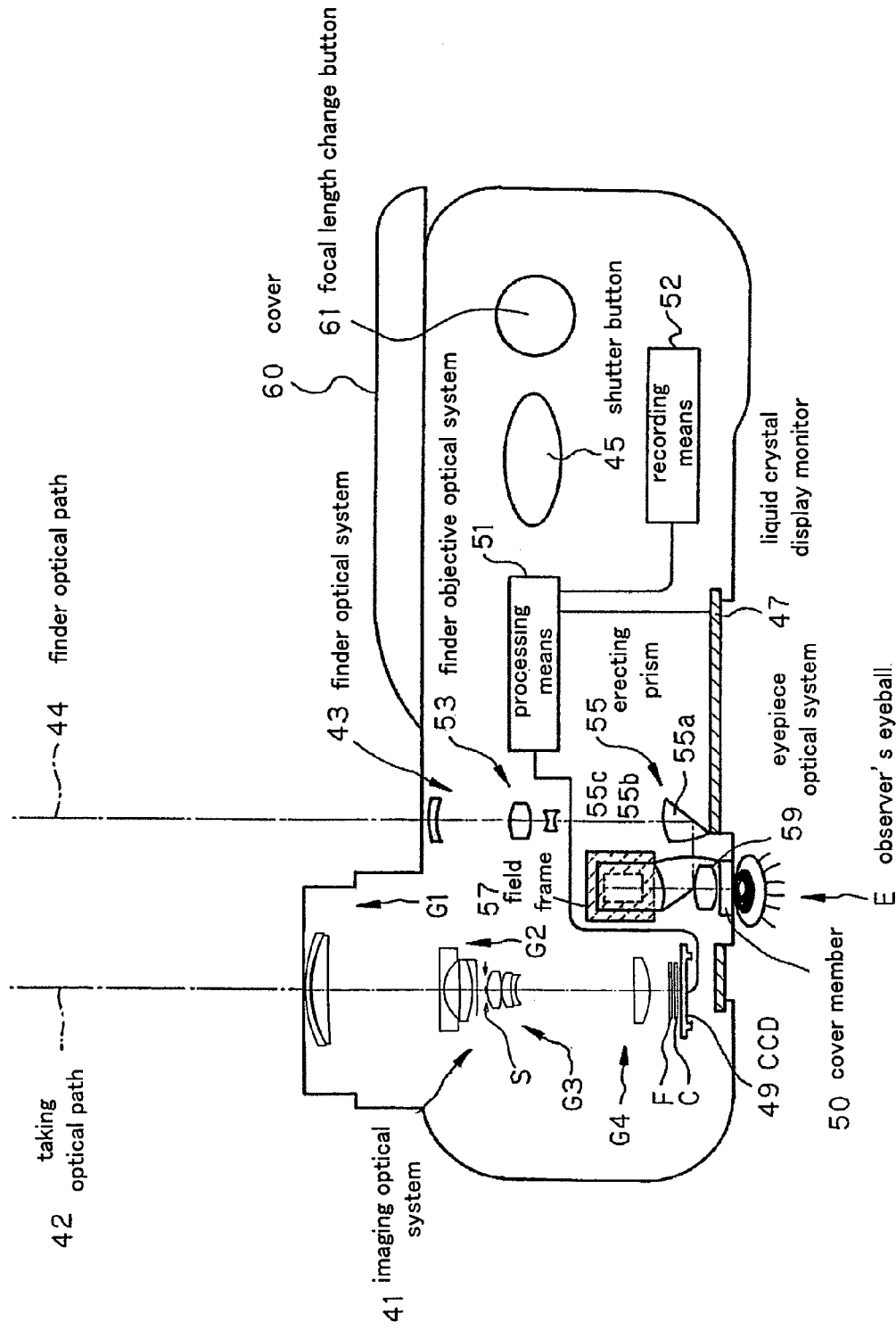
FIG. 30 is a sectional view of the digital camera of FIG. 28.

FIGS. 28-30 are conceptual illustrations of a digital camera, in which such an inventive zoom lens as set forth above is incorporated in a taking optical system 41. FIG. 28 is a front perspective view of the appearance of a digital camera 40; FIG. 18 is a rear perspective view of the same; and FIG. 19 is a schematic sectional view of the setup of the digital camera 40. However, FIGS. 17 and 19 show the taking optical system 41 in operation. In the embodiment here, the digital camera 40 comprises a taking optical system 41 positioned on a taking optical path 42, a finder optical system 43 positioned on a finder optical path 44, a shutter button 45, a flash 46, a liquid crystal display monitor 47, a focal length change button 61, a mode select switch 62, and so on. With the taking optical system 41 received at a lens mount, a cover 60 is slid over the taking optical system 41, finder optical system 43 and flash 46. And, as the cover 60 is slid open to place the camera 40 in operation, the taking optical system 41 is let out, as in FIG. 17. As the shutter button 45 mounted on the upper portion of the camera 40 is pressed down, it causes an image to be taken through the taking optical system 41, for instance, the zoom lens of Example 1. An object image formed by the taking optical system 41 is formed on the imaging plane (photoelectric transformation plane) of CCD 49 via a low-pass filter F with a wavelength limiting coating applied on it and a cover glass C. An object image received at CCD 49 is shown as an electronic image on the liquid crystal display monitor 47 via processing means 51, which monitor is mounted on the back of the camera. This processing means 51 is connected with recording means 52 in which the taken electronic image may be recorded. It is here noted that the recording means 52 may be provided separately from the processing means 51 or, alternatively, it may be constructed in such a way that images are electronically recorded and written therein by means of floppy discs, memory cards, MOs or the like. This camera could also be set up in the form of a silver-halide camera using a silver-halide film in place of CCD 49.

Moreover, a finder objective optical system 53 is located on the finder optical path 44. The finder objective optical system 53 comprises a zoom optical system which is made up of a plurality of lens groups (three in FIGS. 28-30) and an erecting prism system 55 composed of erecting prisms 55a, 55b and 55c, and whose focal length varies in association with the zoom lens that is the taking optical system 41. An object image formed by the finder objective optical system 53 is in turn formed on the field frame 57 of the erecting prism system 55 that is an image-erecting member. In the rear of the erecting prism system 55 there is an eyepiece optical system 59 located for guiding an erected image into the eyeball E of an observer. It is here noted that a cover member 50 is provided on the exit side of the eyepiece optical system 59.

FIG. 31 is a block diagram for the internal circuits of the main part of the aforesaid digital camera 40. In the following explanation, the aforesaid processing means 51 comprises, for instance, a CDS/ADC block 24, a temporal storage memory block 17, an image processor block 18 and so on, and the storage means 52 comprises, for instance, a storage medium block 19 and so on.

As shown in FIG. 31, the digital camera 40 is built up of an operating block 12, a control block 13 connected to the operating block 12 and an imaging drive circuit 16 connected to the control signal output port of the control block 13 via buses 14 and 15 as well as a temporal storage memory block 17, an image processor block 18, a storage medium block 19, a display block 20 and a preset information storage memory block 21.

Data may be entered in or produced out of the aforesaid temporal storage memory block 17, image processor block 18, storage medium block 19, display block 20 and preset information storage memory block 21 via a bus 22, and the imaging drive circuit 16 is connected with CCD 49 and CDS/ADC block 24.

The operating block 12 comprising various input buttons and switches is a circuit through which event information entered from outside (a camera operator) via such input buttons and switches is notified to the control block. The control block 13 is a central processor comprising a CPU as an example: it is a circuit that, according to a program loaded in a program memory (not shown) stored therein, puts the whole digital camera 40 under control in response to the instruction and order entered by the camera operator via the operating block 12.

The CCD 49 receives an object image formed through the inventive taking optical system 41. The CCD 49 is an imaging device that is driven and controlled by the imaging drive circuit 16 to convert the quantity of light of that object image for each pixel into an electric signal and produce it to the CDS/ADC block 24.

The CDS/ADC block 24 is a circuit that amplifies an electric signal entered from CCD 49 and subjects it to analog/digital conversion to produce image raw data (Bayer data: hereinafter called RAW data) only subjected to such amplification and digital conversion to the temporal storage memory 17.

The temporal storage memory 17 is a buffer comprising SDRAM for instance: it is a memory device that temporarily stores the aforesaid RAW data produced out of the CDS/ADC block 24. The image processor block 18 is a circuit that reads the RAW data stored in the temporal storage memory 17 or the RAW data stored in the storage medium 19 to implement a variety of image processing including distortion correction on the basis of an image quality parameter designated from the control block 13.

The recording medium block 19 is a control circuit that detachably receives a card type or stick type recording medium comprising, for instance, a flash memory or the like so that the RAW data transferred from the temporal storage memory 17 or the image data subjected to image processing at the image processor block 18 are recorded and loaded in the card type or stick type flash memory.

The display block 20 is a circuit that comprises a liquid crystal display monitor 47 to display images, menus or the like on that liquid crystal display monitor 47. The preset information storage memory block 21 comprises a ROM block having various image quality parameters previously loaded in it and a RAM block in which an image quality parameter selected by input operation at the operating block 12 from the image quality parameters read out of that ROM block is stored. The preset information storage memory block 21 is a circuit that puts inputs in and outputs from those memories under control.

With the thus constructed digital camera 40, it is possible to achieve high performance, size reductions and a wide-angle arrangement, because the taking optical system 41 incorporated in it has high zoom capability and extremely stable imaging capability all over the zoom range, albeit having a sufficient wide-angle arrangement and compact construction. And faster focusing operation is achievable on the wide-angle and telephoto sides.

The present invention may be applied to just only the so-called compact digital camera adapted to take pictures of general subjects but also surveillance cameras required to have wide angles of view and lens interchangeable type cameras.

What is claimed is:

1. A zoom lens, comprising, in order from an object side thereof,
    a first lens group of positive refracting power, and
    a second lens group of negative refracting power, and
    a third lens group of positive refracting power located on an image side with respect to said second lens group, wherein:
    upon zooming from a wide-angle end to a telephoto end,
    a spacing between said first lens group and said second lens group grows wider at the telephoto end than at the wide-angle end,
    a spacing between said second lens group and said third lens group becomes narrower at the telephoto end than at the wide-angle end, and wherein:
    said first lens group comprises a negative lens and a positive lens,
    a total number of the negative lens in said first lens group is one, and
    at least one positive lens in said first lens group satisfies the following conditions (1) and (2):

$$1.80 < ndlp < 2.0 \quad (1)$$

$$50.0 < vdlp < 70.0 \quad (2)$$

where ndlp is a d-line refractive index of said at least one positive lens in the first lens group, and
    vdlp is an Abbe constant of said at least one positive lens in the first lens group.

2. The zoom lens according to claim 1, wherein:
    said at leas one positive lens satisfies the following condition (3):

$$-5.0 < SFlp < -0.05 \quad (3)$$

where SFlp is defined as SFlp=(Rlpf+Rlpr)/(Rlpf−Rlpr) where Rlpf is a paraxial radius of curvature of an object-side surface of said at least one positive lens in the first lens group, and
    Rlpr is a paraxial radius of curvature of an image-side surface of said at least one positive lens in the first lens group.

3. The zoom lens according to claim 1 wherein a total number of the positive lens in said first lens group is one.

4. The zoom lens according to claim 3, wherein said first lens group satisfies the following conditions (5) and (6):

$$0.001 < ndln - ndlp < 0.50 \quad (5)$$

$$20.0 < vdlp - vdln < 55.0 \quad (6)$$

where ndln is a d-line refractive index of the negative lens in the first lens group, and
    vdln is an Abbe constant of the negative lens in the first lens group.

5. The zoom lens according to claim 1, wherein said first lens group satisfies the following condition (7):

$$0.20 < f1/ft < 1.00 \quad (7)$$

where f1 is a focal length of the first lens group, and
    ft is a focal length of the whole zoom lens system at the telephoto end.

6. The zoom lens according to claim 1, wherein said second lens group satisfies the following condition (8):

$$0.02 < |f2/ft| < 0.50 \quad (8)$$

where f2 is a focal length of the second lens group, and
    ft is a focal length of the whole zoom lens system at the telephoto end.

7. The zoom lens according to claim 1, which is a four-group zoom lens comprising, in order from an object side thereof,
    said first lens group of positive refracting power,
    said second lens group of negative refracting power,
    said third lens group of positive refracting power, and
    a fourth lens group of positive refracting power.

8. The zoom lens according to claim 7, which further comprises an aperture stop between said second lens group and said fourth lens group, and wherein:
    upon zooming from the wide-angle end to the telephoto end, said first lens group moves in such a way as to be positioned more on the object side at the telephoto end than at the wide-angle end, said second lens group moves, said third lens group moves in such a way as to be positioned more on the object side at the telephoto end than at the wide-angle end, said fourth lens group moves, and said aperture stop moves in such a way as to be positioned more on the object side at the telephoto end than at the wide-angle end.

9. The zoom lens according to claim 1, which further satisfies the following condition (9):

$$4.0 < ft/fw < 40.0 \quad (9)$$

where ft is a focal length of the whole zoom lens system at the telephoto end, and fw is a focal length of the whole zoom lens system at the wide-angle end.

10. An imaging apparatus comprising a zoom lens as recited in claim 1, and an imaging device located on an image side of said zoom lens and adapted to convert an image formed through said zoom lens into an electric signal.

11. The imaging apparatus according to claim 10, which further comprises the following condition (4):

$$0.40 < \Sigma dlG/Im < 3.00 \quad (4)$$

where Σdlg is a thickness on an optical axis of the first lens group, and

Im is half a diagonal length of an effective imaging area of the imaging device, provided that when said effective imaging area is variable, it is the greatest possible value.

12. The imaging apparatus according to claim 10, which further satisfies the following condition (10):

$$0.50 < Im/fw < 1.00 \quad (10)$$

where Im is half a diagonal length of an effective imaging area of the imaging device, provided that when said effective imaging area is variable, it is the greatest possible value, and fw is a focal length of the whole zoom lens system at the wide-angle end.

13. The imaging apparatus according to claim 10, which further satisfies the following condition (11):

$$5.0 < Lt/Im < 17.5 \quad (11)$$

where Lt is a total length of the whole zoom lens system at the telephoto end, and Im is half a diagonal length of an effective imaging area of the imaging device, provided that when said effective imaging area is variable, it is the greatest possible value.

14. The imaging apparatus according to claim 10, which further comprises an image transformation block adapted to transform said electric signal containing distortion from said zoom lens into an image signal with distortion corrected by image processing.

15. The imaging apparatus according to claim 10, which further comprises an image transformation block adapted to transform an electric signal containing chromatic aberration of magnification from said zoom lens into an image signal corrected by image processing for a color shift resulting from chromatic aberration of magnification.

* * * * *